(12) United States Patent
Zhu et al.

(10) Patent No.: US 9,622,262 B2
(45) Date of Patent: Apr. 11, 2017

(54) TRANSMIT OPPORTUNITY (TXOP) BASED CHANNEL REUSE

(71) Applicant: QUALCOMM Incorporated, San Diego, CA (US)

(72) Inventors: Hao Zhu, Sunnyvale, CA (US); Srinivas Katar, Gainesville, FL (US); Simone Merlin, Solana Beach, CA (US); Chao Zou, Ocala, FL (US); Gwendolyn Denise Barriac, Encinitas, CA (US); George Cherian, San Diego, CA (US); Santosh Paul Abraham, San Diego, CA (US); Lawrence Winston Yonge, III, Summerfield, FL (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 14/268,855

(22) Filed: May 2, 2014

(65) Prior Publication Data

US 2014/0328270 A1 Nov. 6, 2014

Related U.S. Application Data

(60) Provisional application No. 61/827,480, filed on May 24, 2013, provisional application No. 61/843,315, (Continued)

(51) Int. Cl.
*H04W 4/00* (2009.01)
*H04W 74/00* (2009.01)
*H04W 74/04* (2009.01)

(52) U.S. Cl.
CPC .......... *H04W 74/002* (2013.01); *H04W 74/04* (2013.01)

(58) Field of Classification Search
None
See application file for complete search history.

(56) References Cited

U.S. PATENT DOCUMENTS

| 7,436,801 B1 | 10/2008 | Kanterakis |
| 7,639,658 B2 | 12/2009 | Frederiks et al. |

(Continued)

FOREIGN PATENT DOCUMENTS

| EP | 2302964 A1 | 3/2011 |
| EP | 2490500 A1 | 8/2012 |

(Continued)

OTHER PUBLICATIONS

International Search Report and Written Opinion for International Application No. PCT/US2014/039384, ISA/EPO, Sep. 23, 2014, 8 pages.

(Continued)

*Primary Examiner* — Chi H Pham
*Assistant Examiner* — Fahmida Chowdhury
(74) *Attorney, Agent, or Firm* — Toler Law Group, PC

(57) ABSTRACT

A method includes determining, at a first transmitter, a clear channel access (CCA) threshold associated with reuse of a first transmit opportunity (TXOP) of a message. The method further includes sending, from the first transmitter to a first receiver, at least a portion of the message, wherein the portion of the message indicates the CCA threshold.

47 Claims, 16 Drawing Sheets

Related U.S. Application Data filed on Jul. 5, 2013, provisional application No. 61/869,546, filed on Aug. 23, 2013, provisional application No. 61/926,205, filed on Jan. 10, 2014, provisional application No. 61/936,872, filed on Feb. 7, 2014.

(56) References Cited

U.S. PATENT DOCUMENTS

| | | |
|---|---|---|
| 8,331,951 B2 | 12/2012 | Zhang et al. |
| 8,355,389 B2 | 1/2013 | Kasslin et al. |
| 8,498,578 B2 | 7/2013 | Abraham et al. |
| 8,522,088 B2 | 8/2013 | Kim et al. |
| 8,634,317 B1 | 1/2014 | Yu |
| 2006/0014496 A1 | 1/2006 | Klein |
| 2007/0002814 A1 | 1/2007 | Benveniste |
| 2007/0060155 A1* | 3/2007 | Kahana ............... H04W 72/085 455/450 |
| 2007/0072638 A1 | 3/2007 | Yang et al. |
| 2007/0133489 A1 | 6/2007 | Ramesh et al. |
| 2007/0270102 A1* | 11/2007 | Zhu ..................... H04W 48/10 455/69 |
| 2008/0125160 A1 | 5/2008 | Zhu |
| 2009/0207747 A1 | 8/2009 | Kim et al. |
| 2009/0279487 A1* | 11/2009 | Reumerman ......... H04W 40/24 370/329 |
| 2011/0030516 A1 | 2/2011 | Hodges, Jr. |
| 2011/0086664 A1 | 4/2011 | Li et al. |
| 2011/0110340 A1 | 5/2011 | Lakkis |
| 2011/0194644 A1 | 8/2011 | Liu et al. |
| 2011/0268054 A1 | 11/2011 | Abraham et al. |
| 2011/0305156 A1* | 12/2011 | Liu ..................... H04L 5/001 370/252 |
| 2011/0305288 A1 | 12/2011 | Liu et al. |
| 2012/0082109 A1 | 4/2012 | Hong et al. |
| 2012/0093134 A1 | 4/2012 | Zuniga et al. |
| 2012/0099450 A1 | 4/2012 | Madan et al. |
| 2012/0182963 A1 | 7/2012 | Kneckt et al. |
| 2012/0195296 A1 | 8/2012 | Adachi et al. |
| 2012/0207036 A1 | 8/2012 | Ong et al. |
| 2012/0207074 A1 | 8/2012 | Kneckt |
| 2012/0230242 A1* | 9/2012 | Kim ..................... H04B 7/0452 370/312 |
| 2012/0314583 A1 | 12/2012 | Hart et al. |
| 2012/0327870 A1 | 12/2012 | Grandhi et al. |
| 2013/0017794 A1* | 1/2013 | Kloper ............... H04W 74/0808 455/63.1 |
| 2013/0051260 A1 | 2/2013 | Liu |
| 2013/0058218 A1 | 3/2013 | Wu et al. |
| 2013/0070627 A1 | 3/2013 | Chen et al. |
| 2013/0083781 A1 | 4/2013 | Zhang et al. |
| 2013/0136013 A1 | 5/2013 | Kneckt et al. |
| 2013/0155953 A1 | 6/2013 | Chu et al. |
| 2013/0171999 A1 | 7/2013 | Katar et al. |
| 2013/0182784 A1 | 7/2013 | Wang et al. |
| 2013/0203429 A1 | 8/2013 | Kneckt et al. |
| 2013/0235737 A1 | 9/2013 | Merlin et al. |
| 2013/0301551 A1 | 11/2013 | Ghosh et al. |
| 2013/0316660 A1 | 11/2013 | Hsin et al. |
| 2014/0050156 A1 | 2/2014 | Chan et al. |
| 2014/0064101 A1* | 3/2014 | Hart .................. H04W 74/0808 370/241 |
| 2014/0071873 A1 | 3/2014 | Wang et al. |
| 2014/0119268 A1 | 5/2014 | Chu et al. |
| 2014/0177517 A1 | 6/2014 | Koskela et al. |
| 2014/0269544 A1 | 9/2014 | Zhu et al. |
| 2014/0328191 A1 | 11/2014 | Barriac et al. |
| 2014/0328192 A1 | 11/2014 | Barriac et al. |
| 2014/0328268 A1 | 11/2014 | Zhu et al. |
| 2014/0328269 A1 | 11/2014 | Zhu et al. |
| 2014/0334387 A1 | 11/2014 | Doppler et al. |
| 2015/0009907 A1 | 1/2015 | Merlin et al. |
| 2015/0055587 A1 | 2/2015 | Sampath et al. |
| 2015/0078299 A1 | 3/2015 | Barriac et al. |
| 2015/0124744 A1 | 5/2015 | Zhu et al. |
| 2015/0131641 A1* | 5/2015 | Ong ..................... H04W 48/20 370/338 |
| 2015/0201401 A1 | 7/2015 | Lahetkangas et al. |
| 2015/0319700 A1* | 11/2015 | Oteri ................... H04W 52/10 455/127.1 |
| 2016/0066349 A1 | 3/2016 | Seok |

FOREIGN PATENT DOCUMENTS

| | | |
|---|---|---|
| JP | 2009534994 A | 9/2009 |
| WO | 2006102294 A2 | 9/2006 |
| WO | 2006115823 A2 | 11/2006 |
| WO | 2007027442 A2 | 3/2007 |
| WO | 2007127311 A2 | 11/2007 |
| WO | 2011053775 A1 | 5/2011 |
| WO | 2013012263 A1 | 1/2013 |
| WO | 2013012807 A1 | 1/2013 |
| WO | 2013036649 A1 | 3/2013 |

OTHER PUBLICATIONS

Merlin, Simone et al., "Systems and Methods for Extending the Range of Wireless Communications," U.S. Appl. No. 61/722,008 filed Nov. 2, 2012, 48 pages.

Charfi E. et al., "Upcoming WLANs MAC access mechanisms: An overview", 8th IEEE, IET International Symposium on Communication Systems, Networks and Digital Signal Processing, 6 pages.

* cited by examiner

TRANSMIT OPPORTUNITY (TXOP) BASED CHANNEL REUSE

I. CROSS-REFERENCE TO RELATED APPLICATIONS

The present application claims priority from commonly owned U.S. Provisional Pat. App. No. 61/827,480 filed May 24, 2013 and entitled "SYSTEMS AND METHODS FOR PACKET IN PACKET DETECTION IN A WIRELESS COMMUNICATION NETWORK", U.S. Provisional Pat. App. No. 61/843,315 filed Jul. 5, 2013 and entitled "METHODS AND APPARATUS FOR CLEAR CHANNEL ASSESSMENT", U.S. Provisional Pat. App. No. 61/869, 546 filed Aug. 23, 2013 and entitled "SYSTEMS, METHODS, AND APPARATUS FOR INCREASING REUSE IN WIRELESS COMMUNICATIONS", U.S. Provisional Pat. App. No. 61/926,205 filed Jan. 10, 2014 and entitled "TRANSMIT OPPORTUNITY (TXOP) BASED CHANNEL REUSE", and U.S. Provisional Pat. App. No. 61/936, 872 filed Feb. 7, 2014 and entitled "TRANSMIT OPPORTUNITY (TXOP) BASED CHANNEL REUSE", the contents of which are expressly incorporated herein by reference in their entirety.

II. FIELD

The present disclosure is generally related to transmit opportunity (TXOP) based channel reuse.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Various wireless protocols and standards may be available for use by wireless telephones and other wireless devices. For example, Institute of Electrical and Electronics Engineers (IEEE) 802.11, commonly referred to as "Wi-Fi," is a standardized set of wireless local area network (WLAN) communication protocols. In Wi-Fi protocols, a transmitter station may transmit a preamble prior to transmitting a physical layer protocol data unit (PPDU) to a receiver. The preamble may identify a transmit opportunity (TXOP) and may be detectable by other stations. Stations that detect the preamble corresponding to the PPDU may defer to the transmitter station for a duration associated with the transmit opportunity (TXOP). For example, in a Wi-Fi system, multiple wireless devices may be densely deployed (e.g., deployed fairly close to each other). When a first device transmits data during a TXOP established by the first device, a second device in close proximity to the first device may not perform a transmission during the TXOP.

IV. SUMMARY

The present disclosure presents techniques and protocols for enabling TXOP based channel reuse. Instead of a device in a wireless system deferring (e.g., not transmitting) during a TXOP of another device in the wireless system, the device may transmit during the TXOP (e.g., the device may "reuse" the TXOP). To mitigate the possibility of interference caused by the TXOP reuse, the present disclosure describes various notification and interference measurement protocols.

The wireless system may include a first transmitter (TX), a first receiver (RX), a reuse TX, and a reuse RX. Each of the first TX, the first RX, the reuse TX, and the reuse RX (collectively, "the wireless devices") may be a device configured to transmit data and/or receive data from one or more other devices included in the wireless system. The first TX is configured to transmit a first message associated with a first TXOP to the first RX. The reuse TX is configured to transmit a second message associated with a second TXOP to the reuse RX. The second message is transmitted by the reuse TX during the first TXOP, and the second TXOP occurs during the first TXOP. A period of time during which the reuse TX is transmitting during the first TXOP is referred to as a "reuse TXOP." Accordingly, the reuse TX is permitted to transmit during the first TXOP. One or more of the wireless devices may be in the same wireless network or in different wireless networks, as further described herein.

In one implementation, prior to the first TXOP, the first TX and/or the first RX may transmit control information associated with the first message. The control information may be detectable by one or more other devices included in the wireless system, such as the reuse TX and/or the reuse RX. The control information may indicate that one or more other devices may "reuse" the first TXOP. For example, the control information may indicate that the reuse TX is permitted to transmit the second message during the first TXOP, may indicate one or more parameters (e.g., such as clear channel access (CCA) threshold) to be used by the reuse TX and/or the reuse RX, or a combination thereof. Based on the control information, the reuse TX may determine whether to reuse the first TXOP to send the second message. For example, the reuse TX may determine to reuse the first TXOP when an interference level between different devices (e.g., between the first TX and the reuse TX) is low, such as when a particular interference level between two devices is below a threshold value.

Additionally or alternatively, prior to the first TXOP, the first TX and the first RX may perform a handshake exchange. The handshake exchange may include the first TX sending a request to send (RTS) message to the first RX and may include the first RX sending a clear to send (CTS) message to the first TX. The handshake exchange (e.g., the RTS message and/or the CTS message) may indicate whether reuse of the first TXOP is permitted, may indicate one or more parameters (e.g., one or more CCA thresholds), or a combination thereof. The handshake exchange may be detectable by one or more other devices included in the wireless system, such as the reuse TX and/or the reuse RX. Based on the handshake exchange, the reuse TX may determine whether to reuse the first TXOP to send the second message.

In a particular embodiment, a method includes determining, at a first transmitter, a clear channel access (CCA)

threshold associated with reuse of a first transmit opportunity (TXOP) of a message. The method further includes sending, from the first transmitter to a first receiver, at least a portion of the message, wherein the portion of the message indicates the CCA threshold.

In another particular embodiment, a method includes detecting, at a reuse transmitter, a portion of a message sent by a first transmitter. The message is associated with a first transmit opportunity (TXOP). The message further includes determining, based on the portion, a clear channel access (CCA) threshold associated with reuse of the first TXOP.

In another particular embodiment, a method includes determining, at a reuse transmitter, that reuse of a first transmit opportunity (TXOP) associated with a first message is permitted. The first message is transmitted from a first transmitter to a first receiver. The method further includes determining whether to reuse the first TXOP based on a receiver (RX) clear channel access (CCA) threshold associated with the first receiver.

In another particular embodiment, a method includes detecting, at a reuse transmitter, a portion of a message sent by a first receiver. The method further includes determining, based on the portion, a receiver (RX) clear channel access (CCA) threshold associated with reuse of a first TXOP.

One particular advantage provided by at least one of the disclosed embodiments is a channel access efficiency of the wireless system may be improved and a capacity the wireless system may be increased. For example, by enabling reuse of a TXOP, more data may be transmitted during a given time interval. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Particular embodiments of the present disclosure are described below with reference to the drawings. In the description, common features are designated by common reference numbers throughout the drawings.

Figure 1:
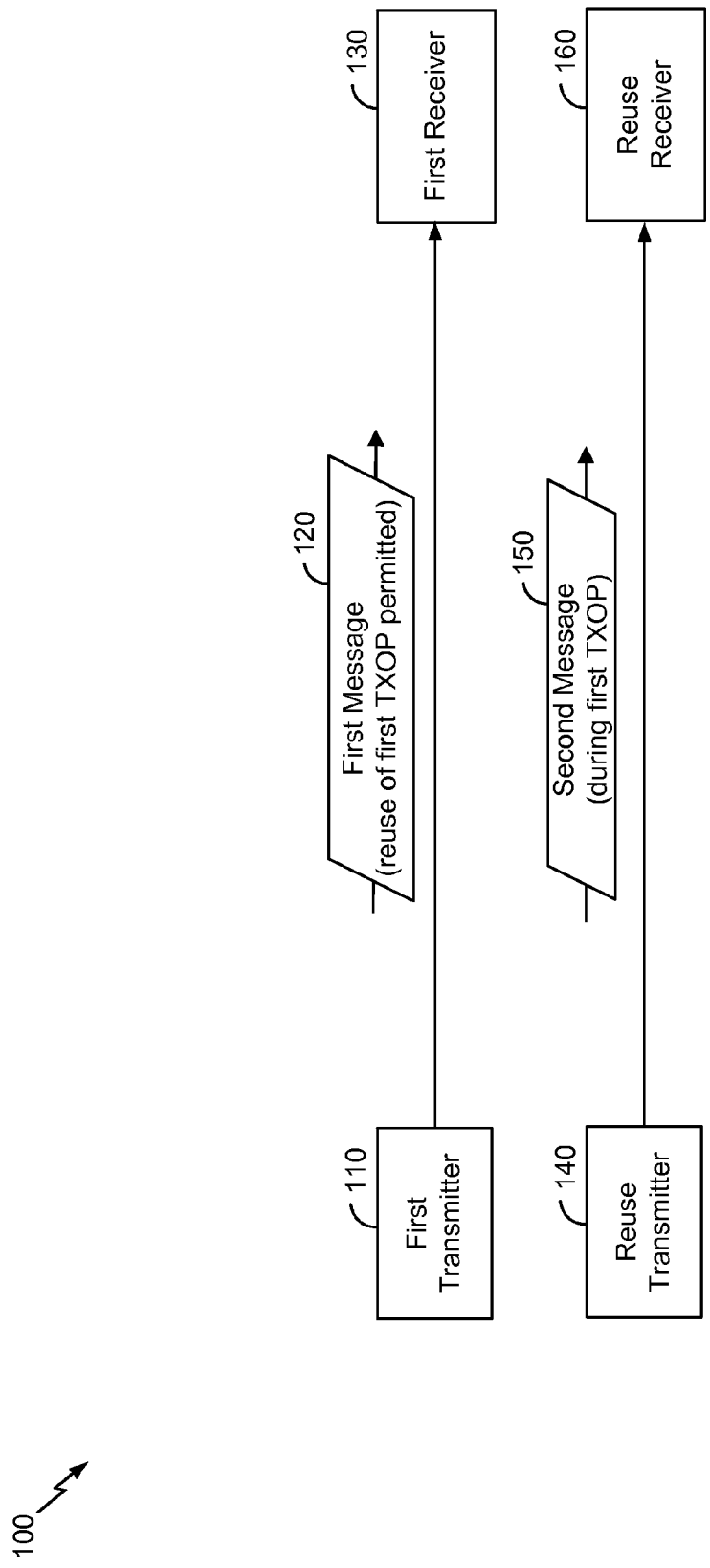
FIG. 1 is a block diagram of a first illustrative embodiment of a system that permits reuse of a transmit opportunity (TXOP)

Referring to FIG. 1, a particular illustrative embodiment of a system 100 that permits transmit opportunity (TXOP) reuse is shown. The system 100 includes a first transmitter (TX) 110, a first receiver (RX) 130, a reuse TX 140, and a reuse RX 160.

The first TX 110 (e.g., a first TX device) is configured to transmit a first message 120 associated with a first TXOP to the first RX 130. The reuse TX 140 is configured to transmit a second message 150 associated with a second TXOP to the reuse RX 160. The second message 150 is transmitted by the reuse TX 140 during the first TXOP, and the second TXOP occurs during the first TXOP. A period of time during which the reuse TX 140 is transmitting during the first TXOP is referred to as a "reuse TXOP." Accordingly, the reuse TX 140 is permitted to transmit the second message 150 during the first TXOP. For example, the reuse TX 140 may be permitted to transmit the second message 150 during the first TXOP on a same channel, partially on the same channel, or on a different channel than a channel on which the first message 120 is communicated by the first TX 110.

The system 100 may include or correspond to a wireless system, which may include one or more wireless networks. For example, the first TX 110, the first RX 130, the reuse TX 140, and the reuse RX 160 may be part of the same wireless network. Alternatively, the system 100 may include multiple networks, such as a first network that includes the first TX 110 and the first RX 130 and a second network that includes the reuse TX 140 and the reuse RX 160. The first network may be associated with a first basic service set (BSS) having a first BSS identification (BSSID) and the second network may be associated with a second BSS having a second BSSID. As another example, one of the first network and/or the second network may include a peer-to-peer communication network using Wi-Fi Direct communication or a tunneled direct link setup (TDLS) communication, as illustrative, non-limiting embodiments. The system 100 may include Institute of Electrical and Electronics Engineers (IEEE) 802.11 wireless network(s) (e.g., a Wi-Fi network). For example, the system 100 may operate in accordance with an IEEE 802.11 standard. In an illustrative embodiment, the system 100 includes an 802.11 high efficiency Wi-Fi (HEW) network. As used herein, the system 100 may support transmissions according to one or more of the IEEE 802.11a, 802.11n, 802.11ac, or 802.11ax standards, as illustrative, non-limiting examples.

Each of the first TX 110, the first RX 130, the reuse TX 140, and the reuse RX 160 may be a device configured to transmit data and/or receive data from one or more other devices included in the system 100. For example, each of the first TX 110, the first RX 130, the reuse TX 140, and the reuse RX 160 may include processor (e.g., a central processing unit (CPU), a digital signal processor (DSP), a network processing unit (NPU), etc.), a memory (e.g., a random access memory (RAM), a read-only memory (ROM), etc.), and/or a wireless interface configured to send and receive data via a wireless network, as described further with reference to FIG. 21. Each of the first TX 110, the first RX 130, the reuse TX 140, and the reuse RX 160 may be an access point (AP) or a station (STA). Each of the first TX 110, the first RX 130, the reuse TX 140, and the reuse RX 160 may be configured to operate in compliance with one or more standards, such as one or more IEEE 802.11 standards.

During operation, the first TX 110 may be configured to generate the first message 120 and to transmit the first message 120 to the first RX 130. For example, the first message 120 may be transmitted via a channel (e.g., a channel having a corresponding frequency band) to the first RX 130. The first message 120 may be associated with a data packet having one or more fields. The first message 120 may be associated with a first TXOP and reuse of the first TXOP may be permitted by another device in the system 100. For example, an indication that reuse of the first TXOP is permitted may be provided to one or more devices included in the system 100, as described further with reference to FIGS. 2 and 5. To illustrate, the indication may be provided as a management message (e.g., included in a beacon) provided from a particular device, such as the first TX 110, may be provided part of the first message 120, as described further with reference to FIG. 2, and/or may be provided as part of a handshake exchange between the first TX 110 and the first RX 130, as described with reference to FIG. 5, as illustrative, non-limiting examples. As further described herein, the first message 120 may represent a request to send (RTS) message, a control message, a data message, a physical layer (PHY) preamble, a media access control (MAC) layer message, etc. or a portion thereof.

Based on the first message 120, the reuse TX 140 may determine whether reuse of the first TXOP is permitted. If reuse of the first TXOP is permitted and the reuse TX 140 is ready to transmit a message, such as the second message 150, the reuse TX 140 may determine whether to reuse the first TXOP. When the reuse TX 140 determines that reuse of the first TXOP is not permitted, or if the reuse TX 140 determines not to reuse the first TXOP, the reuse TX 140 defers to the first TXOP and does not transmit the second message 150 during the first TXOP. For example, the reuse TX 140 may queue the second message 150 to be transmitted after expiration of the first TXOP (e.g., after the first message 120 is transmitted). In a particular embodiment, when the reuse TX 140 reuses the first TXOP to send the second message 150, a second TXOP of the second message 150 may not be permitted to be reused by another device (e.g., TXOP reuse nesting may not be permitted).

To determine whether to reuse the first TXOP, the reuse TX 140 may determine whether one or more conditions are satisfied. For example, the reuse TX 140 may determine whether a mutual interference between one or more devices in the system 100 satisfies (e.g., is less than) one or more thresholds. For example, the reuse TX 140 may determine whether a first mutual interference between the first TX 110 and the reuse RX 160 is less than or equal to a first threshold, as described further with reference to FIG. 2. When the reuse TX 140 determines to reuse the first TXOP (e.g., because the mutual interference is less than the first threshold), the reuse TX 140 may transmit the second message 150 during the first TXOP. A transmission (e.g., a duration) of the second message 150 may not exceed an end of the first TXOP. Accordingly, during the first TXOP associated with the first message 120, transmission of the first message 120 and the second message 150 may at least partially overlap. Based on the reuse TX 140 reusing the first TXOP, more traffic (e.g., more data) may be transmitted during the first TXOP as compared to when the reuse TX 140 defers to the first TXOP and the second message 150 is not transmitted during the first TXOP.

Figure 5:
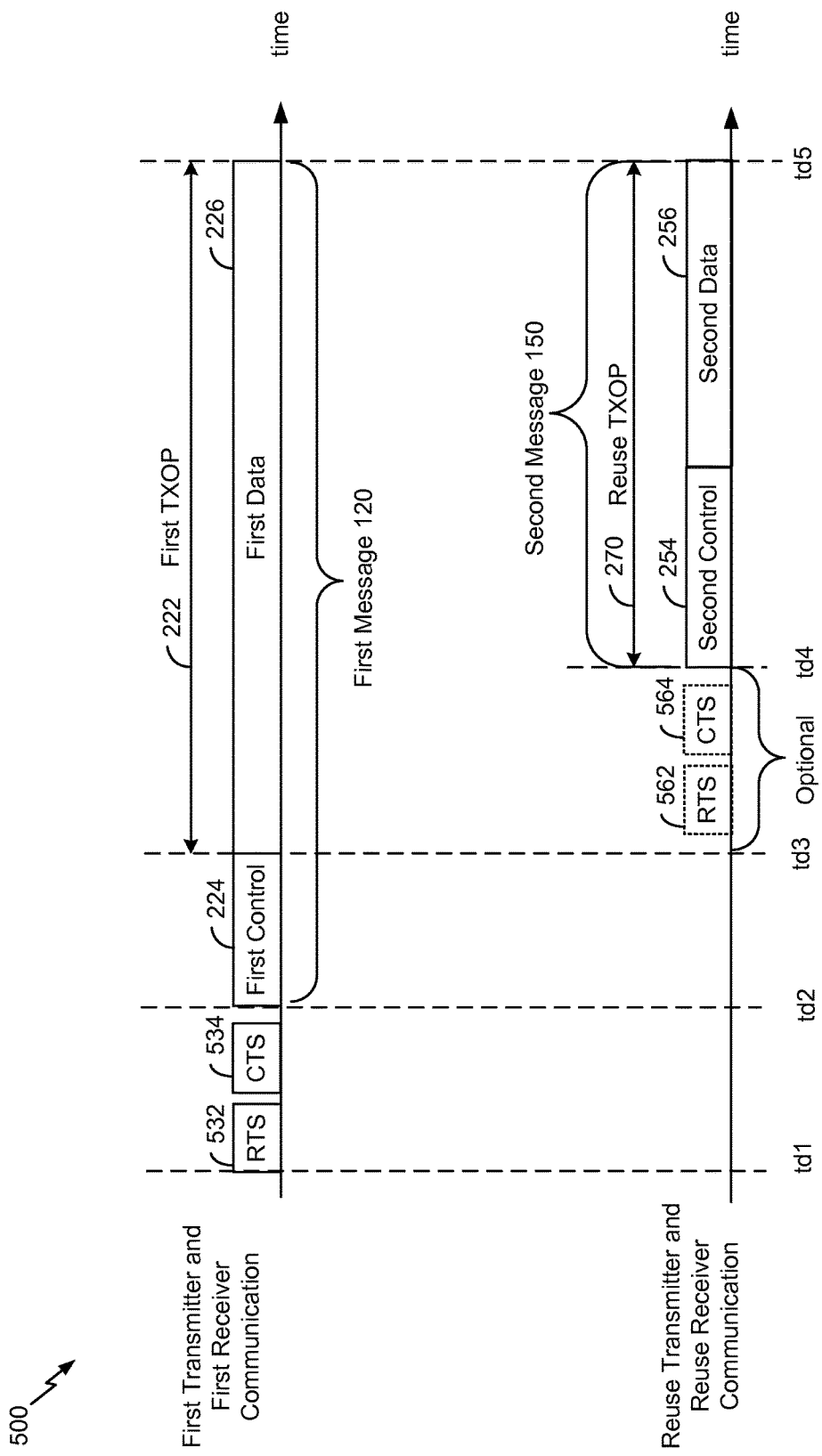
FIG. 5 is a timing diagram of a fourth illustrative example of reuse of a TXOP.

In a particular embodiment, to determine whether to reuse the first TXOP, the reuse TX 140 may determine whether a second mutual interference between the reuse TX 140 and the first RX 130 satisfies a second threshold, as described further with reference to FIG. 5, and/or may determine whether a third mutual interference between the reuse RX 160 and the first RX 130 satisfies a third threshold. Thus, in particular embodiments, determining whether to reuse a TXOP may include considering interference (or potential interference) between one or more of the first TX 110, the first RX 130, the reuse TX 140, and/or the reuse RX 160. Additionally or alternatively, to determine whether to reuse the first TXOP, the reuse TX 140 may determine whether the first message 120 is addressed to the reuse TX 140, whether a destination of the first message 120 is the same as a destination of the second message 150, whether the second message 150 is addressed to the first TX 110 or to the first RX 130, and/or whether a signal strength of the first TX 110 satisfies a clear channel access (CCA) threshold, as illustrative, non-limiting examples. The reuse TX 140 may reuse the first TXOP based on a determination that the first message 120 is not addressed to the reuse TX 140, based on a determination that the destination (e.g., the first RX 130) of the first message 120 is different than the destination (e.g., the reuse RX 160) of the second message 150, based on a determination that the second message 150 is not addressed to the first TX 110 or to the first RX 130, and/or based on a determination that the signal strength of the first TX 110 satisfies the CCA threshold, as illustrative, non-limiting examples.

Additionally, if there is an honored network allocation vector (NAV) (e.g., a NAV associated with the first message 120), the reuse TX 140 may determine whether to reuse the first TXOP based on whether the NAV was set by the first TX 110. When the NAV is determined to be set by a frame sent from a device other than the first TX 110, the reuse TX 140 may defer to the first TXOP and may not transmit the second message 150 during the first TXOP. When the NAV is determined to be set by a frame sent by the first TX 110 (and potentially based on one or more other conditions, such as one or more of the aforementioned conditions or one or more other conditions further described herein), the reuse TX 140 may transmit the second message 150 during the first TXOP.

Figure 2:
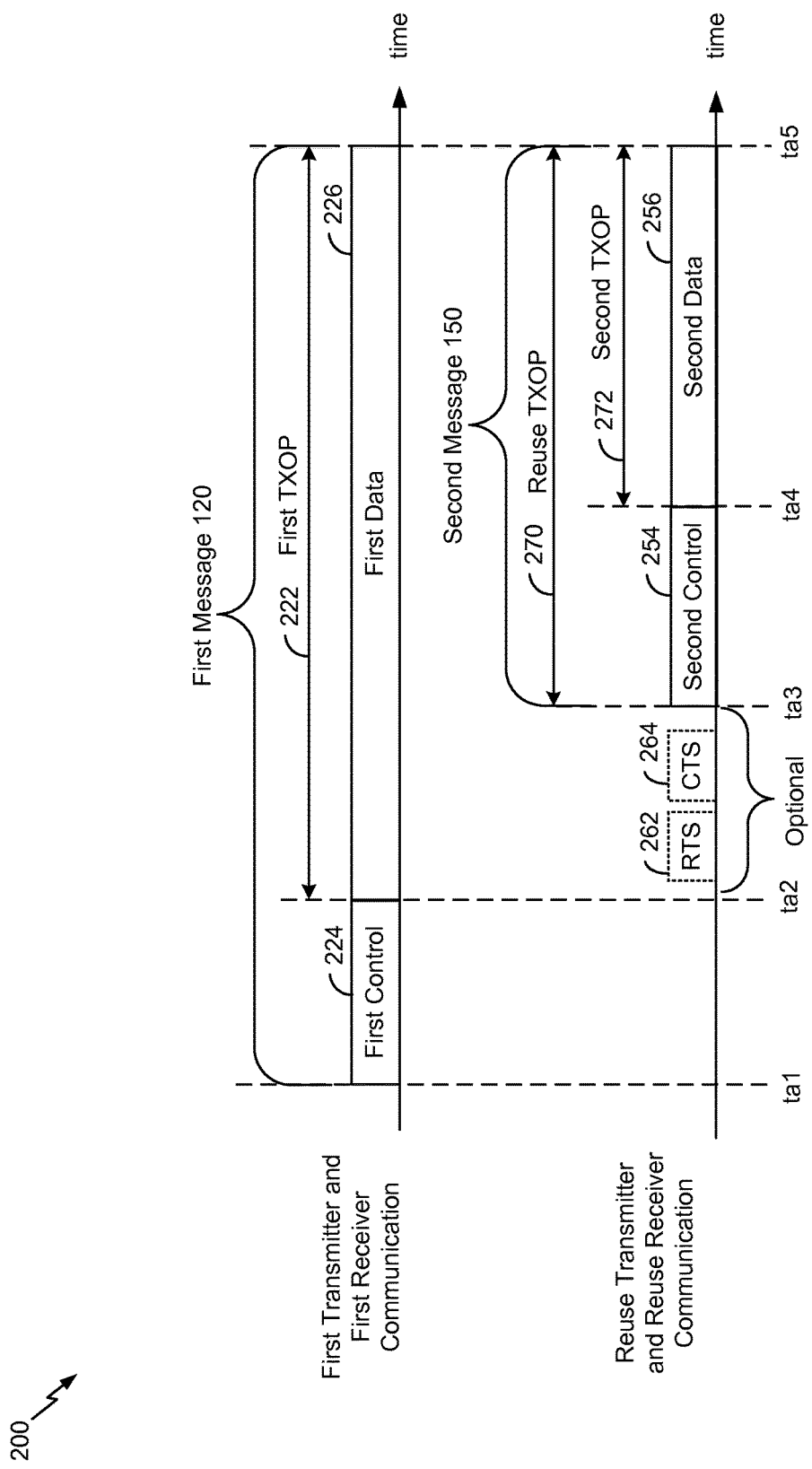
FIG. 2 is a timing diagram of a first illustrative example of reuse of a TXOP.

In a particular embodiment, the first TX 110 may indicate that reuse of the first TXOP is permitted (or may indicate one or more CCA thresholds, as described further with reference to FIGS. 2 and 5) by setting one or more bits in a signal (SIG) field of the first message 120. For example, when the message 120 includes physical layer convergence protocol (PLCP) data and a physical layer protocol data unit (PPDU), at least one bit in a SIG field of the PLCP data may be used to indicate that reuse of the first TXOP is permitted, to indicate a CCA threshold, or a combination thereof. As another example, the SIG field may include a SIG-A field and/or a SIG-B field of an IEEE 802.11ac preamble and one or more reserved bits may be set to indicate that reuse of the first TXOP is permitted, to indicate a CCA threshold, or a combination thereof. Alternatively or additionally, the first TX 110 may indicate that reuse of the first TXOP is permitted and/or may indicate one or more CCA thresholds by setting one or more bits included in a preamble of the message 120. For example, the message 120 may include a HEW preamble and the SIG field may be included in the HEW preamble.

In particular embodiments, signaling associated with TXOP reuse may be included in a "new" type of preamble (e.g., a "new" HEW preamble) that includes a physical (PHY) layer structure that is distinct from one or more preambles defined in one or more IEEE 802.11ac standards. The "new" preamble may include one or more bits to indicate that TXOP reuse is permitted, to indicate at least a partial BSSID associated with a transmitting device, to indicate at least a partial BSSID associated with a receiving device, to indicate at least a partial transmitter address associated with a transmitting device, to indicate a least a partial receiver address associated with a receiving device, or a combination thereof, as illustrative, non-limiting examples. It is noted that the locations of signaling information described herein, such as a PLCP preamble, a MAC layer preamble, a SIG-A field, a SIG-B field, a HEW preamble, etc., are for illustration only and not to be considered limiting. Signaling associated with TXOP reuse (e.g., signaling indicating whether TXOP reuse is permitted and/or one or more parameters) may also be included in other structures, such as other physical layer structures or MAC layer structures, as illustrative, non-limiting examples.

In a particular embodiment, the first TX 110 may indicate that reuse of the first TXOP is permitted and/or may indicate one or more CCA thresholds by using a SIG field of an 802.11ac preamble. For example, one or more reserved bits of the 802.11ac SIG-A field may be set to a particular value that causes the 802.11ac SIG-A filed to be interpreted as a HEW SIG field (e.g., a format of the 802.11ac SIG-A field may be redefined based on the particular value of the one or more reserved bits).

In a particular embodiment, the PLCP data of the first message 120 may include at least a portion of a BSSID associated with the first TX 110 or the first RX 130. For example, when the first message 120 is an uplink communication (e.g., the first TX 110 is a STA and the first RX 130 is an AP), an 802.11ac partial association identifier (PAID) may include multiple bits, such as 9 bits, to identify at least a portion of the BSSID. The multiple bits of the 802.11ac PAID used for the uplink communication may be sufficient to enable a device, such as the reuse TX 140 or the reuse RX 160, to identify a receiver of the first message 120 (e.g., the first RX 130).

As another example, when the first message 120 is a downlink communication (e.g., the first TX 110 is an AP and the first RX 130 is a STA), the BSSID may be hashed with an AID in the 802.11ac PAID. To enable a device that receives the 802.11ac PAID to extract the BSSID from the PAID, an access point of a network may assign AIDs which result in a PAID from which the BSSID may be easily extracted. To illustrate, the access point of the network may selectively determine and assign AID numbers so that for a given PAID, the PAID and the BSSID may be extracted (e.g., because a device extracting the PAID and the BSSID may already know the BSSID from one or more beacons transmitted by the access point). For example, the access point may assign AID numbers that have zero values in certain bit positions or that have a particular bit pattern which the BSSID does not have. Accordingly, a device that receives (e.g., detects) the 802.11ac PAID may use the PAID and the BSSID to extract the AID information. Stated another way, the device that detects the 802.11ac PAID of a downlink transmission may be able to identify the access point that transmits the downlink transmission and a station that is designated to receive the downlink transmission. Additionally or alternatively, the access point may avoid assigning AIDs that would result in a PAID that matches the partial BSSID, so that UL and DL can be discerned. Thus, upon detecting the first message 120, the reuse TX 140 may be able to determine that the first message 120 was sent by the first TX 110 to the first RX 130. Additionally or alternatively, a portion of a packet (e.g., a portion of an IEEE 802.11ac packet) may include a distinct field that includes at least the partial BSSID, the AID, and/or a value derived therefrom. For example, the reuse TX 140 may reinterpret at least a portion of a field based on a value of one or more bits, such as one or more reserved bits. To illustrate, the reuse TX 140 may receive an IEEE 802.11ac PLCP preamble and identify one or more reserved bits or one or more reserved group ID (GID) field values that indicate that a PAID field is encoded in a manner other than defined by one or more IEEE 802.11ac specifications. For example, the PAID field (having 9 bits) may be encoded to represent a partial BSSID in the 5 most significant bits (MSBs) of the PAID field and to represent a partial first TX AID or a partial first RX AID in the remaining 4 least significant bits (LSBs), as an illustrative, non-limiting example. Accordingly, the reuse TX 140 may "reinterpret" the PAID field based on the one or more reserved bits or the one or more reserved GID field values to determine the partial BSSID, the partial first TX AID, the partial first RX AID, or a combination thereof.

In a particular embodiment, an access point of a BSS may enable one or more devices of an overlapping BSS (OBSS) to map each received (e.g., detected) PAID from the BSS to a corresponding BSSID (e.g., of the access point). To enable the one or more devices of the OBSS to map each received PAID, the access point of the BSS may piggyback, to a beacon transmitted by the access point, all PAIDs used by the access point. In another particular embodiment, the access point (e.g., the first TX 110, the first RX 130, the reuse TX 140, or the reuse RX 160) of the BSS may enable or disable reuse of TXOPs or may provide reuse parameters (e.g., one or more CCA thresholds, MCSs for reuse, or reuse transmission power levels) to one or more devices included in the BSS. For example, the access point may enable or disable reuse of TXOPs or may provide reuse parameters using a beacon broadcast by the access point.

In another particular embodiment, TXOP reuse may be applied to peer-to-peer (P2P) transmissions, such as in a system that supports WiFi-Direct transmission or a tunneled direct link setup (TDLS) transmission. When the P2P transmission is a WiFi-Direct transmission, a device that is a group owner (GO) may be associated with a corresponding BSSID. Accordingly, when the GO includes the first TX 110 or the first RX 130, other stations may identify the GO based on the BSSID. In a particular embodiment, if the GO is a cross connecting device (e.g., the GO operates in one direction as part of a P2P network and operates in another direction as a STA coupled to an AP), additional information may be included in transmissions to and from the GO to make the GO identifiable to one or more other devices. For example, a transmission to or from the GO may include transmitter address/receiver address (TA/RA) information in a SIG field of the transmission. As another example, a handshake exchange including a request to send (RTS) message and a clear to send (CTS) message may be performed prior to a transmission to or from the GO.

When the P2P transmission is a TDLS transmission, TA/RA information (e.g., at least partial address information) may be provided in addition to a BSSID and a "reuse allowed" indication to enable reuse of a TXOP of a particular message communicated using the TDLS transmission. For example, a device (e.g., the first TX 110) that enables reuse of the TXOP of the particular message may perform a handshake exchange (e.g., including an RTS message and a CTS message) that includes at least partial TA/RA information. Additionally, to correlate the RTS message and the CTS message to the particular message, the particular message may indicate that the particular message is a TDLS transmission. For example, a particular value of a group ID (GID) field may indicate that the particular message is part of a TDLS transmission. As another example, the TA/RA information (or at least partial address information) may be included in or signaled (as a parameter associated with TXOP reuse) using one or more fields, such as a SIG field, an IEEE 802.11ac field, a reinterpreted IEEE 802.11ac field, a HEW preamble, etc., as illustrative, non-limiting examples.

As another example, a device may provide TA/RA information in a SIG field. To illustrate, one or more reserved bits of an 802.11ac SIG filed may be set to a particular value that causes the 802.11ac to be interpreted as a HEW SIG field that identifies the TA/RA information.

In a particular embodiment, the reuse TX 140 may align the second TXOP (associated with the second message 150) with the first TXOP (associated with the first message 120) such that the second TXOP does not exceed the first TXOP. To illustrate, the reuse TX 140 may align the second TXOP (in time) with the first TXOP so that an end of the second TXOP occurs prior to or at the same time as an end of the first TXOP, as described with reference to FIG. 2.

In a particular embodiment, one or more deferral rules and/or one or more backoff rules may be applied at the reuse TX 140, as described with reference to FIG. 8. In another particular embodiment, one or more approaches may be implemented to handle block acknowledgements (BAs) associated with the first message 120 and the second message 150, as described with reference to FIG. 9.

By enabling the reuse TX 140 to reuse the first TXOP to send the second message 150, an overall throughput of the system 100 may be increased. Further, by transmitting the second message 150 during the first TXOP, a channel access efficiency of the system 100 may be improved and a capacity the system 100 may be increased, as compared to systems that do not permit reuse of TXOPs. Additionally, by enabling (e.g., permitting) reuse of TXOPs in the system 100, an improved signal-to-interference-plus-noise ratio (SINR) may be achieved as compared to systems that do not permit reuse of TXOPS. Accordingly, an overall throughput of the system may be increased when TXOPs can be reused.

Additionally, when the system 100 supports TXOP reuse, TXOP duration may be greater than in a system that does not support TXOP reuse. For example, a system that does not support TXOP reuse may permit a TXOP duration up to 3 milliseconds. In contrast, the system 100 may support TXOP durations greater than 3 milliseconds (e.g., 5 or 6 milliseconds, as illustrative, non-limiting examples). Additionally or alternatively, the first TX 110 may have enhanced distributed channel access (EDCA) parameter settings (e.g., arbitration inter-frame space (AIFS), minimum contention window (CWmin), maximum contention window (CWmax), etc.) based on TXOP reuse being supported by the system 100. In a particular embodiment, an EDCA access category (e.g., a "reuse" category) may be provided for data to be transmitted during a TXOP reuse period (e.g., the data may be identified and put in a corresponding queue for transmission). For example, the data in the reuse category may be put in the corresponding queue depending on quality of service (QoS) requirements of the data or based on past TXOP reuse gain performance.

When TXOP reuse is permitted in conjunction with P2P transmissions, an access point and devices having a P2P link may coordinate to make reuse decisions without having to perform handshake exchanges. By not having to perform handshake exchanges (e.g. RTS/CTS messaging) an amount of overhead in a system may be reduced.

FIG. 2 is a timing diagram to illustrate an example of reuse of a TXOP and is generally designated 200. In FIG. 2, a horizontal axis from left-to-right corresponds to time. The timing diagram 200 illustrates communication between the first TX 110 and the first RX 130 and between the reuse TX 140 and the reuse RX 160 of FIG. 1.

At a first time (ta1), the first TX 110 may begin transmitting the first message 120 to the first RX 130. The first message 120 may include or correspond to a protocol data unit (PDU), such as a physical layer PDU (PPDU), as described with reference to FIG. 10. The first message 120 may be associated with a first TXOP 222.

The first message 120 may include a first control portion 224 and first data 226. The first control portion 224 may be a portion of the first message 120 that is detectable (and decodable) by one or more devices, such as the first RX 130, the reuse TX 140, and/or the reuse RX 160, as described further herein. For example, the first control portion 224 may be associated with a preamble or PLCP data of the first message 120. For example, the first control portion 224 may be associated with a MAC header of the first message 120, and the MAC header may be sent at a transmission rate that is decodable by one or more devices, such as the first RX 130, the reuse TX 140, the reuse RX 160, or one or more other devices, as illustrative, non-limiting examples. The first data 226 may include data (e.g., a data payload) to be communicated from the first TX 110 to an intended destination device (e.g., the first RX 130). In a particular embodiment, the first data 226 may be encrypted so that the first data 226 may not be detectable by devices other than an intended device.

The first control portion 224 may indicate a device (e.g., the first RX 130) to which the first message 120 is addressed, a device (e.g., the first TX 140) that transmits the first message 120, a duration of the first TXOP 222, whether reuse of the first TXOP 222 is permitted, and/or one or more CCA thresholds (associated with the first TX 110 and/or the first RX 130), as illustrative, non-limiting examples. For example, one or more bits in a signature (SIG) field associated with the first message 120 may be set to indicate such information, as described further with reference to FIG. 10.

At a second time (ta2), the first TX 110 may begin transmitting the first data 226 to the first RX 130. A transmission of the first data 226 may coincide with a beginning of the first TXOP 222, as shown.

Prior to the first TXOP 222 beginning or during the first TXOP 222, the reuse TX 140 may determine whether the reuse TX 140 is permitted to reuse the first TXOP 222. For example, the reuse TX 140 may determine that reuse is permitted based on the first control portion 224, based on a management message received from a device (e.g., the first TX 110, the first RX 130, or another device), based on a header associated with the first message 120, or based on a handshake exchange between the first TX 110 and the first RX 130, as described with reference to FIG. 5, as illustrative, non-limiting embodiments. When reuse is not permitted, the reuse TX 140 may defer to the first TXOP 222 (e.g., may not second the second message 150 during the first TXOP 222. When the reuse TX 140 determines that reuse of the first TXOP is permitted, the reuse TX 140 may determine whether to reuse the first TXOP. When the reuse TX 140 determines to reuse the first TXOP, the reuse TX 140 may transmit the second message 150 at a third time (ta3) during the first TXOP.

Additionally or alternatively, prior to transmitting the second message 150, the reuse TX 140 and the reuse RX 160 may optionally perform a handshake exchange to determine whether the reuse TX 140 should reuse the first TXOP 222. During the handshake exchange, the reuse TX 140 may transmit a request to send (RTS) message 262 to the reuse RX 160 and the reuse RX 160 may transmit a clear to send (CTS) message 264 to the reuse TX 140, as described further herein. For example, the RTS message 262 may indicate that the reuse TX 140 requests to reuse the first TXOP 22 and the reuse RX 160 may transmit the CTS message 264 to indicate that the reuse TX 140 may reuse the first TXOP 222. Alternatively, if the reuse RX 160 disagrees with the decision to reuse the first TXOP 222, the reuse RX 160 may not send the CTS message 264 to the reuse TX 140, and the reuse TX 140 may interpret the absence of the CTS message 264 as a sign that the reuse RX 160 is restricting/preventing reuse of the first TXOP 222. To illustrate, the reuse RX 160 may determine not to permit TXOP reuse based on one or more conditions (e.g., one or more rules) and may not send the CTS message 264 based on a determination not to permit TXOP reuse. For example, the one or more conditions may include whether a NAV honored by the reuse RX 160 is set by the first TXOP 110, whether the reuse RX 160 received an indication that TXOP reuse is permitted, based on measured or estimated interference levels, based on historical data, based on previously detected packets (e.g., previously detected RTS and/or CTS messages), etc. Alternatively, instead of omitting the CTS message 264, the reuse RX 160 may indicate that TXOP reuse is not permitted by setting a particular value of one or more bits in the CTS message 264. When the handshake exchange is performed between the reuse TX 140 and the reuse RX 160, a NAV associated with RTS/CTS (e.g., a NAV set by the reuse TX 140) may be aligned to an end of the first TXOP 222, such that the NAV does not exceed the first TXOP 222.

At the third time (ta3), the reuse TX 140 may initiate transmission of the second message 150. The second message 150 may include a second control portion 254 and second data 256. The second control portion 254 may be a portion of the second message 150 that is detectable (and decodable) by one or more devices, such as the first TX 110, the first RX 130, and/or the reuse RX 160. For example, the second control portion 254 may be associated with a preamble or PLCP data of the second message 150 and may indicate a device (e.g., the reuse RX 160) to which the second message 150 is addressed, a device (e.g., the reuse TX 140) that transmits the second message 150, a duration of a second TXOP 272, and/or whether reuse of the second TXOP 272 is permitted, as illustrative, non-limiting examples.

At a fourth time (ta4), the reuse TX 140 may begin transmitting the second data 256 to the reuse RX 160. The second data 256 may begin at the same time as or after the second TXOP 272 begins. In a particular embodiment, the second data 256 may be encrypted so that the second data 256 may not be detectable by devices other than an intended device (e.g., the reuse RX 160).

At a fifth time (ta5), transmission of the first message 120 and the second message 150 may end. Although the first message 120 and the second message 150 (e.g., the first TXOP 222 and the second TXOP 272) are illustrated in FIG. 2 as ending at the same time, the first message 120 and the second message 150 may end at different times, such that the second message 150 does not end after the first TXOP 222 ends. Additionally, the first TXOP 222 and the second TXOP 272 may be aligned so that the second TXOP 272 does not exceed the first TXOP 222. For example, the reuse TX 140 may set the second TXOP 272 (e.g., a duration of the second TXOP 272) to occur during the first TXOP 222, but not to exceed the first TXOP 222.

A time period during which the reuse TX 140 is communicating (e.g., transmitting the second message 150) during the first TXOP 222 may be referred to as a reuse TXOP 270. Although the reuse TXOP 270 is illustrated in FIG. 2 as beginning at the third time (ta3), the reuse TXOP 270 may include the handshake exchange between the reuse TX 140 and the reuse RX 160 and may being at a time between the second time (ta2) and the third time (ta3). For example, the reuse TXOP 270 may be based on a NAV set by the reuse TX 140.

In a particular embodiment, the first TX 110 may determine whether to permit reuse of the first TXOP 222 based on whether a link associated with the first TX 110 can tolerate interference from another link. For example, when the first TX 110 is included in a BSS, the first TX 110 may determine whether a link associated with the BSS can tolerate one or more other links associated with a different network, such as an overlapping BSS (OBSS) or a peer-to-peer (P2P) network, as illustrative, non-limiting examples. The first TX 110 may determine whether the link associated with the first TX 110 can tolerate interference from another link based on a signal level of the link, such as a signal level between the first TX 110 and the first RX 130. The signal level of the link may be determined at the first TX 110 based on an uplink signal, a downlink signal, a signal to noise ratio (SNR), or a received signal strength indication (RSSI), as illustrative, non-limiting examples. The first TX 110 may compare the signal level to a threshold associated with an amount of acceptable (e.g., tolerable) interference. Alternatively or additionally, the first TX 110 may determine whether the link associated with the first TX 110 can tolerate interference from another link based on a difference between the signal level of the link and an interference level associated with the other link.

As another example, the first TX 110 may permit reuse of the first TXOP 222 in an opportunistic manner. For example, the first TX 110 may permit reuse of the first TXOP 222 based on historical data regarding previous TXOP reuse permitted by the first TX 110. To illustrate, each time the first TX 110 permits reuse of a TXOP, the first TX 110 may determine (e.g., measure) an interference level during the reuse. The first TX 110 may store the determined interference level (e.g., a transmission performance) at a memory of the first TX 110 for later use. Accordingly, the first TX 110 may determine whether to permit reuse of the first TXOP 222 based on a history of past transmission performance. In a particular embodiment, the first TX 110 may calculate the CCA threshold based on one or more margins, such as one or more margins associated with channel dynamics and CCA measurement uncertainties. The one or more margins may be adjusted based on the historical data maintained at the first TX 110. For example, the first TX 110 may generate and maintain the historical data based on data transmitted or received by the first TX 110. In another particular embodiment, the reuse TX 140 may adjust the CCA threshold indicated by the first TX 110 based on a transmit power of the reuse TX 140 relative to a default transmit power, such as a difference of the transmit power of the reuse TX 140 and the default transmit power. For example, the reuse TX 140 can adjust the CCA threshold based on the formula:

$$\text{CCA threshold\_adj} = \text{CCA threshold\_FirstControlPortion} - (\text{TXPower\_reuseTX} - \text{Default TX Power}),$$

where CCA threshold_adj is the adjusted CCA threshold, CCA threshold_FirstControlPortion is the CCA threshold indicated by the first control portion 224 (e.g., the first message 120), TXPower_reuseTX is the transmit power of the reuse TX 140, and Default TX Power is the default transmit power.

In a particular embodiment, the first TX 110 may determine whether to define a reuse CCA threshold for use by the reuse TX 140. When the first TX 110 decides not to define a reuse CCA threshold, the reuse TX 140 may use a default CCA threshold to determine whether to reuse the first TXOP 222. For example, the reuse TX 140 may be configured to use a default CCA threshold having a value defined by a standard, such as a value of −62 dBm or −82 dBm (where dBm is a power ratio in decibels (dB) of a measured power referenced to one milliwatt (mW)). When the first TX 110 decides to define a (non-default) reuse CCA threshold, the first control portion 224 may indicate the reuse CCA threshold (e.g., as an absolute reuse CCA threshold value or as an offset (e.g., delta) value to be added to or subtracted from a default CCA threshold value). For example, the default CCA threshold may be associated with a default transmit power used by the first TX 110 and the first TX 110 may define a different (e.g., lower) reuse CCA threshold when the first TX 110 uses less power than the default transmit power.

In a particular embodiment, when the first TX 110 decides not to use the default CCA threshold or when there is no default CCA threshold available, the first TX 110 may (dynamically) determine the reuse CCA threshold to be used by the reuse TX 140. For example, the first TX 110 may select the reuse CCA threshold by determining how much interference a link associated with the first TX 110 can tolerate, such as a link between the first TX 110 and the first RX 130. The first TX 110 may select the reuse CCA threshold based on how much interference a link associated with the first TX 110 can tolerate. To illustrate, when the first TX 110 is included in a BSS, the first TX 110 may determine whether a link associated with the first TX 110 can tolerate one or more other links of a different network, such as an overlapping BSS (OBSS) or a peer-to-peer (P2P) network. The first TX 110 may determine whether the link associated with the first TX 110 can tolerate interference from another link based on a signal level associated with the link, such as a link between the first TX 110 and the first RX 130. The signal level of the link may be determined at the first TX 110 based on an uplink signal, a downlink signal, a signal to noise ratio (SNR), or a received signal strength indication (RSSI), as illustrative, non-limiting examples. The first TX 110 may compare the signal level to one or more thresholds that each correspond to a different reuse CCA threshold. Additionally or alternatively, the first TX 110 may select the reuse CCA threshold based on a difference between the signal level of the link and an interference level based on another network.

As another example, the reuse CCA threshold may be determined in an opportunistic manner. For example, the first TX 110 may determine the reuse CCA threshold based on a previous reuse CCA threshold, such as the default CCA threshold, one or more defined reuse CCA thresholds, or a combination thereof. To illustrate, the first TX 110 may specify a particular reuse CCA threshold to be used by the reuse TX 140. The first TX 110 may determine whether the particular CCA threshold resulted in satisfactory performance in the past (e.g., an amount of interference that is less than an acceptable threshold). If the particular reuse CCA resulted in satisfactory performance, the first TX 110 may selected the particular reuse CCA threshold to be used again. If the particular reuse CCA did not result in satisfactory performance, the first TX 110 may adjust the particular reuse CCA threshold and provided the adjusted reuse CCA threshold to be used by the reuse TX 140.

In a particular embodiment, the first TX 110 may determine the CCA threshold based on a MCS, a link budget (e.g., an expected received signal to noise ratio between the first TX 110 and the first RX 130), or a combination thereof. Additionally or alternatively, a transmit power level used by the first TX 110 may be taken into account when the first TX 110 determines the CCA threshold. For example, the first TX 110 may determine an initial CCA threshold and may adjust the initial CCA threshold based on the transmit power level of the first TX 110 to determine the CCA threshold. To illustrate, the first TX 110 may determine the initial CCA threshold based on a default transmit power value and may adjust the initial CCA threshold based on the (actual) transmit power level used to transmit the first message 120.

In a particular embodiment, the reuse TX 140 may determine whether to reuse the first TXOP based on whether the first message 120 (e.g., a PPDU) is addressed to the reuse TX 140, whether a destination (e.g., a destination address) of the first message 120 (e.g., the PPDU) is the same as a destination of the second message 150, whether the second message 150 is addressed to the first TX 110 or to the first RX 130, whether a signal strength of the first message 120 sent by the first TX 110 and measured by the reuse TX 140 satisfies (e.g., is less than or equal to) a reuse clear channel access (CCA) threshold, or, if there is an honored network allocation vector (NAV), may determine whether the NAV was set by a frame sent by the first TX 110, as illustrative, non-limiting examples. The destination of the first message 120 may be determined by the reuse TX 140 based on the first control portion 224. For example, the first control portion 224 may indicate a transmitter address (TA) associated with the first TX 110, may indicate a receiver address (RA) associated with the first RX 130, or may identify the first TX 110 or the first RX 130, as described with reference to FIG. 10. The reuse CCA threshold may be indicated by the first control portion 224 or may be the default CCA threshold. For example, the reuse TX 140 may determine whether the first control portion 224 identifies the reuse CCA threshold. When the first control portion 224 does not identify the reuse CCA threshold, the reuse TX 140 may use the default CCA threshold. When the first control portion 224 identifies the reuse CCA threshold, the reuse TX 140 may compare a signal strength of the first TX 110 to the reuse CCA threshold indicated by the first control portion 224. To illustrate, the reuse TX 140 may determine the signal strength of the first TX 110 based on the first control portion 224 and may determine to reuse the first TXOP 222 when the signal strength of the first TX 110 is less than the reuse CCA threshold.

In a particular embodiment, the reuse TX 140 may determine whether to reuse the first TXOP 222 based on whether a transmission, such as the second message 150, from the reuse TX 140 can tolerate interference from the first TX 110. For example, the reuse TX 140 may determine an interference level associated with the first TX 110. The interference level associated with the first TX 110 may be based on the first control portion 224, the first data 226, or another transmission by the first TX 110. To illustrate, the first TX 110 and the first RX 130 may be in a first BSS and the reuse TX 140 and the reuse RX 160 may be in a second BSS that is an overlapping BSS (OBSS) with respect to the first BSS. Accordingly, the reuse TX 140 may determine whether the second message 150 transmitted in the OBSS can tolerate interference caused by the first TX 110 in the first BSS, such as interference caused by transmission of the first message 120.

As another example, the reuse TX 140 may determine whether the transmission, such as the second message 150, can tolerate interference from the first TX 110 based on a physical proximity of the reuse TX 140 to the reuse RX 160. The reuse TX 140 may determine how close the reuse TX 140 is to the reuse RX 160 based on signal level of a link between the reuse TX 140 and the reuse RX 160. The reuse TX 140 may determine the signal level of the link between the reuse TX 140 and the reuse RX 160 based on an uplink signal, a downlink signal, a signal to noise ratio (SNR), or a received signal strength indication (RSSI), as illustrative, non-limiting examples. The reuse TX 140 may compare the signal level to one or more thresholds to determine whether the reuse TX 140 and the reuse RX 160 are physically close enough so that the transmission from the reuse TX 140 to the reuse RX 160 can tolerate interference from the first TX 110. In a particular embodiment, the reuse TX 140 may refrain from performing TXOP reuse if the message to be transmitted by the reuse TX 140 during the proposed TXOP reuse is addressed to the first TX 110 or the first RX 130 (e.g., based on BSSID/PAID checks). Alternatively, the reuse TX 140 may reuse the TXOP to send a message addressed to a device other than the first TX 110 or the first RX 130.

As another example, the reuse TX 140 determine whether the reuse TX 140 can tolerate interference from the first TX 110 in an opportunistic manner based on a history of reusing TXOPs. Each time the reuse TX 140 performs a TXOP reuse, the reuse TX 140 may determine (e.g., measure) a performance of the reuse. For each reuse, the reuse TX 140 may determine and record one or more performances parameters (e.g., historical data), such as an interference level during the reuse, whether the message transmitted during the reuse was successful, or another performance parameter, as illustrative, non-limiting examples. The reuse TX 140 may store the performance parameters at a memory of the reuse TX 140 for later use. For example, the reuse TX 140 may calculate a number of successful transmissions, a rate of successful transmissions, and/or an average interference level based on the stored performance parameters. The reuse TX 140 may determine whether the reuse TX 140 can tolerate interference from the first TX 110 based on the stored performance parameters. If the reuse TX 140 determines, based on the stored performance data, that the reuse TX 140 can tolerate the interference, and the reuse TX 140 may reuse the first TXOP 222 to transmit the second message 150. If the reuse TX 140 determines, based on the stored performance data, that the reuse TX 140 cannot reuse the TXOP, the reuse TX 140 may refrain from reusing of the first TXOP 222.

Additionally or alternatively, the reuse TX 140 may perform a handshake exchange to determine whether the reuse TX 140 can tolerate interference from the first TX 110. For example, the reuse TX 140 may initiate the handshake exchange and send the RTS message 262 based on a determination that the reuse TX 140 can tolerate interference from the first TX 110. The RTS message 262 may include a bit (or multiple bits) having a value that indicates that the reuse TX is considering reusing the first TXOP 222. The handshake exchange may provide the reuse RX 160 an opportunity to allow or not allow the reuse TX 140 to reuse the first TXOP 222. For example, the reuse RX 160 may allow or not allow the reuse TX 140 to reuse the first TXOP 222 by setting a value of a bit (or multiple bits) of the CTS message 264. Additionally or alternatively, the reuse RX 160 may allow the reuse TX 140 to reuse the first TXOP 222 by sending the CTS message 264, and may not allow the reuse TX 140 to reuse the first TXOP 222 by refraining from sending the CTS message 264 to the reuse TX 140.

In a particular embodiment, the reuse RX 160 may determine to not allow the reuse TX 140 to reuse the first TXOP 222 if the reuse RX 160 honored a particular NAV that was not set by the first TX 110. Additionally or alternatively, the reuse RX 160 may determine to not allow the reuse TX 140 to reuse the first TXOP 222 based on a level of interference detected at the reuse RX 160 or based on one or more CCA thresholds applied at the reuse RX 160.

In a particular embodiment, the reuse TX 140 aligns an end of the reuse TXOP 270 (e.g., an end of the second TXOP 272) with an end of the first TXOP 222. For example, the reuse TX 140 may align the end of the reuse TXOP 270 (e.g., the end of the second TXOP 272) to not exceed the end of the first TXOP 222. By aligning the end of the reuse TXOP (e.g., the end of the second TXOP 272) with the end of the first TXOP 222, the reuse TX 140 may prevent out-of-sync transmissions which could lead to collisions in one or more subsequent transmissions, such as one or more subsequent transmission by the first TX 110, the first RX 130, the reuse TX 140, or the reuse RX 160. To align the end of the reuse TXOP 270 (e.g., the end of the second TXOP 272) with the first TXOP 222, the reuse TX 140 may determine a duration of the first TXOP 222. For example, the reuse TX 140 may determine the duration of the first TXOP 222 based on an L-SIG field associated with the first message 120, such as a legacy signal (L-SIG) field included in PLCP data of the first message 120. As another example, if the first TX 110 and the first RX 130 perform a handshake exchange, as described with reference to FIG. 5, the reuse TX 140 may determine the duration of the first TXOP 222 based on a difference between a NAV associated with the handshake exchange and a constant value, such as a constant equal to a sum of a short interframe space (SIFS) and a block acknowledgement (BA) time.

In a particular embodiment, the first RX 130 may transmit a first block acknowledgement (BA) associated with the first message 120 to the first TX 110, the reuse RX 160 may transmit a second BA associated with the second message to the reuse TX 140, or a combination thereof. The first TX 110 or the reuse TX 140 may indicate a time (or a time period) when the second BA is to be communicated (e.g., indicate how the first BA and the second BA are arranged), as described further with reference to FIG. 9.

FIG. 2 thus illustrates various protocol implementations for TXOP reuse. Multiple levels of protection may be built into the protocol to prevent the reuse TX 140 from reusing the first TXOP 222 if the proposed communication during the reuse TXOP 270 would cause interference to data being communicated during the first TXOP 222. As a first level of protection, the first TX 110 and/or the first RX 130 may elect to not permit TXOP reuse based on interference tolerance, historical data, etc. As a second level of protection, even if the first message 120 indicates that TXOP reuse is permitted, the reuse TX 140 may nonetheless elect not to reuse the first TXOP 222 based on interference levels, CCA thresholds, historical data, etc. As a third level of protection, if the reuse TX 140 elects to reuse the first TXOP 222, the reuse RX 160 may override the reuse TX (e.g., via the CTS message 264). Depending on the specific protocol implementation, one or more of the aforementioned levels or protection may be applied. Further variations of the protocol are further described herein.

Figure 3:
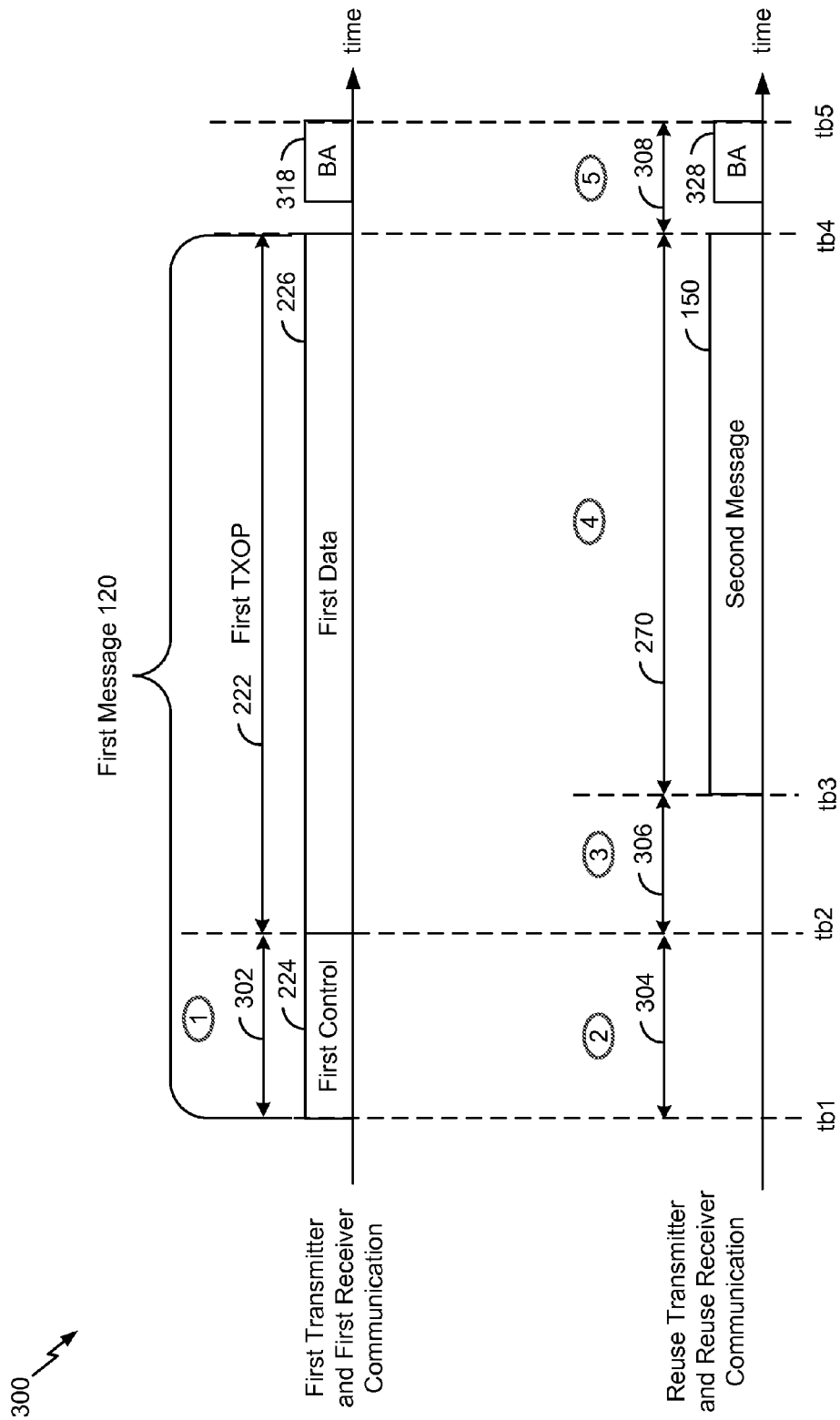
FIG. 3 is a timing diagram of a second illustrative example of reuse of a TXOP.

FIG. 3 is a timing diagram 300 to illustrate a first illustrative example of reuse of a TXOP as described with reference to FIG. 2.

During a first time period (denoted "1" in FIG. 3) between a first time (tb1) and a second time (tb2), a reusability of the first TXOP 222 may be signaled, at 302. For example, reuse of the first TXOP 222 may be signaled based on one or more bits included in the first control portion 224, such as one or more bits of a preamble of the first message 120. Although the first time period (1) is illustrated as beginning at the first time (tb1), the first time period (1) may begin prior to the first time (tb1). For example, reuse of the first TXOP 222 may be signaled by a management message sent (e.g., broadcast) by the first TX 110 prior to a transmission of the first message 120. As another example, reuse of the first TXOP 222 may be signaled by another device (e.g., a control device, such as an access point of the system 100).

During a second time period (2) between the first time (tb1) and the second time (tb2), a reusability determination may be made by the reuse TX 140, at 304. The reusability determination may include determining whether reuse of the first TXOP 222 is permitted, determining whether the reuse TX 140 is going to reuse the first TXOP 222, or a combination thereof. Although the second time period (2) is illustrated as beginning at the first time (tb1) and ending at the second time (tb2), the second time period (2) may begin prior to the first time (t1) or may end subsequent to the second time (t2).

During a third time period(3) between the second time (t2) and a third time (tb3), one or more reuse deferral rules may be applied by the reuse TX 140, at 306. The reuse deferral rules may enable the reuse TX 140 to defer reuse of the first TXOP 222 to another device, as described further with reference to FIG. 8. Although the third time period(3) is illustrated as beginning at the second time (t2) and ending at the third time (tb3), the third time period(3) may begin before or after the second time (t2), may end prior to the third time (tb3), or a combination thereof.

During a fourth time period (4) between the third time (tb3) and a fourth time (tb4), the reuse TXOP 270 may occur. During a fifth time period (5) between the fourth time (tb4) and a fifth time (tb5), one or more block acknowledgements (BAs) may be communicated, at 308. For example, a first BA 318 associated with the first message 120 may be received by the first TX 110, a second BA 328 associated with the second message 150 may be received by the reuse TX 140, or a combination thereof. The first BA 318 and the second BA 328 may be aligned in time, as shown in FIG. 3, or may be offset, as described further with reference to FIG. 9.

Figure 4:
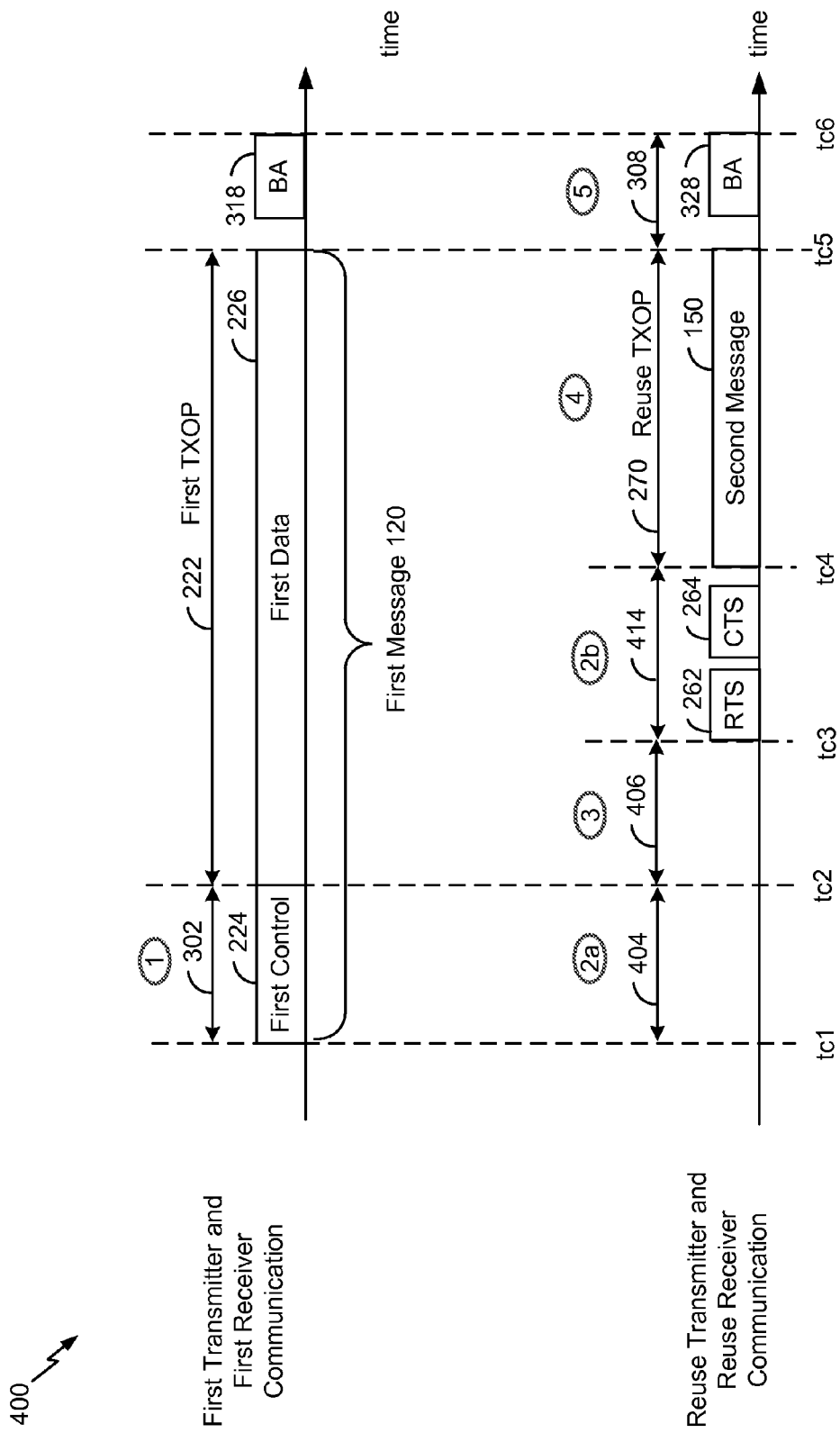
FIG. 4 is a timing diagram of a third illustrative example of reuse of a TXOP.

FIG. 4 is a timing diagram 400 to illustrate a second illustrative example of reuse of a TXOP as described with reference to FIG. 2.

During a first time period (1) between a first time (tc1) and a second time (tc2), a reusability of the first TXOP 222 may be signaled, at 302. During a first portion of a second time period (2a) between the first time (tc1) and the second time (tc2), a reusability determination may be made by the reuse TX 140, at 404. The reusability determination may include determining whether reuse of the first TXOP 222 is permitted, determining whether the reuse TX 140 is going to reuse the first TXOP 222, or a combination thereof. Although first portion of the second time period (2a) is illustrated as beginning at the first time (tc1) and ending at the second time (tc2), the first portion of the second time period (2) may begin prior to the first time (tc1), may end subsequent to the second time (tc2), or a combination thereof.

During a third time period(3) between the second time (tc2) and a third time (tc3), one or more reuse deferral rules may be applied by the reuse TX 140, at 406. Application of deferral rules is described further with reference to FIG. 8. Although the third time period(3) is illustrated as beginning at the second time (tc2) and ending at the third time (tc3), the third time period(3) may begin before or after the second time (tc2), may end prior to the third time (tc3), or a combination thereof.

During a second portion of a second time period (2b) between the third time (tc3) and a fourth time (tc4), one or more additional reusability determinations may be made by the reuse TX 140, at 414. The one or more additional reusability determinations may include determining whether reuse of the first TXOP 222 is allowed by the reuse RX 160. For example, the reuse TX 140 may initiate a handshake exchange that includes the RTS message 262 and the CTS message 264. Receipt of the CTS message 264 and/or a value of one or more bits in the CTS message 264 may indicate that the reuse RX 160 is allowing reuse of the first TXOP 222.

During a fourth time period (4) between the fourth time (tc4) and a fifth time (tc5), the reuse TXOP 270 may occur. During a fifth time period (5) between the fifth time (tc5) and a sixth time (tc6), one or more block acknowledgements (BAs) may be received, at 308, as described further with reference to FIG. 9.

FIG. 5 is a timing diagram to illustrate a second example of reuse of a TXOP and is generally designated 500.

At a first time (td1), the first TX 110 may begin a handshake exchange with the first RX 130. The handshake exchange may be associated with and precede transmission of the first message 120. As part of the handshake exchange, the first TX 110 may send a RTS message 532 to the first RX 130 and the first RX 130 may send a clear to send (CTS) message 534 to the first TX 110. The CTS message 534 may be responsive to the RTS message 532 and may include protection information associated with the first message 120. The RTS message 532 and the CTS message 534 may be detectable (and decodable) by one or more devices, such as the first RX 130, the reuse TX 140, the reuse RX 160, or a combination thereof. The handshake exchange (e.g., the RTS message 532 and the CTS message 534) may be associated with a network allocation vector (NAV) that is aligned with an end of the first TXOP 222. The NAV may be set by the first TX 110 and may be honored by one or more other devices, such as the first receiver 130, the reuse TX 140, the reuse RX 160, or a combination thereof.

The RTS message 532 may include an RX indicator, a modulation and coding scheme (MCS) indicator, or a combination thereof. The RX indicator may dictate whether the first RX 130 is to generate an RX CCA threshold, as described further herein. The RX CCA threshold may be associated an amount of interference that the first RX 130 can tolerate, such as an amount of interference that can be tolerated during the transmission of the first message 120. The MCS indicator may be an index value that identifies a MCS to be used during transmission of the first message 120. The RX indicator, the MCS indicator, or a combination thereof may be indicated by one or more bits of the RTS message 532, as described further herein.

The CTS message 534 may include an RX CCA threshold indicator, an MCS indicator, or a combination thereof. For example, the CTS message 534 may include one or more bits that indicate a value of the RX CCA threshold, an MCS index, or a combination thereof. The RX CCA threshold may be determined by the first RX 130 and may be associated with an amount of inference (e.g., an interference level) that the first RX 130 can tolerate. In a particular embodiment, the RX CCA threshold may be determined by the first RX 130 responsive to the RTS message 532 (e.g., responsive to the RX indicator). For example, the first RX 130 may receive the RTS message 532 and determine whether a value of the RX indicator requests that the first RX 130 determines the RX CCA threshold.

In a particular embodiment, the RX CCA threshold determined by the first RX 130 may be based on a MCS, such as a particular MCS to be used by the first TX 110. For example, to calculate the RX CCA threshold, the first RX 130 may identify the MCS. The MCS may be identified as a default MCS (as defined by a standard, such as an IEEE 802.11 standard), may be based on the MCS indicator included in the RTS message 532, or may be determined by the first RX 130 based on historical data (e.g., past performance data) stored at the first RX 130. Based on the identified MCS, the first RX 130 may determine the RX CCA threshold. To illustrate, the first RX 130 may be able to tolerate more interference when the MCS is low.

At a second time (td2), the first TX 110 may begin transmitting the first message 120 to the first RX 130. At a third time (td3), the first TX 110 may begin transmitting the first data 226 to the first RX 130. A transmission of the first data 226 may coincide with a beginning of the first TXOP 222.

The reuse TX 140 may determine whether to reuse the first TXOP 222 to transmit the second message 150, as described further herein. For example, the reuse TX 140 may determine whether to reuse the first TXOP 222 prior to the first TXOP 222 beginning or during the first TXOP 222. When the reuse TX 140 determines not to reuse the first TXOP 222, the reuse TX 140 may defer to the first TXOP 222 (e.g., may not send the second message 150 during the first TXOP 222). When the reuse TX 140 determines to reuse of the first TXOP 222, the reuse TX 140 may transmit the second message 150 at a fourth time (td4).

The reuse TX 140 may determine to reuse the first TXOP 222 based on whether reuse of the first TXOP 222 is permitted, based on whether a CCA level of the CTS message 564 is less than the RX CCA threshold, based on whether a CCA level of first TX 110 is less than the reuse CCA threshold indicated by the first TX 110, based on whether the first message 120 is addressed to the reuse TX 140 or the reuse RX 160, based on whether the second message 150 is addressed to the first TX 110 or the first RX 130, or if there is honored an NAV, whether the NAV was sent by the first TX 110 or the first RX 130, as illustrative, non-limiting examples. For example, the reuse TX 140 may not reuse the first TXOP 222 when reuse of the first TXOP 222 is not permitted, when the CCA level of the CTS message 564 is greater than or equal to the RX CCA threshold, when the CCA level of the first TX 110 is greater than or equal to the reuse CCA threshold, when the first message 120 is addressed to the reuse TX 140 or the reuse RX 160, when the second message 150 is addressed to the first TX 110 or the first RX 130, or when there is an honored NAV that was send by a device other than the first TX 110 or the first RX 130.

The CTS message 564 may indicate whether the reuse TX 140 may reuse the first TXOP 222. For example, the reuse RX 160 may indicate that reuse TX 140 can reuse the first TXOP based on whether the reuse RX 160 can tolerate interference from the first TX 110 or the first RX 130. The reuse RX 160 can determine whether the reuse RX 160 can tolerate interference from the first TX 110 based on the reuse CCA threshold (e.g., a default CCA threshold or a particular CCA threshold indicated by the first control portion 224). The reuse RX 160 can determine whether the reuse RX 160 can tolerate interference from the first RX 130 based on whether a CCA level of the CTS message 534 satisfies the RX CCA threshold associated with the first RX 130 (e.g., the RX CCA threshold indicated by the CTS message 534). The reuse RX 160 may indicate that reuse TX 140 may reuse the first TXOP 222 by sending the CTS message 564 to the reuse TX 140 (e.g., by setting a value of one or more bits of the CTS message 564 to indicate that the reuse TX 140 may reuse the first TXOP 222). Alternatively, the reuse RX 160 may indicate that reuse TX 140 may reuse the first TXOP 222 by not sending the CTS message 564 to the reuse TX 140 or by sending the CTS message 564 to the reuse TX and setting a value of the one or more bits to indicate that the reuse TX 140 may not reuse the first TXOP 222.

At a fourth time (td4), the reuse TX 140 may initiate transmission of the second message 150. At a fifth time (td5), transmission of the first message 120 and the second message 150 may end. Although the first message 120 and the second message 150 (e.g., the first TXOP 222 and the second TXOP 272) are illustrated as ending at the same time, the first message 120 and the second message 150 may end at different times, such that the second message 150 does not end after the first TXOP 222 ends. Additionally, the first TXOP 222 and the second TXOP 272 may be aligned so that the second TXOP 272 does not exceed the first TXOP 222. For example, the reuse TX 140 may set the second TXOP 272 (e.g., a duration of the second TXOP 272) to occur during the first TXOP 222, but not to exceed the first TXOP 222.

In a particular embodiment, the first TX 110 may determine whether or not to permit reuse of the first TXOP 222 based on historical data. For example, the first TX 110 may generate and maintain the historical data based on one or more messages transmitted by the first TX 110 (e.g., one or more messages having TXOP reuse permitted). The first TX 110 can disable the reuse if the historical data indicates that reuse is causing too much interference during the one or more transmissions from the first TX 110. The first TX 110 may indicate that TXOP reuse is permitted by sending a management message, by setting a value of the RX indicator included in the RTS message 532 to indicate that that the first RX 130 is to determine the RX CCA threshold, or by setting a value of the first control portion 224 to indicate TXOP reuse is permitted, as illustrative, non-limiting examples.

In another particular embodiment, the CTS message 534 may be "bound" to the first message 120 (e.g., bound to the first data 226 of the first message 120), such that information included in the CTS message 534 is applied to the first message 120 (and not to another message). For example, any data that occurs after a short interframe space (SIFS) from the CTS message 534 may be used for binding. To illustrate, the data may include timing information that correlates the CTS message 534 to the first message 120. As another example, an occurrence of the first message 120 a SIFS time after the CTS message 534 may be interpreted as an implicit indication of the binding. As another example, the first message 120 (e.g., the first control portion 224, such as PLCP data) may include at least a portion of a transmitter address (TA) that may be used to match with a receiver address (RA) included in the CTS message 534 to correlate the first message 120 and the CTS message 534.

In another particular embodiment, a particular RTS message (e.g., the RTS message 532 or the RTS message 562) or a particular CTS message (e.g., the CTS message 534 or the CTS message 564) may include (or indicate) information, such as the RX indicator, the MCS indicator, or the RX CCA threshold, as illustrative, non-limiting examples. For example, the information may be included in (or indicated by) one or more bits in a MAC header, such as one or more bits of a service field of the MAC header. As another example, the information may be included in (or indicated by) one or more bits in a SIG filed of the particular RTS message or the particular CTS message.

In another embodiment, the first RX 130 may calculate the RX CCA threshold based on one or more margins, such as one or more margins associated with channel dynamics and CCA measurement uncertainties. The one or more margins may be adjusted based on the historical data maintained at the first RX 130. For example, the first RX 130 may generate and maintain the historical data based on data transmitted or received by the first RX 130.

In another particular embodiment, the first RX 130 may determine the RX CCA threshold based on a MCS, a link budget (e.g., an expected received signal to noise ratio between the first TX 110 and the first RX 130), or a combination thereof. Additionally or alternatively, a transmit power level used by first RX 130 may be taken into account when the first RX determines the RX CCA threshold. For example, the first RX 130 may determine an initial RX CCA threshold and may adjust the initial RX CCA threshold based on the transmit power level of the first RX 130 to determine the RX CCA threshold. To illustrate, the first RX 130 may determine the initial RX CCA threshold based on a default transmit power value and may adjust the initial RX CCA threshold based on the (actual) transmit power level used to transmit the CTS message 534. For example, if the CTS message 534 is transmitted at 5 decibels (dB) higher than a default transmit power value, the RX CCA threshold may be determined by increasing the initial RX CCA threshold by 5 dB.

In another particular embodiment, the RTS message 532 transmitted by the first TX 110 may not indicate a MCS. When the RTS message 532 does not indicate the MCS, the CTS message 534 sent by the first RX 130 may indicate a particular MCS to be used by the first TX 110 to transmit the first message 120, may indicate the RX CCA threshold, or a combination thereof. For example, the particular MCS may be selected by the first RX 130. For example, the CTS message 534 may indicate the RX CCA threshold, which may be determined based on a default MCS (as defined by a standard). The reuse TX 140 may adjust the RX CCA threshold based on a particular MCS associated with the first message 120 (e.g., the particular MCS indicated by the first control portion 224 or the first data 226).

As an illustrative example, the CTS message 534 may indicate that the RX CCA threshold is −80 dBm, based on a default MCS index of zero. To illustrate, MCS tables may be defined by a standard, such as an 802.11 standard. Each MCS index may correspond to a particular combination of modulation and coding parameters. For example, a MCS index of zero (e.g., MCS0) may correspond to binary phase shift keying (BPSK) modulation with a coding rate of 1/2. After the CTS message 534 is transmitted, the reuse TX 140 may determine that an actual MCS used by the first TX 110 to transmit at least a portion of the first message 120 corresponds to an adjustment of 10 dB relative to the default MCS. Accordingly, the reuse TX 140 may adjust the RX CCA threshold by adding 10 dB to generate an adjusted RX CCA threshold of −70 dBm. The reuse TX 140 may compare a signal level of the CTS message 534 received at the reuse TX 140 to the adjusted RX CCA threshold and, when the signal level is greater than the adjusted RX CCA threshold (e.g., −70 dBm), the reuse TX 140 may decide not to reuse the first TXOP 222 because the reuse TX 140 would create too much interference at the first RX 130.

In another particular embodiment, the reuse TX 140 may adjust the RX CCA threshold indicated in the CTS message 534 based on a transmit power of the reuse TX 140 relative to a default transmit power, such as a difference of the transmit power of the reuse TX 140 and the default transmit power. For example, the reuse TX 140 can adjust the RX CCA threshold based on the formula:

$$RX \text{ CCA threshold\_adj} = RX \text{ CCA threshold\_CTSmessage} - (TX\text{Power\_reuse}TX - \text{Default } TX \text{ Power}),$$

where RX CCA threshold_adj is the adjusted RX CCA threshold, RX CCA threshold_CTSmessage is the RX CCA threshold indicated by the CTS message 534, TXPower_reuseTX is the transmit power of the reuse TX 140, and Default TX Power is the default transmit power.

In a particular embodiment, the reuse TX 140 may determine that reuse of a TXOP is permitted based on the first control portion 224, based on a management message received from a device, such as the first TX 110, the first RX 130, or another device, based on a header associated with the first message 120, or based on the handshake exchange between the first TX 110 and the first RX 130, as illustrative, non-limiting embodiments. To determine whether reuse is permitted based on the handshake exchange, the reuse TX 140 may determine whether the RX indicator included in the RTS message 532 requests (e.g., dictates) the first RX 130 to determine the RX CCA threshold. If the RX indicator does not request the first RX 130 to determine the RX CCA threshold, the reuse TX 140 may determine that reuse of the first TXOP 222 is not permitted. Alternatively or additionally, the reuse TX 140 may determine whether reuse is permitted based on the handshake exchange by determining whether the CTS message 534 indicates the RX CCA threshold. If the CTS message 534 does not indicate the RX CCA threshold, the reuse TX 140 may determine that reuse of the first TXOP 222 is not permitted.

In a particular embodiment, when reuse of the first TXOP 222 is not permitted, a NAV associated with the first message 120 may be set according to an RTS/CTS message exchange between the first TX 110 and the first RX 130.

In a particular embodiment, reuse of the first TXOP 222 may not be allowed (e.g., permitted) if a NAV is set. In response to detecting, receiving, and/or correctly decoding a packet (e.g., a RTS message, a CTS message, a PPDU, a control/management frame, etc.) that indicates that reuse is not allowed (or in response to the reuse TX 140 determining without an explicit permission or explicit prohibition of reuse in the packet that reuse is not allowed), the reuse TX 140 may update the NAV. The reuse TX 140 may also update the NAV in response to a packet that is silent regarding TXOP reuse. In response to a packet that indicates that reuse is allowed (or in response to the reuse TX 140 determining without an explicit permission or explicit prohibition of reuse in the packet that reuse is allowed), the reuse TX 140 may maintain (e.g., not update) the NAV. The reuse TX 140 may update or maintain the NAV in response to determining whether TXOP reuse is permitted; the determination that the reuse is permitted may be based on a SIG field indication, a CCA threshold, etc., as described herein. If a NAV was previously set for a time exceeding a time of reception of the packet, the NAV may be maintained. Thus, in a particular embodiment, a packet may indicate whether reuse is allowed during its own duration, independent of the existence of a following (e.g., subsequent) TXOP, and TXOP reuse determination may be performed without maintaining state information (associated with TXOP reuse) other than the NAV.

As a first example, if the reuse TX 140 detects a RTS message permitting reuse and a CTS message prohibiting TXOP reuse, the reuse TX 140 may maintain a (e.g., previously set) NAV in response to the RTS message, update the NAV in response to the CTS message, and refrain from reusing the first TXOP 222 based on the updated NAV, which may begin at the time of the CTS message and continue during the first TXOP 222). As a second example, if the reuse TX 140 detects a RTS message prohibiting TXOP reuse and a CTS message permitting reuse, the reuse TX 140 may update a NAV in response to the RTS message, maintain the updated NAV in response to the CTS message, and refrain from reusing the first TXOP 222 based on the updated NAV, which may begin at the time of the RTS message and may continue during the first TXOP 222). As a third example, if the reuse TX 140 detects a RTS message permitting TXOP reuse and a CTS message permitting TXOP reuse, the reuse TX 140 may maintain a (e.g., previously set) NAV and may determine whether to reuse the first TXOP 222 based on the NAV.

In a particular embodiment, if neither the RTS message 532 nor the CTS message 534 is detected by the reuse TX 140, the reuse TX 140 may determine whether TXOP reuse is permitted and/or a duration of the first TXOP 222 based on the first message 120 (e.g., based on the first control portion 224). If the RTS message 532 is detected and the CTS message 534 is not detected, the reuse TX 140 may determine whether TXOP reuse is permitted and/or may determine a duration of the first TXOP 222 based on the first message 120 (e.g., based on the first control portion 224). Alternatively, if the RTS message 532 is detected and the CTS message 534 is not detected, the reuse TX 140 may determine not to reuse the first TXOP 222.

In a particular embodiment, if the RTS message 532 is not detected and the CTS message 534 is detected by the reuse TX 140, the reuse TX 140 may determine whether TXOP reuse is permitted and/or may determine a duration of the first TXOP 222 based on the first message 120 (e.g., based on the first control portion 224). Alternatively or additionally, the reuse TX 140 may determine whether TXOP reuse is permitted and/or may determine a duration of the first TXOP 222 based on the CTS message 534. For example, the CTS message 534 may indicate that TXOP reuse is permitted, timing information associated with the first message 120, and/or a NAV value. In a particular embodiment, if the RTS message 532 is not detected and the CTS message 534 is detected by the reuse TX 140, the reuse TX 140 may determine not to reuse the first TXOP 222.

Thus, depending on implementation, TXOP reuse permission and duration may be determined even when one or more of the RTS message 532, the CTS message 534, and the first control portion 224 are not detected. In a particular embodiment, the reuse TX 140 may determine that the reuse TX 140 did not detect the CTS message 534 because the first RX 130 is too far away from the reuse TX 140. To enable such a determination, the reuse TX 140 may keep track of relative positions and distances of other devices, based on measuring and tracking communications associated with the other devices. To illustrate, if the reuse TX 140 determines that a packet is sent to the first RX 130 and that an acknowledgement from the first RX 130 has a low signal strength, the reuse TX 140 may infer that the first RX 130 is far away.

In another particular embodiment, the reuse TX 140 may determine to reuse the first TXOP 222 based on a determination that the reuse RX 160 can tolerate interference generated by the first TX 110. For example, the reuse TX 140 may determine that the reuse RX 160 can tolerate interference generated by the first TX 110 based on a physical proximity of the reuse TX 140 to the reuse RX 160. The reuse TX 140 may determine how close the reuse TX 140 is to the reuse RX 160 based on signal level of a link between the reuse TX 140 and the reuse RX 160. The reuse TX 140 may determine the signal level of the link between the reuse TX 140 and the reuse RX 160 based on an uplink signal, a downlink signal, a signal to noise ratio (SNR), or a received signal strength indication (RSSI), as illustrative, non-limiting examples. The reuse TX 140 may compare the signal level to one or more thresholds to determine whether the reuse TX 140 and the reuse RX 160 are physically close enough so that the transmission from the reuse TX 140 to the reuse RX 160 can tolerate interference.

For example, the reuse TX 140 may determine that the reuse RX 160 can tolerate interference generated by the first TX 110 in an opportunistic manner based on a history of reusing TXOPs. When the reuse TX 140 performs a TXOP reuse, the reuse TX 140 may determine a performance of the reuse and record one or more performances parameters (e.g., historical data) at a memory of the reuse TX 140. The one or more performance parameters may include an interference level during the reuse, whether the message transmitted during the reuse was successful, or another performance parameter, as illustrative, non-limiting examples. The reuse TX 140 may determine whether the reuse RX 160 can tolerate interference from the first TX 110 based on the stored performance parameters, such as based on successful transmissions, a rate of successful transmissions, or an average interference level, as illustrative, non-limiting examples. If the reuse TX 140 determines, based on the stored performance data, that the reuse TX 140 can tolerate the interference, and the reuse TX 140 may reuse the first TXOP 222 to transmit the second message 150.

Additionally or alternatively, the reuse TX 140 may perform a handshake exchange to determine whether the reuse RX 160 can tolerate interference generated by the first TX 110. For example, the reuse TX 140 may initiate the handshake exchange and send the RTS message 562 based on a determination that the reuse RX 160 can tolerate interference from the first TX 110. The RTS message 562 may include a bit (or multiple bits) having a value that indicates that the reuse TX 140 is considering reusing the first TXOP 222. The handshake exchange may provide the reuse RX 160 an opportunity to allow or not allow the reuse TX 140 to reuse the first TXOP 222. For example, the reuse RX 160 may allow or not allow the reuse TX 140 to reuse the first TXOP 222 by setting a value of a bit (or multiple bits) of the CTS message 564. Additionally or alternatively, the reuse RX 160 may allow the reuse TX 140 to reuse the first TXOP 222 by sending the CTS message 564, and may not allow the reuse TX 140 to reuse the first TXOP 222 by refraining from sending the CTS message 564 to the reuse TX 140.

In a particular embodiment, the reuse RX 160 may determine to not allow the reuse TX 140 to reuse the first TXOP 222 if the reuse RX 160 honored a particular NAV that was not set by the first TX 110. Additionally or alternatively, the reuse RX 160 may determine to not allow the reuse TX 140 to reuse the first TXOP 222 based on a level of interference detected at the reuse RX 160 (e.g., such as an interference level from the first TX 110) or based on one or more CCA thresholds, such as the RX CCA threshold as compared to a CCA level of the first RX 130 (e.g., the CCA level of the first RX 130 detected at the reuse RX 160 based on the CTS message 534).

In a particular embodiment, the first RX 130 may communicate the RX CCA threshold (associated with the first message 120) to one or more devices without using the handshake exchange with the first TX 110 (e.g., without sending the CTS message 534). Additionally or alternatively, the reuse TX 140 may be able to determine an interference level (based on a transmission of the reuse TX 140) at the first RX 130 without the handshake exchange between the first TX 110 and the first RX 130. To enable the first RX 130 to communicate the RX CCA threshold without the handshake exchange or to enable the reuse TX 140 to determine the interference level without the handshake exchange, each packet transmitted by the first TX 110, the first RX 130, the reuse TX 140, or the reuse RX 160 may identify a transmit device and a receiver device associated with the packet, and may indicate whether a TXOP associated with the packet may be reused. For example, each packet may identify the transmit device and the receive device and/or may indicate that the TXOP associated with the packet may be reused based on one or more bits included in a SIG field of the packet. For each packet, the reuse TX 140 may generate historical statistics (e.g., historical data, such as performance parameters) by tracking the transmitter device and the receiver device of the packet and/or by tracking whether reuse of the TXOP associated with the packet is permitted. If the reuse TX 140 does not have sufficient historical statistics for the first TX 110 and the first RX 130, then the reuse TX 140 may not reuse the first TXOP 222.

Similarly, when a handshake exchange is not performed, the RX CCA threshold may be indicated by a SIG field associated with the first message 120. As another example, the first RX 130 may indicate the RX CCA threshold in a block acknowledgement (BA) transmitted by the first RX 130 (e.g., indicated based on one or more bits included in the BA). As another example, the first RX 130 may indicate the RX CCA threshold using one or more management messages sent by the first RX 130 to one or more devices within a transmission range of the first RX 130. Additionally or alternatively, the first RX 130 may periodically perform a handshake exchange with the first TX 110 to communicate the RX CCA threshold in a CTS message. For example, the periodic handshake exchange may be used once out of every ten transmissions. The RX CCA threshold communicated in the CTS message may be used until a new RX CCA threshold is communicated in a subsequent CTS message.

In a particular embodiment, the first RX 130 may provide interference information (e.g., an amount of interference detected at the first RX 130 due to a particular device, such as the reuse TX 140) using one or more management messages sent by the first RX 130 to one or more devices within a transmission range of the first RX 130. Additionally or alternatively, the reuse TX 140 may determine a CCA level of the first RX 130 based on one or more transmissions from the first RX 130, such as a block acknowledgement (BA) transmission. The reuse TX 140 may also determine an interference level of the reuse TX 140 at the first RX 130 based on a periodic handshake exchange between the first TX 110 and the first RX 130. For example, the periodic handshake exchange may be used once out of every ten transmissions.

FIG. 5 thus illustrates various protocol implementations for TXOP reuse. Based on a particular protocol implementation, the reuse TX 140 may receive the RX CCA threshold or may determine the interference level cause by the reuse TX 140 at the first RX 130. For example, the use of the handshake exchange (e.g., RTS/CTS messages) between the first TX 110 and the first RX 130 enable the first RX 130 to provide (e.g., communicate) the RX CCA threshold to one or more devices. Additionally, the handshake exchange between the first TX 110 and the first RX 130 may enable the reuse TX 140 to determine an interference level caused by the reuse TX 140 at the first RX 130. As another example, the RX CCA threshold may be provided and the interference level caused by the reuse TX 140 at the first RX 130 may be determined without use of the handshake exchange between the first TX 110 and the first RX 130. When the reuse TX 140 knows the RX CCA threshold or the interference level cause by the reuse TX 140 at the first RX 130, the reuse TX 140 may have more information to enable the reuse TX 140 to make decide whether or not to reuse the first TXOP 222.

Figure 6:
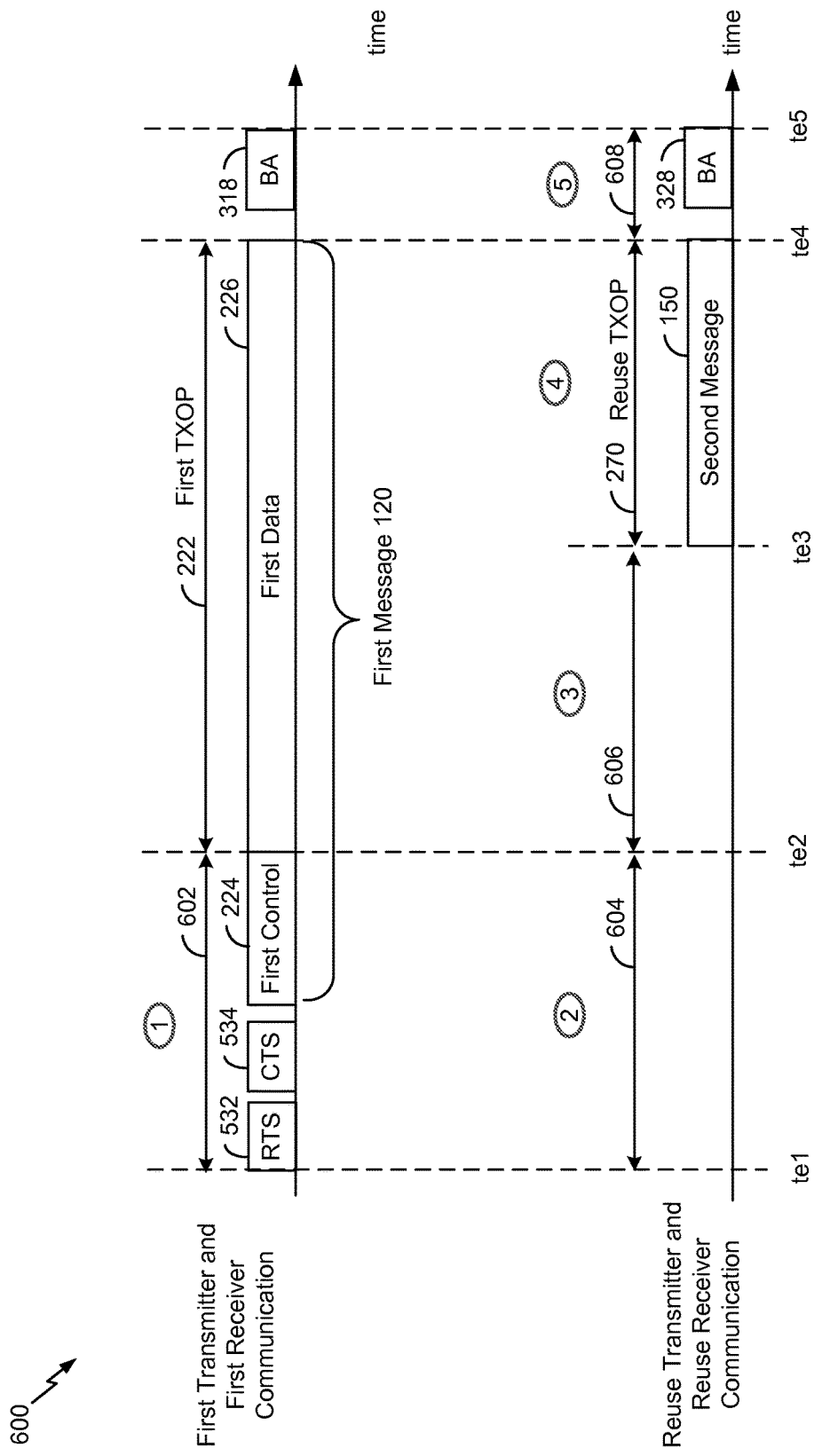
FIG. 6 is a timing diagram of a fifth illustrative example of reuse of a TXOP.

FIG. 6 is a timing diagram 600 to illustrate a first illustrative example of reuse of a TXOP as described with reference to FIG. 5.

During a first time period (1) between a first time (te1) and a second time (te2), a reusability of the first TXOP 222 may be signaled, at 602. For example, reusability of the first TXOP 222 may be signaled based on one or more bits included in the RTS message 532, one or more bits included in the CTS message 534, or one or more bits included in the first control portion 224. Although the first time period (1) is illustrated as beginning at the first time (te1), the first time period (1) may begin prior to the first time (te1). For example, reusability of the first TXOP 222 may be signaled by a management message sent (e.g., broadcast) by the first TX 110 prior to a transmission of the RTS message 532 (e.g., prior to the first message 120). As another example, reuse of the first TXOP 222 may be signaled by another device (e.g., a control device, such as an access point of the system 100).

During a second time period (2) between the first time (te1) and the second time (te2), a reusability determination may be made by the reuse TX 140, at 604. The reusability determination may include determining whether reuse of the first TXOP 222 is permitted, determining whether the reuse TX 140 is going to reuse the first TXOP 222, or a combination thereof. Although the second time period (2) is illustrated as beginning at the first time (te1) and ending at the second time (te2), the second time period (2) may begin prior to the first time (te1) or may end subsequent to the second time (te2).

During a third time period(3) between the second time (te2) and a third time (te3), one or more reuse deferral rules may be applied by the reuse TX 140, at 606. Although the third time period(3) is illustrated as beginning at the second time (te2) and ending at the third time (te3), the third time period(3) may begin before or after the second time (te2) and may end prior to the third time (te3).

During a fourth time period (4) between the third time (te3) and a fourth time (te4), the reuse TXOP 270 may occur. During a fifth time period (5) between the fourth time (te4) and a fifth time (te5), one or more block acknowledgements (BAs) may be communicated, at 608. For example, the first BA 318 associated with the first message 120 may be received by the first TX 110 and a second BA 328 associated with the second message 150 may be received by the reuse TX 140. The first BA 318 and the second BA 328 may be aligned in time, as shown in FIG. 6, or may be offset, as described further with reference to FIG. 9.

Figure 7:
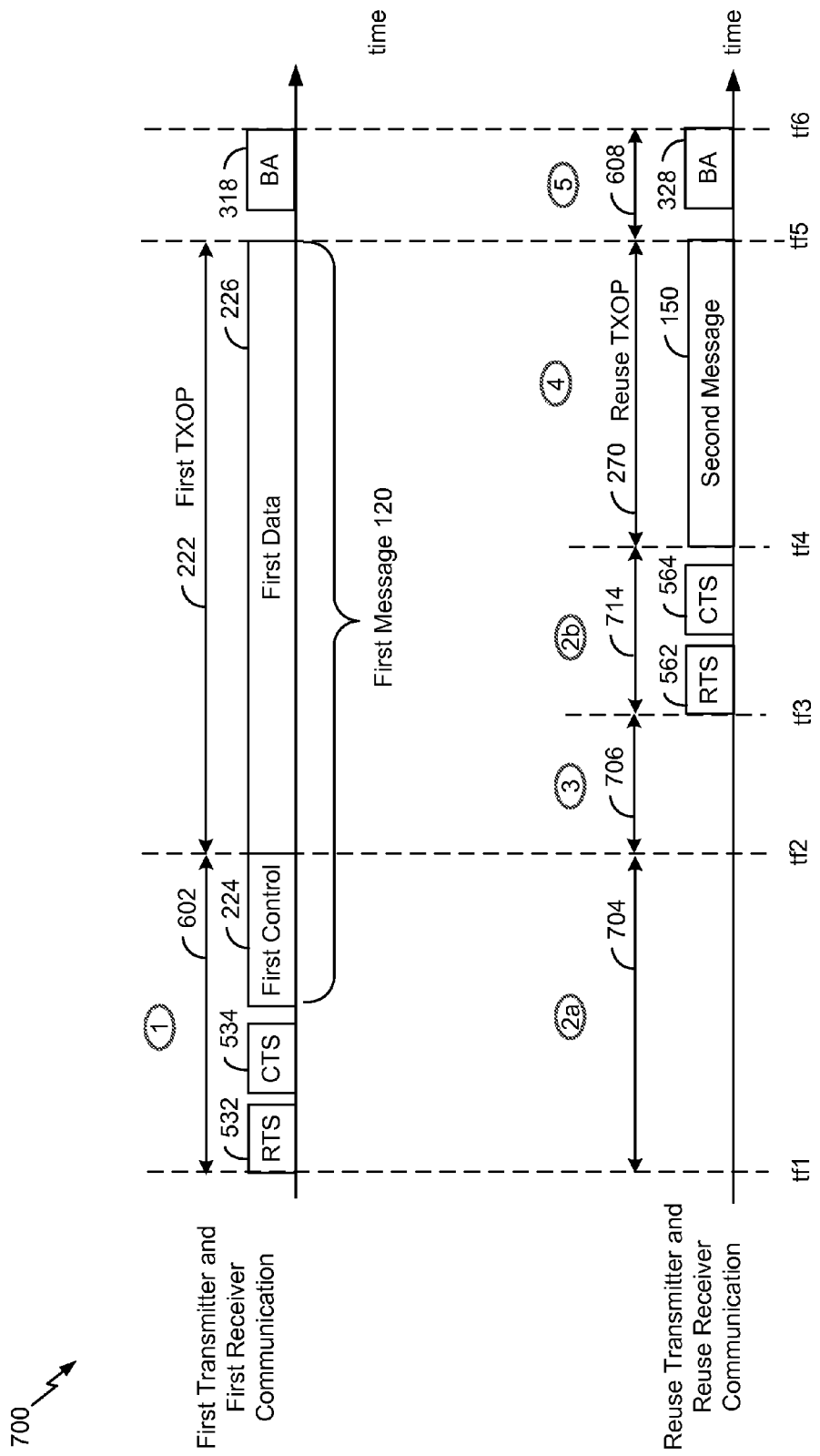
FIG. 7 is a timing diagram of a sixth illustrative example of reuse of a TXOP.

FIG. 7 is a timing diagram 700 to illustrate a second illustrative example of reuse of a TXOP as described with reference to FIG. 5.

During a first time period (1) between a first time (tf1) and a second time (tf2), a reusability of the first TXOP 222 may be signaled, at 602. During a first portion of a second time period (2a) between the first time (tf1) and the second time (tf2), a reusability determination may be made by the reuse TX 140, at 704. The reusability determination may include determining whether reuse of the first TXOP 222 is permitted, determining whether the reuse TX 140 is going to reuse the first TXOP 222, or a combination thereof. Although first portion of the second time period (2a) is illustrated as beginning at the first time (tf1) and ending at the second time (tf2), the first portion of the second time period (2a) may begin prior to the first time (tf1) or may end subsequent to the second time (tf2).

During a third time period(3) between the second time (tf2) and a third time (tf3), one or more reuse deferral rules may be applied by the reuse TX 140, at 706. Although the third time period(3) is illustrated as beginning at the second time (tf2) and ending at the third time (tf3), the third time period(3) may begin before or after the second time (tf2) or may end prior to the third time (tf3).

During a second portion of a second time period (2b) between the third time (tf3) and a fourth time (tf4), one or more additional reusability determinations may be made by the reuse TX 140, at 714. The one or more additional reusability determinations may include determining whether reuse of the first TXOP 222 is allowed by the reuse RX 160.

During a fourth time period (4) between the fourth time (tf4) and a fifth time (tf5), the reuse TXOP 270 may occur. During a fifth time period (5) between the fifth time (tf5) and a sixth time (tf6), one or more block acknowledgements (BAs) may be received, at 608, as described further with reference to FIG. 9.

Figure 8:
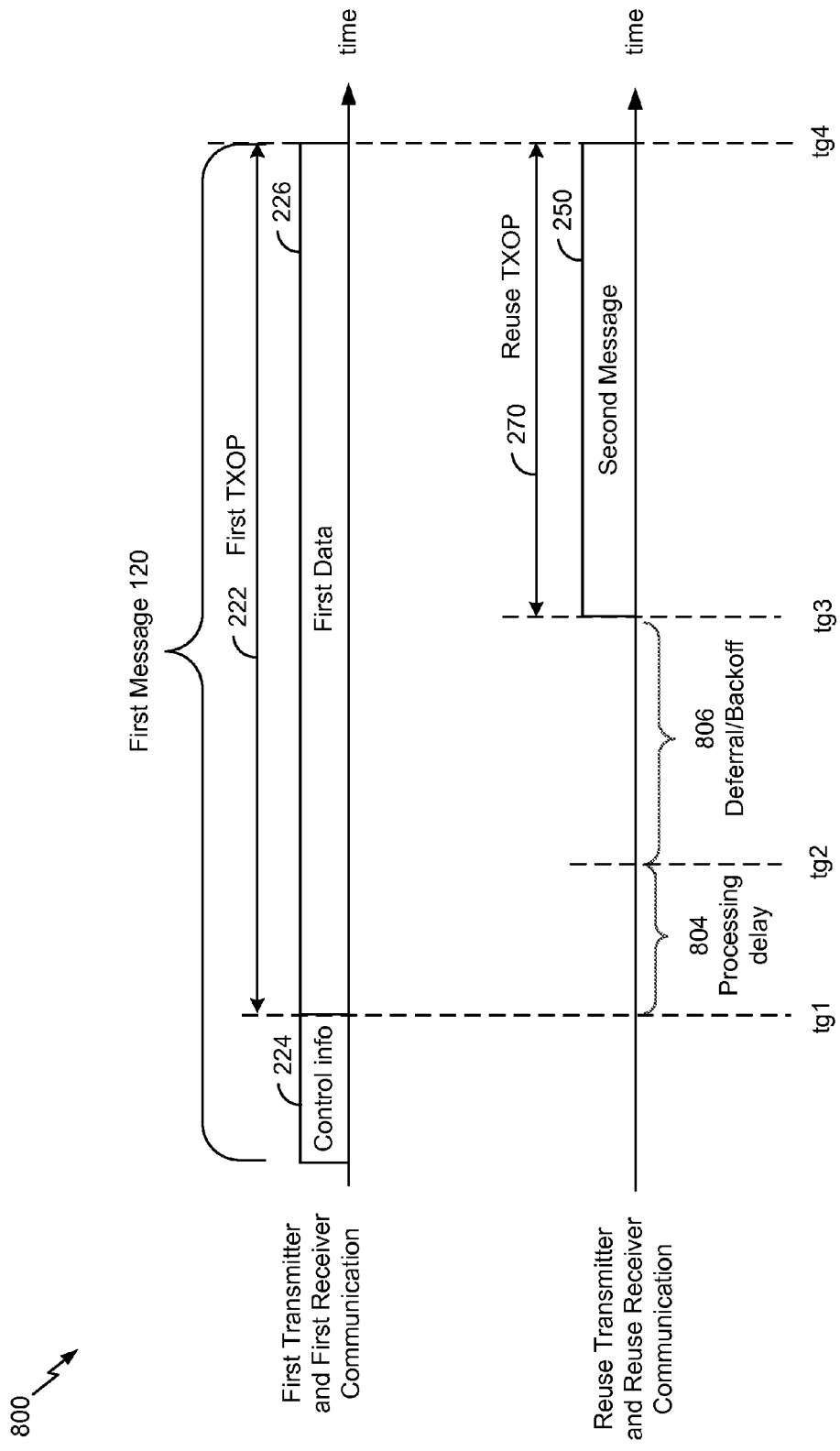
FIG. 8 is a timing diagram to illustrate an example of a deferral/backoff period associated with reuse of a TXOP.

FIG. 8 is a timing diagram 800 to illustrate an illustrative example of reuse of a TXOP, including a deferral/backoff period. It should be noted that handling of deferral rules or backoff rules, as described with reference to FIG. 8, may be applicable to any embodiment described herein (e.g., independent of whether TXOP reuse is RX-controlled, TX-controlled, involves one or more CCA thresholds, involves one or more RTS/CTS exchanges, etc.).

Prior to a first time (tg1), the reuse TX 140 may receive an indication that the reuse TX 140 is permitted to reuse the first TXOP 222. Between the first time (tg1) and a second time (tg2), the reuse TX 140 may experience a processing delay, at 804. For example, the processing delay may associated with the reuse TX 140 making a determination whether the reuse TX 140 can reuse the first TXOP 222 or making a determination whether the reuse TX 140 is going to reuse the first TXOP 222.

When the reuse TX 140 determines that first TXOP 222 may be reused or that the reuse TX 140 is going to reuse the first TXOP 222, the reuse TX 140 may apply, at 806, one or more deferral rules and/or one or more backoff rules. For example, the one or more deferral/backoff rules may be applied during a backoff window having a size illustrated between the second time (tg2) and a third time (tg3). The reuse TX 140 may apply the one or more deferral/backoff rules to prevent multiple devices from reusing the first TXOP 222 at the same time. For example, only one reuse of a TXOP may be permitted.

The one or more deferral/backoff rules may include "reuse" CCA rules, such as a CCA energy detection (ED) threshold rule, a CCA preamble detection (PD) threshold rule, or a combination thereof. For example, the CCA ED threshold rule may set a CCA ED threshold to a value equal to or greater than a signal level from the first TX 110 detected at the reuse TX 140. Accordingly, data transmitted during the first TXOP 222 may not cause a positive CCA ED indication at the reuse TX 140. As another example, the CCA PD threshold rule may set a CCA PD threshold based on standard (e.g., an IEEE 802.11 standard). In a particular embodiment, the CCA PD threshold used by the reuse TX 140 may be the same regardless of whether or not the reuse TX 140 may reuse the first TXOP 222.

The one or more backoff rules may include one or more rules to cause the reuse TX 140 to refrain from reusing the first TXOP 222. For example, the reuse TX 140 may stop reusing (or attempting to reuse) the first TXOP 222 if a preamble transmitted from another device is detected during a deferral/backoff period (e.g., during the backoff window), at 806. In a particular embodiment, during the deferral/backoff period, the reuse TX 140 may resume its backoff procedure, which was suspended by the reception of the first control portion 224. In particular embodiments, the size of the backoff window may be a default size or may be adjustable based on one or more parameters. The size of the backoff window may or may not include the processing delay indicated at 804. When the size of the backoff window is based on one or more parameters, the size of the backoff window may be determined as a function of an interference level from the reuse TX 140 to the first RX 130, as a function of an expected channel reuse gain, or as a function of an amount of data stored in a queue at reuse TX 140 (e.g., an amount of data to be transmitted by the reuse TX 140), as illustrative, non-limiting examples.

If the reuse TX 140 does not defer to another device during the deferral/backoff period, the reuse TX 140 may reuse the first TXOP 222 and may initiate transmission of the second message 150 after the deferral/backoff period, as shown.

In a particular embodiment, the reuse TX 140 determines prior to the first time (tg1) whether the reuse TX 140 can reuse the first TXOP 222 and whether the reuse TX 140 is going to reuse the first TXOP 222. When the reuse TX 140 determines prior to the first time (tg1) whether the reuse TX 140 can reuse the first TXOP 222 and whether the reuse TX 140 is going to reuse the first TXOP 222, the reuse TX 140 may not experience the processing delay at 804.

Figure 9:
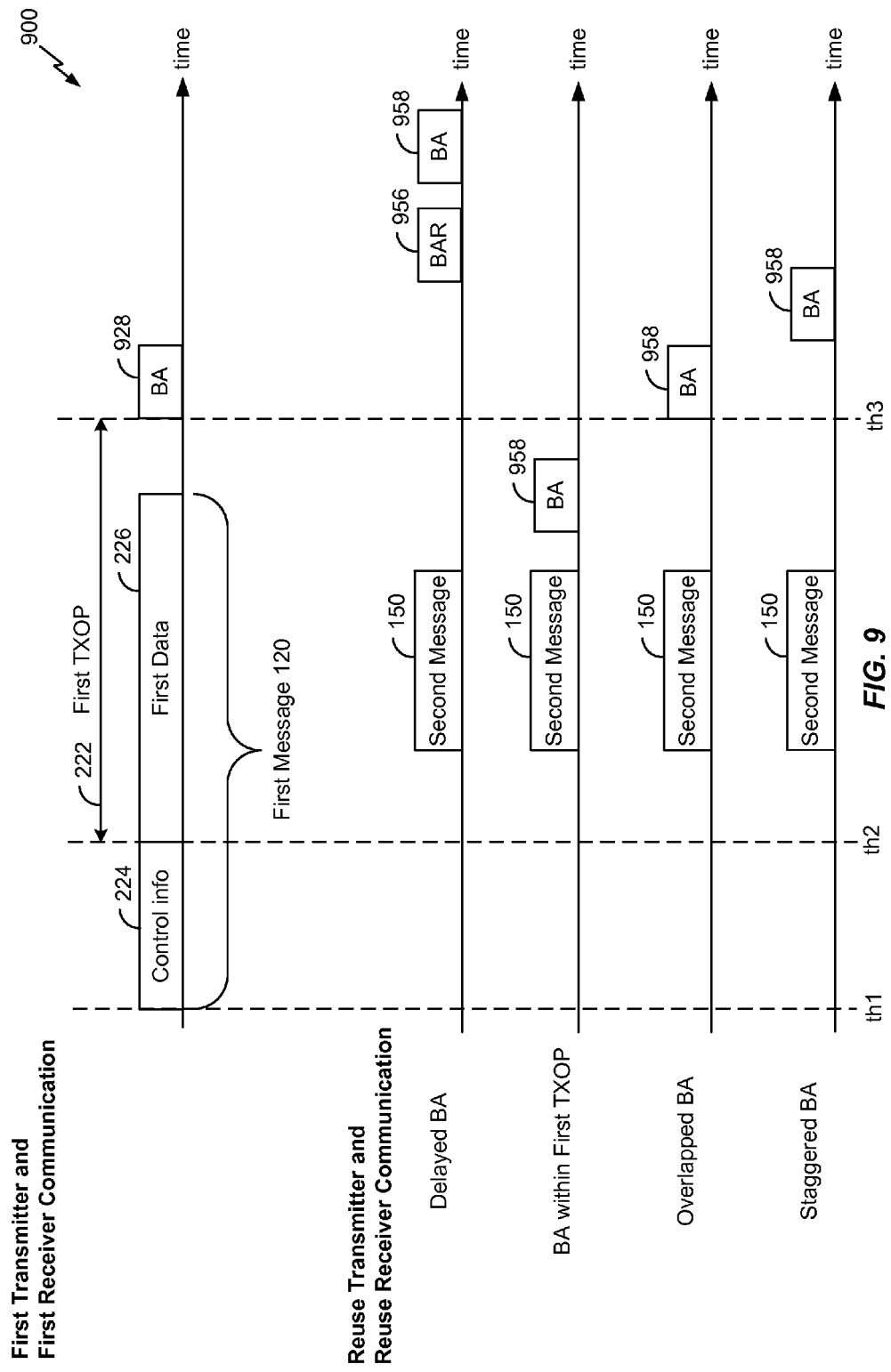
FIG. 9 is a timing diagram to illustrate examples of handling block acknowledgements (BAs) associated with reuse of a TXOP.

FIG. 9 is a timing diagram 900 to illustrate examples of handling block acknowledgements (BAs) associated with the first message 120 and the second message 150. It should be noted that handling of BAs, as described with reference to FIG. 9, may be applicable to any embodiment described herein (e.g., independent of whether TXOP reuse is RX-controlled, TX-controlled, involves one or more CCA thresholds, involves one or more RTS/CTS exchanges, etc.).

The first TX 110 may initiate communication of the first message at a first time (th1). At a time (th2), the first data 226 of the first message 120 may be transmitted. The first data 226 may be transmitted during the first TXOP 222 associated with the first message 120. A duration of the first TXOP 222 may end at a third time (th3). After the end of the first TXOP 222, the first RX 130 may transmit a first block acknowledgement (BA) 928 to the first TX 110. For example, the first BA 928 may include or correspond to the BA 318 of FIGS. 3-4 and 6-7. Although the first BA 928 is illustrated as being transmitted at the third time (th3), the first BA 928 may be transmitted at any time after the third time (th3).

The reuse TX 140 may reuse the first TXOP 222 and may transmit the second message 150 during the first TXOP 222. Based on the second message 150, the reuse RX 160 may send a second BA 958 to the reuse TX 140. For example, the second BA 958 may include or correspond to the BA 328 of FIGS. 3-4 and 6-7. Several approaches may be used to arrange (in time) the second BA 958 transmitted by the reuse RX 160 with respect to the first BA 928 transmitted by the first RX 130.

For example, in a "delayed BA" approach, the second BA 958 may be delayed with respect to the first BA 928 and may be requested by the reuse TX 140 using a BA request (BAR) 956.

As another example, in a "BA within the first TXOP" approach, the reuse RX 160 may transmit the second BA 958 during the first TXOP 222. The reuse TX 140 may determine that the second BA 958 may be interfered with by the first TX 110 and the reuse RX 160 may determine that the first RX 130 can tolerate interference caused by the reuse RX 160. To enable the reuse TX 140 and the reuse RX 160 to make such determinations, a handshake exchange may be performed between the first TX 110 and the first RX 130 prior to transmission of the first message 120, between the reuse TX 140 and the reuse RX 160 prior to transmission of the second message 150, or a combination thereof.

Additionally or alternatively, one or more policies (e.g., rules) may be used for BA transmission by the reuse RX 160. In a particular embodiment, the reuse RX 160 may follow a BA policy specified by the reuse TX 140, such as the BA policy specified by one or more requests provided by the reuse TX 140. To illustrate, the reuse RX 160 may always follow the BA policy specified by the reuse TX 140. For example, when an "immediate BA" (e.g., following a transmission of the second message 150) is requested from the reuse TX 160 by the reuse TX 140, the reuse RX 160 may send the BA 958 without checking if a transmission of the BA 958 may interfere with the first RX 130.

In another particular embodiment, the reuse RX 160 may have flexibility (e.g., discretion) to not transmit the BA 958 when requested to do so by the reuse TX 140, such as flexibility based on one or more rules. The reuse RX 160 may use one or more of the same rules used by the reuse TX 140 to determine whether a transmission of the BA 958 by the reuse RX 160 may interfere with the first RX 130. For example, the reuse RX 160 may apply the RX CCA threshold associated with the first RX 130. The reuse RX 160 may determine the RX CCA threshold based on one or more management messages sent by the first RX 130 to one or more devices within a transmission range of the first RX 130, based on a handshake exchange (e.g., a RTS/CTS exchange) between the first TX 110 and the first RX 130 or between the reuse TX 140 and the reuse RX 160, or based on the first control portion 224 of the first message 120, as illustrative, non-limiting examples. The RX CCA threshold may be based on a default MCS, based on a first MCS set by the first TX 110 (e.g., the first MCS indicated by the first control portion 224 or the RTS message 532), or based on a second MCS set by the first RX 130 (e.g. the second MCS indicated by one or more management messages, such as the first control portion 224 or the CTS message 534, as illustrative, non-limiting examples). Additionally or alternatively, the reuse RX 160 may adjust the RX CCA threshold (e.g., indicated in the CTS message 534) based on a transmit power of the reuse RX 160 relative to a default transmit power, such as a difference of the transmit power of the reuse RX 160 and the default transmit power.

When the reuse RX 160 applies one or more rules to determine whether the transmission of the BA 958 by the reuse RX 160 interferes with the first RX 130, immediate transmission of the BA 958 may occur if the transmission of the BA 958 does not cause interference at the first RX 130. The reuse TX 140 may be aware that the reuse RX 160 may make a determination of whether or not to immediately send the BA 958. When the BA 958 is not immediately received, the reuse TX 140 may send a BAR 956 to obtain the BA 958 before the reuse TX 140 infers that data needs to be retransmitted.

In another particular embodiment, the reuse TX 140 may set a BA policy to "immediate BA" (e.g., following a transmission of the second message 150) if the BA 958 from reuse RX 160 can be reliably received. A decision by the reuse TX 140 to set the BA policy to "immediate BA" may be based on historic data, such as signal to interference information for transmitted BAs based on network topology information. The reuse TX 140 may also use a handshake exchange (e.g., a RTS/CTS exchange) to determine if the BA 958 can be reliably received by the reuse TX 140. For example, if a CTS message (e.g., the CTS message 264 of FIG. 2 or the CTS message 564 of FIG. 5) from the reuse RX 160 is properly received, then the reuse TX 140 may infer that the BA 958 can also be received during the first TXOP 222.

As another example, in an "overlapped BA" approach, the first BA 928 and the second BA 958 may be transmitted such that the first BA 928 and the second BA 958 at least partially overlapping (in time). Prior to a transmission of the first BA 928 or a transmission of the second BA 958, a determination may be made (e.g., based on handshake exchange(s)) that the first BA 928 and the second BA 958 will not excessively interfere with each other.

Additionally or alternatively, one or more approaches (e.g., rules or policies) may be used for BA transmission by the reuse RX 160. In a particular embodiment, the reuse RX 160 may follow a BA policy specified by the reuse TX 140, such as the BA policy specified by one or more requests provided by the reuse TX 140. To illustrate, the reuse RX 160 may always follow the BA policy specified by the reuse TX 140. For example, when an "immediate BA" (e.g., following a transmission of the second message 150) is requested from the reuse TX 160 by the reuse TX 140, the reuse RX 160 may send the BA 958 without checking if a transmission of the BA may interfere with the first RX 130.

In another particular embodiment, the reuse RX 160 may have flexibility (e.g., discretion) to not transmit a BA when requested to do so by the reuse TX 140. For example, the reuse RX 160 may not transmit the BA 958 if the reuse RX 160 determines that the BA 958 may interfere with BA reception at the first TX 110 (e.g., the reuse RX 160 may apply one or more rules to determine whether or not to send the BA 958 based on a request from the reuse TX 140). To illustrate, the reuse RX 160 may not send a BA if the received signal level from the first TX 110 is greater than a CCA threshold indicated by the first TX 140. The reuse TX 140 may be aware that the reuse RX 160 may make a determination of whether or not to immediately send the BA 958. When the BA 958 is not immediately received, the reuse TX 140 may send a BAR 956 to obtain the BA 958 before the reuse TX 140 infers that data needs to be retransmitted.

As another example, in a "staggered BA" approach, the second BA 958 may be transmitted a SIFS after the first BA 928. In a particular embodiment, the reuse TX 140 may protect the second BA 958 by setting a sufficiently long duration in an L-SIG field of the first message 120.

It is noted that one or more policies (e.g., rules) described with a specific BA approach may also be applied to another BA approach described herein. For example, one or more policies described with reference to the "BA within the first TXOP" approach may also be applicable to the "delayed BA" approach, the "overlapped BA" approach, and/or the "staggered BA" approach. As another example, one or more policies described with reference to the "overlapped BA" approach may also be applicable to the "delayed BA" approach, the "BA within the first TXOP" approach, and/or the "staggered BA" approach.

Figure 10:
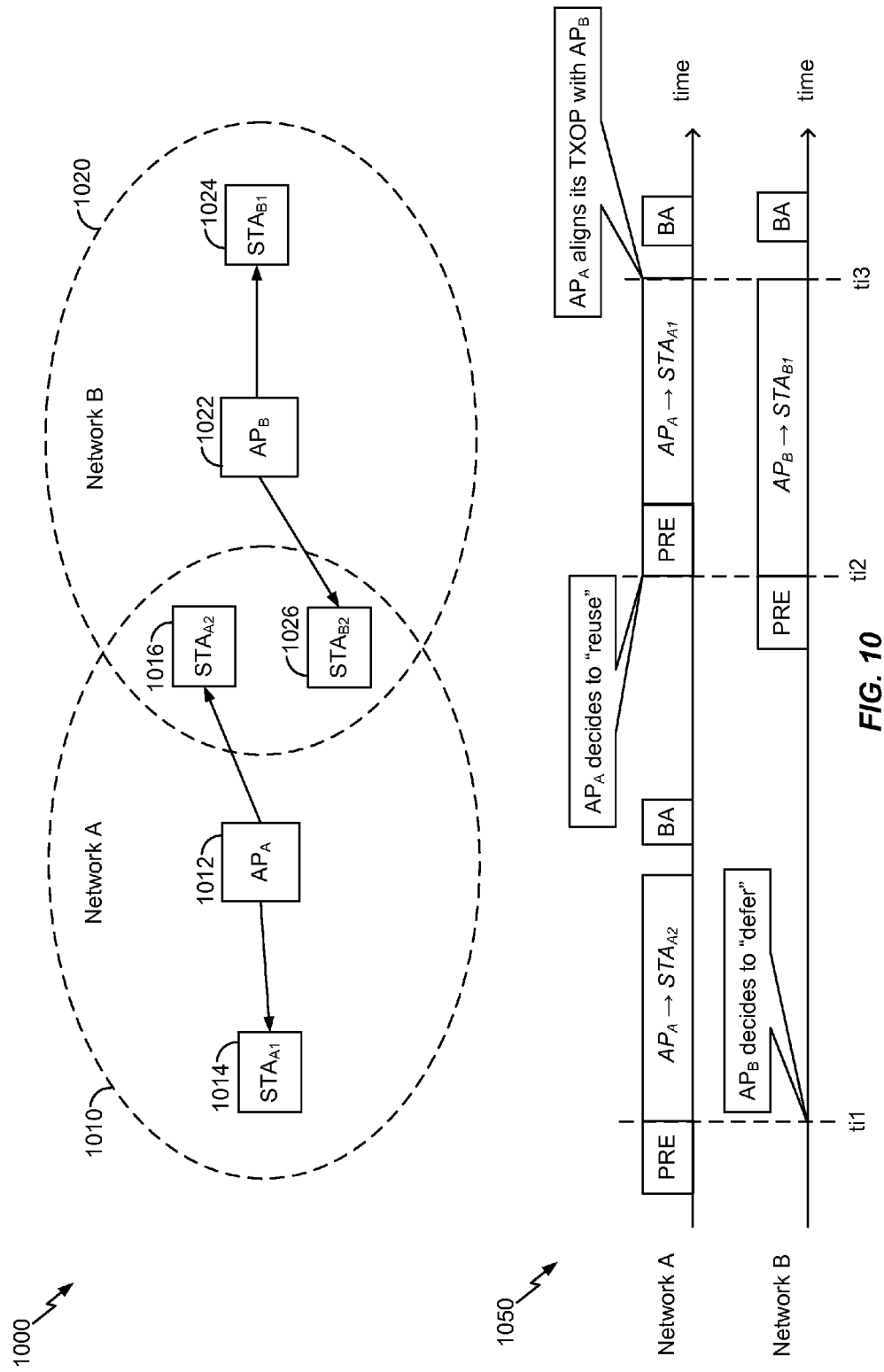
FIG. 10 is a block diagram of a second illustrative embodiment of a system that permits reuse of a transmit opportunity (TXOP)

Referring to FIG. 10, a particular illustrative embodiment of a system 1000 that permits transmit opportunity (TXOP) reuse is shown. The system 1000 includes a first network 1010 and a second network 1020. The system 1000 may include one or more Institute of Electrical and Electronics Engineers (IEEE) 802.11 wireless networks (e.g., one or more Wi-Fi networks). For example, the system 1000 may operate in accordance with an IEEE 802.11 standard. In an illustrative embodiment, the system 1000 includes one or more 802.11 high efficiency Wi-Fi (HEW) networks.

The first network 1010 may include one or more wireless devices, such as a first access point ($AP_A$) 1012, a first station ($STA_{A2}$) 1016, and a second station ($STA_{A1}$) 1014. The second network 1020 may also include one or more wireless devices, such as a second access point ($AP_B$) 1022, a third station ($STA_{B1}$) 1024, and a fourth station ($STA_{B2}$) 1026. The one or more devices of the first network 1010 and the one or more devices of the second network 1020 may include or correspond to the first TX 110, the first RX 130, the reuse TX 140, or the reuse RX 160 of FIG. 1.

The first network 1010 may be associated with a first basic service set (BSS) having a first BSS identification (BSSID) and the second network 1020 may be associated with a second BSS having a second BSSID. For example, the first BSSID may be defined by a MAC address of the first access point 1012 and the second BSSID may be defined by a MAC address of the second access point 1022. Further, the first network 1010 and the second network 1020 may be an overlapping BSS with respect to each other, as shown. In alternate embodiments, the first network 1010 or the second network 1020 may include a peer-to-peer communication network using Wi-Fi Direct communication or a tunneled direct link setup communication, as illustrative, non-limiting embodiments.

An illustrative operation of the system 1000 is described with reference to timing diagram 1050. Prior to a first time (ti1), the first access point 1012 may transmit a preamble ("PRE") associated with a transmission of a first message from the first access point 1012 to the second station 1016. The second access point 1022 may detect the preamble transmitted by the first access point 1012 and may determine whether or not to reuse the corresponding first TXOP associated with the first message from the first access point 1012 to the second station 1016. For example, the second access point 1022 may be ready to transmit a second message to the third station 1024 and may determine whether to transmit the second message to the third station 1024 during the first TXOP associated with the first message.

At the first time (ti1), the second access point 1022 may decide, based on one or more channel conditions, that the second access point 1022 is not going to reuse the first TXOP associated with the first message. Accordingly, the second access point 1022 may defer to the first access point 1012 and may queue the second message for transmission at a subsequent point in time.

After transmission of the first message and prior to a second time (ti2), the second access point 1022 may send a preamble associated with the second message. The first access point 1012 may detect the preamble associated with the second message and may determine whether or not to reuse the corresponding second TXOP associated with the second message.

At the second time (ti2), the first access point 1012 may decide, based on one or more channel conditions, to reuse the second TXOP associated with the second message transmitted by the second access point 1022. Accordingly, the first access point 1012 may transmit a third message from the first access point 1012 to the first station 1014 during the second TXOP associated with the second message. Further, the first access point 1012 may align a third TXOP associated with the third message with the second TXOP associated with the second message such that both TXOPs end at a third time (ti3), as shown.

Figure 11:
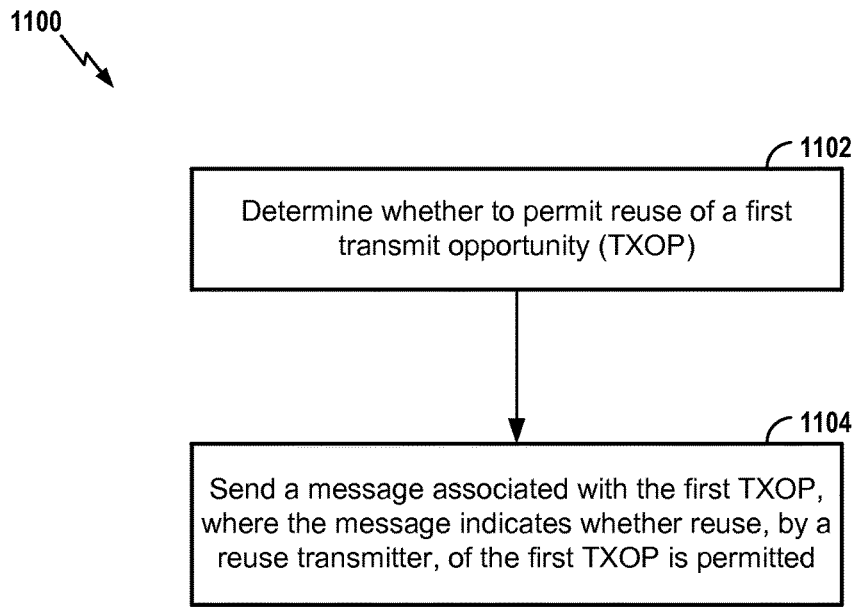
FIG. 11 is a flow diagram of an illustrative method of operating a first transmitter.

Referring to FIG. 11, a particular embodiment of a method 1100 of operating a first transmitter is described and designated 1100. The method 1100 may be performed using the first transmitter 110 of FIG. 1, one of the access points 1012, 1022, or one of the stations 1014, 1016, 1024, 1026 of FIG. 10.

The method 1100 may include determining whether to permit reuse of a first transmit opportunity (TXOP), at 1102. For example, the first TXOP may include or correspond to the first TXOP 222 of FIG. 2. In a particular embodiment, a determination of whether to permit reuse of the first TXOP is based on a signal strength of a link between a first transmitter and a first receiver in a first basic service set (BSS). For example, the determination may be based on a difference between the signal strength and an overlapping basic service set (OBSS) interference level. In another particular embodiment, a determination of whether to permit reuse of the first TXOP is based on a comparison of the OBSS interference level to a transmission history of the first transmitter.

The method 1100 may further include sending a message associated with the first TXOP, where the message indicates whether reuse, by a reuse transmitter, of the first TXOP is permitted, at 1104. For example, the message may include or correspond to the first message 120 of FIG. 1 or the RTS message 532 of FIG. 5 (or a portion thereof, such as a preamble or PLCP data). The message may indicate that reuse of the first TXOP is permitted based on one or more values in a signal (SIG) field of the message. Additionally or alternatively, the SIG field may indicate a transmitter address associated with the first transmitter or may indicate a receiver address associated with the first receiver. In a particular embodiment, the SIG field may be an Institute of Electrical and Electronics Engineers (IEEE) 802.11ac SIG-A field. In another particular embodiment, the SIG field is included in a preamble of the message, such as a high efficiency wireless (HEW) preamble. The preamble indicates a basic service set identification (BSSID) of the first transmitter.

In a particular embodiment, the first transmitter and the first receiver are included in a peer-to-peer network. In another particular embodiment, the reuse transmitter is included in a peer-to-peer network with a reuse receiver.

The method 1100 may enable the first transmitter to indicate to one or more other devices that a TXOP of a message transmitted by the first transmitter is permitted to be reused.

It should be noted that although one or more embodiments described herein may be understood as describing a reuse TX determining whether to reuse a TXOP based on an explicit indication (e.g., an allowance and/or threshold indication) provided by the first TX or the first RX (e.g., in a control portion of a PPDU, a RTS message, a CTS message, a management/control frame, etc.), in alternate embodiments, a reuse TX may automatically determine whether to reuse a TXOP without receiving or detecting such an explicit indication (that TXOP reuse is permitted) from the first TX or the first RX.

For example, the first TX may transmit a first message, such as an RTS message, a CTS message, a PPDU, etc. under "normal" contention (e.g., CSMA or another contention resolution mechanism), where the first message is associated with a first TXOP. The first message (or at least a portion thereof) may include information that is useable by the reuse TX to identify a source and a destination of the first message. For example, the first message may include one or more bits in a PHY SIG field that can be used to identify the first TX as the source of the first message and/or identify the first RX as the destination of the first message. The reuse TX may determine not to reuse the first TXOP to send a second message during the first TXOP when the first message is addressed to the reuse TX, when the destination of the first message is the same as a destination of the second message, when the second message is addressed to the first TX or to the first RX, or any combination thereof.

As another example, the reuse TX may determine whether to reuse a particular TXOP (associated with a particular message sent by the first transmitter) based on data associated with prior TXOP (associated with a prior message sent by the first transmitter). To illustrate, the data be included in historical data and may indicate whether the reuse transmitter received an express permission to reuse the prior TXOP. Thus, although the reuse TX does not receive an express permission corresponding to the particular TXOP, the reuse TX may determine whether to reuse the particular TXOP based a previous express permission that corresponds to reuse of the previous TXOP.

In a particular embodiment, the first TX and/or the first RX may be identified based on a partial BSSID, such as a partial BSSID included in the first message, as described with reference to FIG. 1 regarding uplink (UL) transmissions, downlink (DL) transmissions, and P2P transmissions.

When no explicit indication of permission is received in a first message, the reuse TX may determine to reuse the first TXOP (to send a second message during the first TXOP) when the first message (e.g., PPDU) is not addressed to the reuse TX, when a destination of the first message is not the same as a destination of the second message, when the second message is not addressed to the first TX or to the first RX, when a signal strength of the first message satisfies (e.g., is less than or equal to) reuse clear channel access (CCA) threshold(s) and/or RX CCA threshold(s), and/or when a network allocation vector (NAV) has not already been set, as illustrative, non-limiting examples.

In a particular embodiment, the reuse CCA threshold may be a function of a MCS of the first message, a TX power at which the reuse TX will transmit the second message, the type of preamble (11n/11ac/11ax), one or more other indications included in the first message (e.g., in a SIG field), such as a duration, a short guard interval (GI), a long GI, a coding (e.g., an indication of binary convolutional coding (BCC) or low-density parity check (LDPC) in an 802.11ac or 802.11n packet), a number of spatial streams, a bandwidth, or any combination thereof. For example, the reuse TX may determine to reuse the first TXOP to transmit the second message if the following inequality is true:

$$RSSI_{first\_message} <= \text{CCA threshold} + (\text{Default } TX \text{ power} - TX\text{Power\_reuse}TX),$$

where $RSSI_{first\_message}$ is a signal strength associated with the first message, Default TX power is a default transmit power of the reuse TX (e.g., as defined in an industry standard, such as an IEEE 802.11 standard), and TXPower_reuseTX is the intended transmit power at which the reuse TX will transmit the second message.

Similarly, an intended TX Bandwidth (e.g., used during transmission of the second message during reuse of the first TXOP) may also be used to compute an offset for the CCA threshold, such as:

$$RSSI_{first\_message} <= \text{CCA threshold} + \text{Offset}(TX\text{Bandwidth\_reuse}TX/\text{Default Bandwidth}),$$

where TXBandwidth_reuseTX is the intended TX Bandwidth and the Default Bandwidth may be a value defined by an industry standard or a value corresponding to a bandwidth (BW) associated with a received PPDU. In a particular embodiment, the CCA threshold may be a default (e.g., industry standard) CCA threshold, such as −62 dBm or −82 dBm. Alternately, the CCA threshold may be adjusted by one or more offsets that are determined based on one or more indicators associated with the first message, such as an offset based on a MCS of the first message, an offset based on a SIG field indicator of the first message, or a combination thereof, as illustrative, non-limiting examples. To illustrate, the CCA threshold may be determined based on the following:

$$\text{CCA Threshold} = -62 (\text{or } -82) - \text{offset}(MCS) + \text{offset}(SIG\_indication),$$

where offset(MCS) is an offset based on a MCS of the first message and offset(SIG_indication) is an offset based on a SIG field indicator of the first message. In a particular embodiment, the offset may be 0 for MCS0 (corresponding to BPSK modulation, 1/2 coding rate). The offset may be 5 for MCS1 (corresponding to quadrature phase shift keying (QPSK), 1/2). The offset may be 10 for MCS2 (corresponding to QPSK, 3/4) or MCS3 (corresponding to 16-point quadrature amplitude modulation (16QAM), 1/2). The offset may be 15 for MCS4 (corresponding to 64-point QAM (64QAM), 2/3). The offset may be 20 for MCS5 (corresponding to 64QAM, 2/3). The offset may be 25 for MCS6 (corresponding to 64QAM, 3/4) or MCS7 (corresponding to 64QAM, 5/6). In alternate embodiments, different offsets values may correspond to different MCS indexes.

In a particular embodiment, a reuse allowance (e.g., permission) and/or a CCA threshold used to determine whether to reuse the first TXOP may be a function of the type of the first message instead of or in addition to the content of a portion (e.g., SIG field) of the first message. To illustrate, the reuse TX may determine a type of the first message prior to decoding the SIG field. For example, if the reuse TX receives an 802.11n or 802.11ac packet, the reuse TX may automatically determine that reuse of the first TXOP is not permitted, independent of the value of any specific field(s) in the 802.11n or 802.11ac packet. As another example, if the reuse TX receives an 802.11ax packet, the reuse TX may automatically determine that reuse of the first TXOP is permitted, independent of the value of any specific field(s) in the 802.11ax packet.

Figure 12:
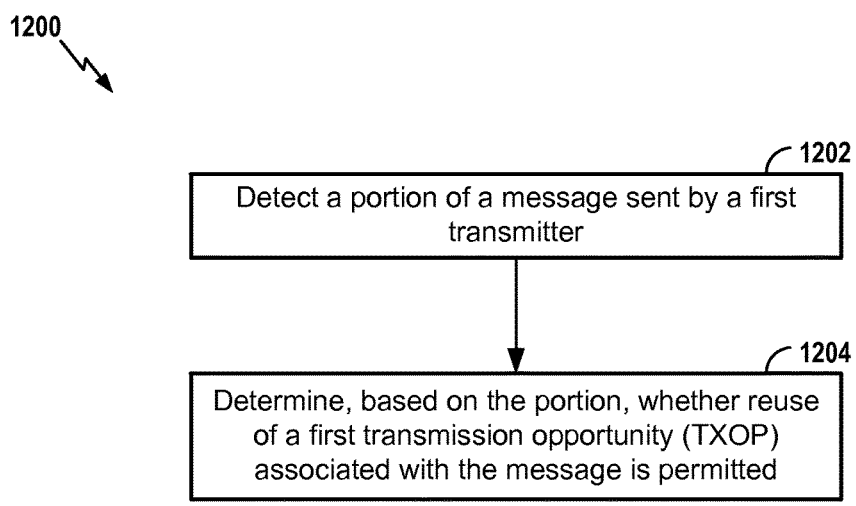
FIG. 12 is a flow diagram of an illustrative method of operating a reuse transmitter.

Referring to FIG. 12, a particular embodiment of a method of operating a reuse transmitter is described and designated 1200. The method 1200 may be performed using the reuse transmitter 140 of FIG. 1, one of the access points 1012, 1022, or one of the stations 1014, 1016, 1024, 1026 of FIG. 10.

The method 1200 may include detecting a portion of a message sent by a first transmitter, at 1202. For example, the message may include or correspond to the first message 120 of FIG. 1.

The method 1200 may further include determining, based on the portion, whether reuse of a first transmit opportunity (TXOP) associated with the message is permitted, at 1204. For example, the first TXOP may include or correspond to the first TXOP 222 of FIG. 2. When reuse of the first TXOP is permitted, the reuse transmitter may determine whether to reuse the first TXOP. For example, a determination to reuse the first TXOP may be based on whether the message is addressed to the reuse transmitter, whether a second message to be transmitted by the reuse transmitter during reuse of the first TXOP is addressed to a first receiver of the message, or a combination thereof. As another example, a determination to reuse the first TXOP may be based on whether a network allocation vector (NAV) honored by the reuse transmitter was set by the first transmitter, based on a physical proximity of the reuse transmitter to a reuse receiver, based on historical data stored at the reuse transmitter, or a combination thereof.

In a particular embodiment, a determination to reuse the first TXOP is based on a handshake exchange between the reuse transmitter and a reuse receiver. The handshake exchange may include a request to send (RTS) message or a clear to send (CTS) message. For example, the RTS message may include the RTS message 262 of FIG. 2 or the RTS message 562 of FIG. 5. The CTS message may include the CTS message 264 of FIG. 2 or the CTS message 564 of FIG. 5. The handshake exchange may be associated with a network allocation vector (NAV) that is set to be aligned with an end of the first TXOP.

In a particular embodiment, the reuse transmitter determines a duration of the first TXOP based on a legacy signal (L-SIG) field in a preamble associated with the message or based on a network allocation vector (NAV) associated with the first transmitter.

In a particular embodiment, a determination is made to reuse the first TXOP. In response to determining to reuse the first TXOP, a second message may be sent from the reuse transmitter during the first TXOP. For example, the second message may include or correspond to the second message 150 of FIG. 1. The second message may be associated with a second TXOP, such as the reuse TXOP 270 or the second TXOP 272 of FIG. 2, that ends prior to or at the same time as the first TXOP.

When the second message is sent to a second receiver, the reuse transmitter may receive a block acknowledgement (ACK) associated with the second message from the second receiver. For example, the reuse transmitter may send a block ACK request (BAR) to the second receiver and receive the block ACK in response to the block ACK request. To illustrate, the BAR may be sent after completion of the first TXOP. The block ACK may also be received during the first TXOP, may be at least a partially received at the same time as the first transmitter receives a block ACK associated with the first message, or may be received at least a short interframe space (SIFS) interval after the first transmitter receives a block ACK associated with the first message, as illustrative, non-limiting examples. For example, the block ACK may include or correspond to the block ACK 328 of FIG. 3 or the block ACK 958 of FIG. 9.

In a particular embodiment, in response to a determination to reuse the first TXOP, the reuse transmitter may apply one or more deferral rules during a backoff window time period. In another particular embodiment, the reuse transmitter may determine a signal value of the first transmitter and may set a clear channel access (CCA) energy detection (ED) threshold of the reuse transmitter to a value greater than or equal to the determined signal value.

The method 1200 may enable the reuse transmitter to determine that a TXOP of a message transmitted by the first transmitter is permitted to be reused.

Figure 13:
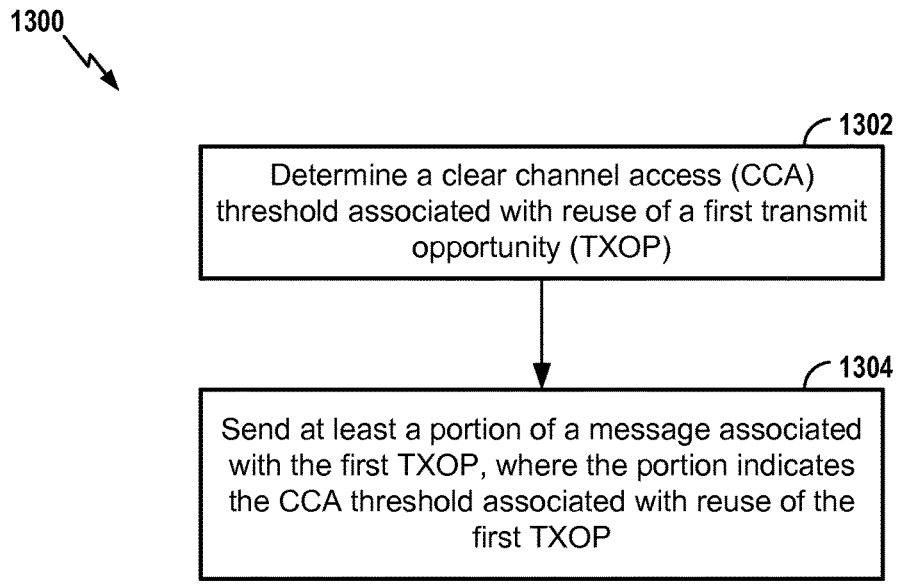
FIG. 13 is a flow diagram of an illustrative method of operating a first transmitter.

Referring to FIG. 13, a particular embodiment of a method of operating a first transmitter is described and designated 1300. The method 1300 may be performed using the first transmitter 110 of FIG. 1, one of the access points 1012, 1022, or one of the stations 1014, 1016, 1024, 1026 of FIG. 10.

The method 1300 may include determining a clear channel access (CCA) threshold associated with reuse of a first transmit opportunity (TXOP), at 1302. The CCA threshold may be dynamically determined by the first transmitter. For example, the first TXOP may include or correspond to the first TXOP 222 of FIG. 2.

The method 1300 may further include sending at least a portion of a message associated with the first TXOP, where portion indicates the CCA threshold associated with reuse of the first TXOP, at 1304. For example, the message may include or correspond to the first message 120 of FIG. 1. The portion of the message may indicate the CCA threshold based on a value (e.g., a value of one or more bits) in a signal (SIG) field, such as a SIG field included in a preamble of the message. In a particular embodiment, the CCA threshold indicated by the portion of the message is less than a standard-based CCA threshold associated with reuse of the first TXOP. The portion of the message may further indicate that reuse of the first TXOP is permitted. For example, the portion of the message indicates that reuse of the first TXOP is allowed based on a value (e.g., a value of one or more bits) in a signal (SIG) field.

In a particular embodiment, the CCA threshold is determined prior to sending the message. For example, the CCA threshold may be determined based on a signal strength of a link between the first transmitter and the first receiver in a basic service set (BSS) or based on an interference level of an overlapping basic service set (OBSS), as illustrative, non-limiting examples.

In another particular embodiment, the CCA threshold is determined based on a previous CCA threshold used in association with a particular message communicated by the first transmitter prior to the message. For example, the previous CCA threshold may be adjusted, based on a performance assessment associated with communication of the particular message, to generate the CCA threshold.

The method 1300 may enable the first transmitter to specify the CCA threshold to be used by one or more devices. Accordingly, the one or more devices may use the CCA threshold to determine whether to reuse the first TXOP associated with the message transmitted by the first transmitter.

Figure 14:
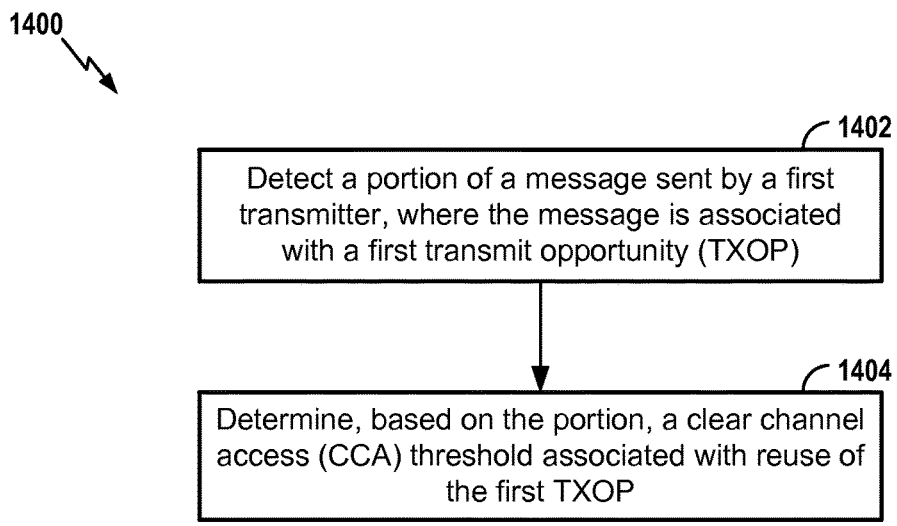
FIG. 14 is a flow diagram of an illustrative method of operating a reuse transmitter.

Referring to FIG. 14, a particular embodiment of a method of operating a reuse transmitter is described and designated 1400. The method 1400 may be performed using the reuse transmitter 140 of FIG. 1, one of the access points 1012, 1022, or one of the stations 1014, 1016, 1024, 1026 of FIG. 10.

The method 1400 may include detecting a portion of a message sent by a first transmitter, where the message is associated with a first transmit opportunity (TXOP), at 1402. For example, the message and the first TXOP may include or correspond to the first message 120 of FIG. 1 and the first TXOP 222 of FIG. 2, respectively.

The method 1400 may further include determining, based on the portion, a clear channel access (CCA) threshold associated with reuse of the first TXOP, at 1404. The reuse transmitter may send a second message, such as the second message 150 of FIG. 1, based on the CCA threshold. For example, the second message may be sent during the first TXOP. When the second message is sent by the reuse transmitter, the reuse transmitter may perform a performance assessment associated with communication of the second message. Based on the performance assessment, the reuse transmitter may determine whether or not to reuse a second TXOP that is subsequent to the first TXOP.

In a particular embodiment, when reuse of the first TXOP is permitted, the reuse transmitter determines whether to reuse the first TXOP. For example, the reuse transmitter may determine to reuse the first TXOP based on whether a CCA level of the first transmitter is less than or equal to the CCA threshold, based on whether the message is addressed to the reuse transmitter, based on whether a second message to be transmitted by the reuse transmitter during reuse of the first TXOP is addressed to a first receiver of the message, or based on whether a network allocation vector (NAV) that is honored by the reuse transmitter was set by the first transmitter, as illustrative, non-limiting examples. Additionally or alternatively, the reuse transmitter may determine to reuse the first TXOP is based on a physical proximity of the reuse transmitter to a reuse receiver or based on a handshake exchange between the reuse transmitter and a reuse receiver. The handshake exchange may include a request to send (RTS) message or a clear to send (CTS) message and the reuse transmitter may set a network allocation vector (NAV) associated with the handshake exchange to be aligned with an end of the first TXOP.

The method 1400 may enable the reuse transmitter to determine whether to reuse a TXOP of a message transmitted by the first transmitter based on a CCA threshold dictated by the first transmitter.

Figure 15:
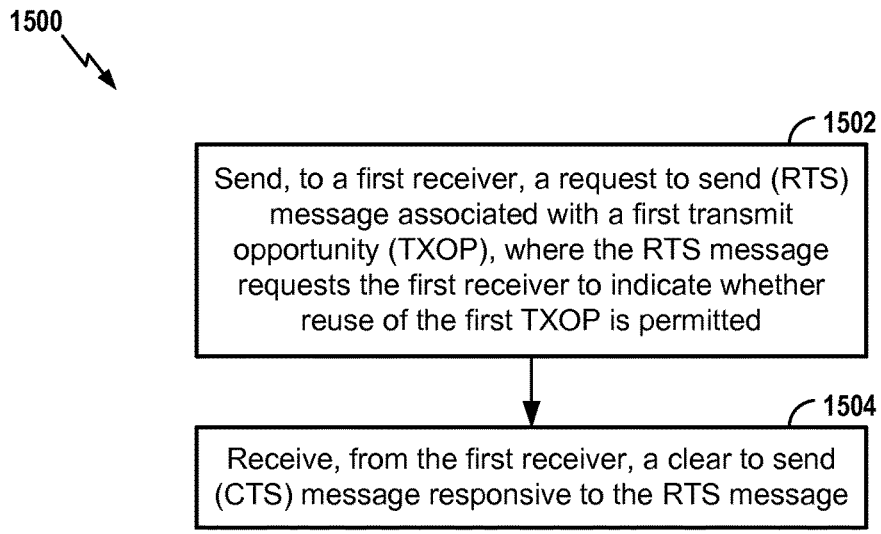
FIG. 15 is a flow diagram of an illustrative method of operating a first transmitter.

Referring to FIG. 15, a particular embodiment of a method of operating a first transmitter is described and designated 1500. The method 1500 may be performed using the first transmitter 110 of FIG. 1, one of the access points 1012, 1022, or one of the stations 1014, 1016, 1024, 1026 of FIG. 10.

The method 1500 may include sending, to a first receiver, a request to send (RTS) message associated with a first transmit opportunity (TXOP), where the RTS message requests the first receiver to indicate whether reuse of the first TXOP is permitted, at 1502. In a particular embodiment, the RTS message identifies a modulation and coding scheme (MCS). The RTS message may include or correspond to the RTS message 532 of FIG. 5, and the first TXOP may include or correspond to the first TXOP 222 of FIG. 2. A request to indicate whether reuse of the first TXOP is permitted may be included in a media access control (MAC) portion of the RTS message or may be included in a signal (SIG) field of the RTS message, as illustrative, non-limiting embodiments. In addition to sending the RTS message, the first transmitter may align a network allocation vector (NAV) of the RTS message with an end of the first TXOP.

The method 1500 may further include receiving, from the first receiver, a clear to send (CTS) message responsive to the RTS message, at 1504. For example, the CTS message may include or correspond to the CTS message 534 of FIG. 5. The first transmitter may determine whether the reuse of the first TXOP is permitted based on the CTS message received from the receiver. When the first transmitter determines to permit reuse of the first TXOP, the first transmitter may send a portion, such as a preamble, of a message (associated with the first TXOP) to indicate that reuse of the first TXOP is permitted.

In a particular embodiment, the first transmitter determines, based on the CTS message, a receiver clear channel access (RX CCA) threshold associated with the first receiver. For example, the RX CCA threshold may be indicated by one or more bits included in CTS message.

In a particular embodiment, the CTS message indicates a modulation and coding scheme (MCS) to be used during communication of a subsequent message between the first transmitter and the first receiver. In another particular embodiment, the CTS message includes a particular RX CCA threshold of the first receiver. The particular RX CCA threshold may be associated with a first modulation and coding scheme (MCS), such as a default MCS, and the first transmitter may adjust the particular RX CCA threshold to generate the RX CCA threshold. For example, the first transmitter may adjust of the particular RX CCA threshold based on a second MCS (used by the first transmitter) that is different than the first MCS.

The method 1500 may enable the first transmitter to request the first receiver whether or not the first transmitter should permit reuse of the first TXOP, thereby providing control of the reuse of the first TXOP to the first receiver.

Figure 16:
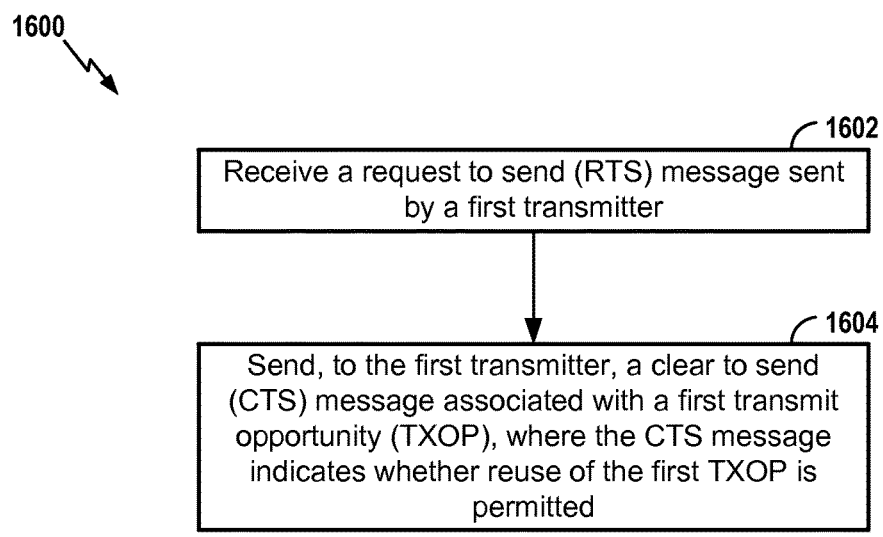
FIG. 16 is a flow diagram of an illustrative method of operating a first receiver.

Referring to FIG. 16, a particular embodiment of a method of operating a first receiver is described and designated 1600. The method 1600 may be performed using the first receiver 130 of FIG. 1, one of the access points 1012, 1022, or one of the stations 1014, 1016, 1024, 1026 of FIG. 10.

The method 1600 may include receiving a request to send (RTS) message send by a first transmitter, at 1602. For example, the RTS message may include or correspond to the RTS message 532 of FIG. 5.

The method 1600 may further include sending, to the first transmitter, a clear to send (CTS) message associated with a first transmit opportunity (TXOP), where the CTS message indicates whether reuse of the first TXOP is permitted, at 1604. The CTS message may include or correspond to the CTS message 534 of FIG. 5, and the first TXOP may include or correspond to the first TXOP 222 of FIG. 2. A media access control (MAC) portion or a SIG field of the CTS message may indicate that reuse of the first TXOP is permitted, may indicate a receiver (RX) clear channel access (CCA) threshold, may indicate a modulation and coding scheme (MCS), or a combination thereof.

In a particular embodiment, the first receiver may determine a modulation and coding scheme (MCS) based on the RTS message. Based on the MCS, the first receiver may determine a receiver (RX) clear channel access (CCA) threshold associated with the first receiver. Alternatively, the first receiver may determine the RX CCA threshold based on a default MCS. The CTS message sent by the first receiver may indicate the RX CCA threshold determined by the first receiver.

In another particular embodiment, the first receiver determines the RX CCA threshold based on a transmit power value associated with the CTS message. To illustrate, the first receiver may determine a particular RX CCA threshold of the first receiver and may determine a transmit power value associated with the CTS message. Based on the transmit power value, the first receiver may adjust the particular RX CCA threshold to generate the RX CCA threshold. Additionally or alternatively, the RX CCA threshold may be determined based on one or more channel dynamics, a CCA measurement uncertainty, or historical statistics, as illustrative, non-limiting examples.

The method 1600 may enable the first receiver to dictate whether reuse of the first TXOP should be permitted by the first transmitter. By having control of whether reuse of the first TXOP is permitted, the first receiver may not permit the first TXOP to be reused when the first receiver determines that reuse of the first TXOP would cause an amount of interference that would impede reception of a message associated with the first TXOP.

Figure 17:
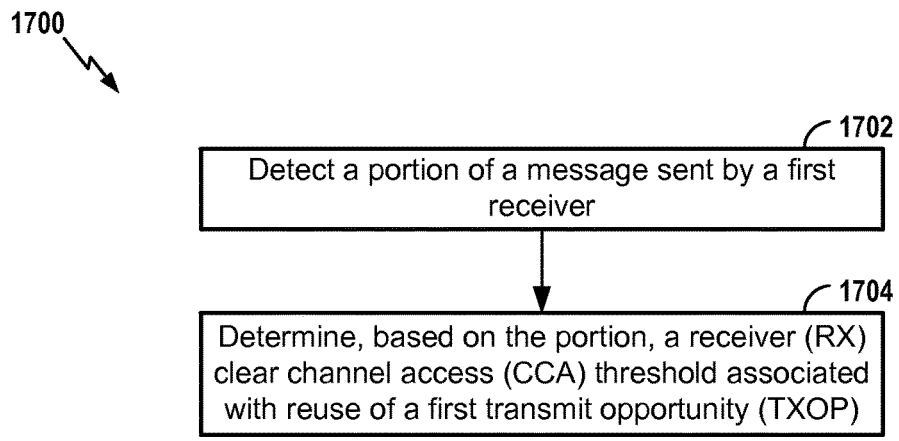
FIG. 17 is a flow diagram of an illustrative method of operating a reuse transmitter.

Referring to FIG. 17, a particular embodiment of a method of operating a reuse transmitter is described and designated 1700. The method 1700 may be performed using the reuse transmitter 140 of FIG. 1, one of the access points 1012, 1022, or one of the stations 1014, 1016, 1024, 1026 of FIG. 10.

The method 1700 may include detecting a portion of a message sent by a first receiver, at 1702. The portion of the message may be included in a clear to send (CTS) message sent by the first receiver. The CTS message may be responsive to a request to send (RTS) sent by the first transmitter to the first receiver. For example, the message may include the CTS message 534 of FIG. 5.

The method 1700 may further include determining, based on the portion, a receiver (RX) clear channel access (CCA) threshold associated with reuse of a first transmit opportunity (TXOP), at 1704. For example, the first TXOP may include or correspond to the first TXOP 222 of FIG. 2. The reuse transmitter may determine whether to reuse the first TXOP based on the RX CCA threshold.

In a particular embodiment, the reuse transmitter adjusts the RX CCA threshold. For example, the reuse transmitter may identify a modulation and coding scheme (MCS) associated with the message and may adjust the RX CCA threshold based on the MCS. As another example, the reuse transmitter may determine a transmit power value associated with the reuse transmitter and may adjust the RX CCA threshold based on the transmit power value. To illustrate, the RX CCA threshold may be adjusted based on a difference between the transmit power value and a default transmit power value. Additionally, the reuse transmitter may determine to reuse the first TXOP based on whether a first CCA level of the portion is less than or equal to the adjusted RX CCA threshold.

In a particular embodiment, when reuse of the first TXOP is permitted, the reuse transmitter determines whether to reuse the first TXOP. For example, a determination to reuse the first TXOP may be based on whether a first CCA level of the portion is less than or equal to the RX CCA threshold. Additionally or alternatively, a determination to reuse the first TXOP may be based on whether a second CCA level of the first transmitter is less than or equal to a CCA threshold associated with the first TXOP, whether the message is addressed to the reuse transmitter, whether a second message to be transmitted by the reuse transmitter during reuse of the first TXOP is addressed to the first receiver to receive the message during the first TXOP, or whether a network allocation vector (NAV) that is honored by the reuse transmitter was set by the first TX, as illustrative, non-limiting examples. When the reuse transmitter sends the second message, the reuse transmitter may perform a performance assessment associated with communication of the second message. Based on the performance assessment, the reuse transmitter may determine whether to reuse a second TXOP that occurs subsequent to the first TXOP and that is permitted to be reused.

In another particular embodiment, the reuse transmitter may make a determination to reuse the first TXOP to send a second message during the first TXOP. For example, the reuse transmitter may determine to reuse the first TXOP based on a physical proximity of the reuse transmitter to a reuse receiver. As another example, the reuse transmitter may determine to reuse the first TXOP based on a handshake exchange between the reuse transmitter and a reuse receiver. The handshake exchange may include a request to send (RTS) message and a clear to send (CTS) message, and the reuse transmitter may set a network allocation vector (NAV) associated with the handshake exchange to be aligned with an end of the first TXOP. When the handshake exchange is performed, the reuse transmitter may receive the CTS message from the reuse receiver and may determine to reuse the first TXOP based on the CTS message.

The method 1700 may enable the reuse transmitter to determine whether to reuse the first TXOP based on an amount of interference caused by the reuse transmitter at the first receiver.

Figure 18:
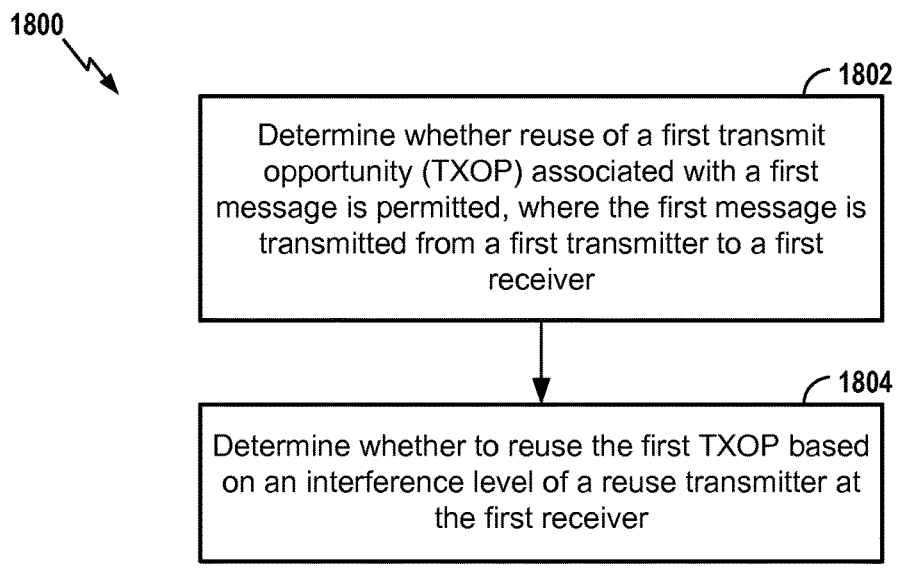
FIG. 18 is a flow diagram of an illustrative method of operating a reuse transmitter.

Referring to FIG. 18, a particular embodiment of a method of operating a reuse transmitter is described and designated 1800. The method 1800 may be performed using the reuse transmitter 140 of FIG. 1, one of the access points 1012, 1022, or one of the stations 1014, 1016, 1024, 1026 of FIG. 10.

The method 1800 may include determining whether reuse of a first transmit opportunity (TXOP) associated with a first message is permitted, where the first message is transmitted from a first transmitter to a first receiver, at 1802. For example, the first message and the first TXOP may include or correspond to the first message 120 of FIG. 1 and the first TXOP 222 of FIG. 2, respectively.

The method 1800 may further include determining whether to reuse the first TXOP based on an interference level of the reuse transmitter at the first receiver, at 1804. Prior to determining whether to reuse the first TXOP, the reuse transmitter may determine the interference level. For example, the reuse transmitter may determine the interference level based on a management message received from the first receiver. As another example, the reuse transmitter may determine the interference level based on a clear channel access (CCA) level associated with first receiver. To illustrate, the reuse transmitter may determine the CCA level based on a block acknowledgement (BA) transmitted by the first receiver. As another example, the reuse transmitter may determine the interference level based on a request to send (RTS) message or a clear to send (CTS) message transmitted from the first receiver. The RTS message or the CTS message may be associated with a particular message transmitted that is prior to the first message.

The method 1800 may enable the reuse transmitter to determine whether to reuse the first TXOP based on an amount of interference caused by the reuse transmitter at the first receiver.

Figure 19:
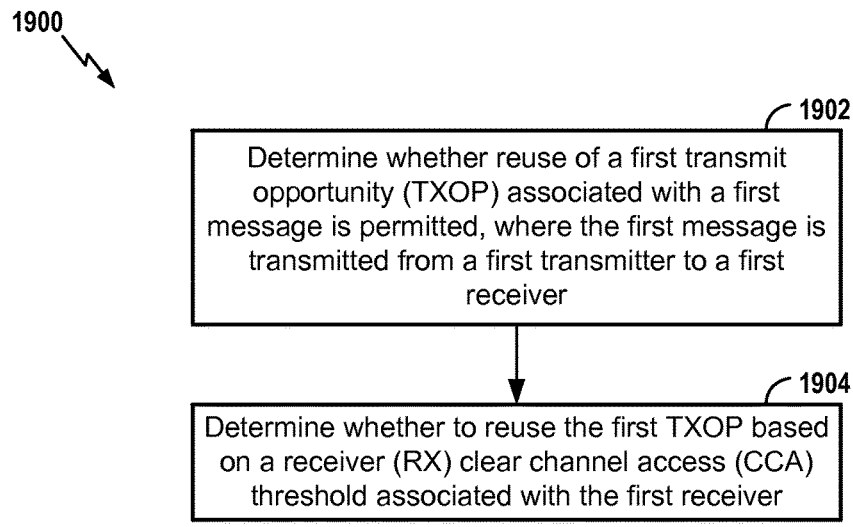
FIG. 19 is a flow diagram of an illustrative method of operating a reuse transmitter.

Referring to FIG. 19, a particular embodiment of a method of operating a reuse transmitter is described and designated 1900. The method 1900 may be performed using the reuse transmitter 140 of FIG. 1, one of the access points 1012, 1022, or one of the stations 1014, 1016, 1024, 1026 of FIG. 10.

The method 1900 may include determining whether reuse of a first transmit opportunity (TXOP) associated with a first message is permitted, where the first message is transmitted from a first transmitter to a first receiver, at 1902. For example, the first message and the first TXOP may include or correspond to the first message 120 of FIG. 1 and the first TXOP 222 of FIG. 2, respectively.

The method 1900 may further include determining whether to reuse the first TXOP based on a receiver (RX) clear channel access (CCA) threshold associated with the first receiver, at 1904. Prior to determining whether to reuse the first TXOP, the reuse transmitter may determine the RX CCA threshold. For example, the reuse transmitter may determine the RX CCA threshold based on one or more bits included in a signal (SIG) field associated with the first message or based on a management message received from the first receiver. As another example, the reuse transmitter may determine the RX CCA threshold based on a block acknowledgement (BA) transmitted by the first receiver, such as a BA that is responsive to a particular message transmitted prior to the first message. As another example, the reuse transmitter may determine the RX CCA threshold based on a request to send (RTS) message or a clear to send (CTS) message transmitted from the first receiver. The RTS message or the CTS message may be associated with a particular message that was transmitted prior to the first message.

The method 1900 may enable the reuse transmitter to determine whether to reuse the first TXOP based on an RX CCA threshold determined by the first receiver.

Figure 20:
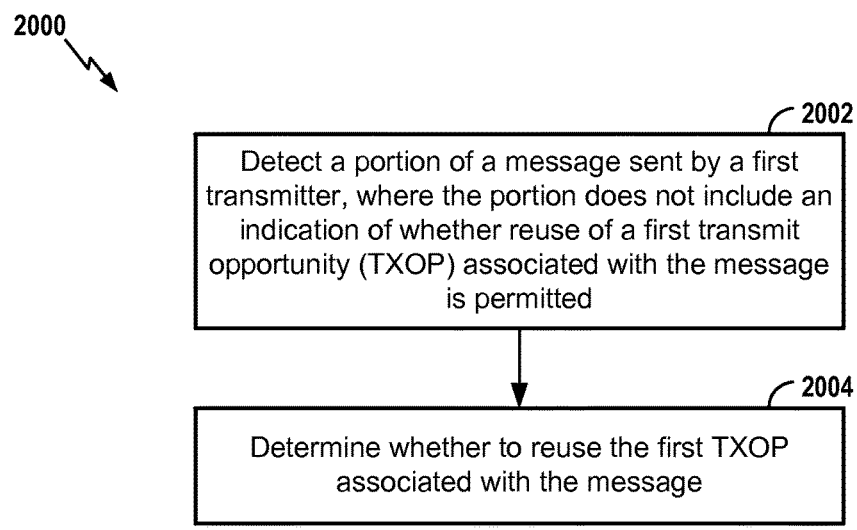
FIG. 20 is a flow diagram of an illustrative method of operating a reuse transmitter.

Referring to FIG. 20, a particular embodiment of a method of operating a reuse transmitter is described and designated 2000. The method 2000 may be performed using the reuse transmitter 140 of FIG. 1, one of the access points 1012, 1022, or one of the stations 1014, 1016, 1024, 1026 of FIG. 10.

The method 2000 may include detecting a portion of a message sent by a first transmitter, where the portion does not include an indication of whether reuse of a first transmit opportunity (TXOP) associated with the message is permitted, at 2002. The method 2000 may further include determining whether to reuse the first TXOP associated with the message, at 2004. The method 2000 may enable the reuse transmitter to determine whether to reuse the first TXOP.

Figure 21:
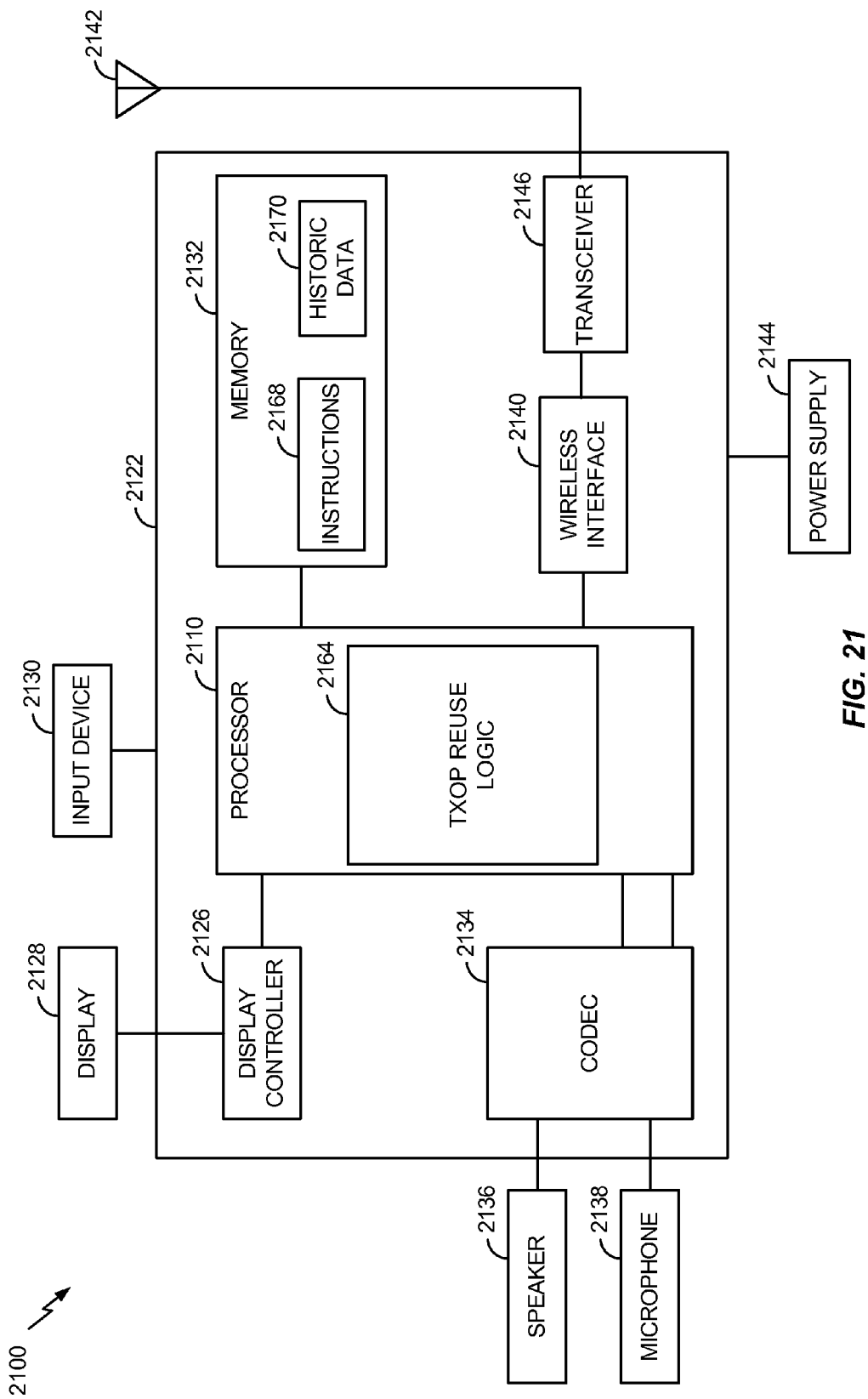
FIG. 21 is a diagram of a wireless device that is operable to support various embodiments of one or more methods, systems, apparatuses, and/or computer-readable media disclosed herein.

Referring to FIG. 21, a block diagram of a particular illustrative embodiment of a wireless communication device is depicted and generally designated 2100. The device 2100 includes a processor 2110, such as a digital signal processor, coupled to a memory 2132. In an illustrative embodiment, the device 2100, or components thereof, may correspond to the first transmitter 110, the first receiver 130, the reuse transmitter 140, or the reuse receiver 160 of FIG. 1, or components thereof.

The processor 2110 may be configured to execute software (e.g., a program of one or more instructions 2168) stored in the memory 2132. Additionally or alternatively, the processor 2110 may be configured to implement one or more instructions stored in a memory of a wireless interface 2140 (e.g., an IEEE 802.11 wireless interface). In a particular embodiment, the processor 2110 may be configured to operate in accordance with one or more of the methods of FIGS. 11-20. For example, the processor 2110 may include TXOP reuse logic 2164 to execute one or more of the methods of FIGS. 11-20. The processor 2110 may also be configured to determine and store historical data 2170 associated with devices or data transmissions associated with one or more networks, such as one or more wireless networks. In an illustrative embodiment, the historical data 2170 includes data associated with TXOP reuse.

The wireless interface 2140 may be coupled to the processor 2110 and to an antenna 2142. For example, the wireless interface 2140 may be coupled to the antenna 2142 via a transceiver 2146, such that wireless data received via the antenna 2142 and may be provided to the processor 2110.

A coder/decoder (CODEC) 2134 can also be coupled to the processor 2110. A speaker 2136 and a microphone 2138 can be coupled to the CODEC 2134. A display controller 2126 can be coupled to the processor 2110 and to a display device 2128. In a particular embodiment, the processor 2110, the display controller 2126, the memory 2132, the CODEC 2134, and the wireless interface 2140, are included in a system-in-package or system-on-chip device 2122. In a particular embodiment, an input device 2130 and a power supply 2144 are coupled to the system-on-chip device 2122. Moreover, in a particular embodiment, as illustrated in FIG. 21, the display device 2128, the input device 2130, the speaker 2136, the microphone 2138, the antenna 2142, and the power supply 2144 are external to the system-on-chip device 2122. However, each of the display device 2128, the input device 2130, the speaker 2136, the microphone 2138, the antenna 2142, and the power supply 2144 can be coupled to one or more components of the system-on-chip device 2122, such as one or more interfaces or controllers.

In conjunction with the described embodiments, a first apparatus includes means for determining whether to permit reuse of a first transmit opportunity (TXOP). For example, the means for determining may include the first transmitter 110 of FIG. 1, the access points 1012, 1022, the stations 1014, 1016, 1024, 1026 of FIG. 10, the wireless interface 2140, the processor 2110 programmed to execute the instructions 2168, the TXOP reuse logic 2164 of FIG. 21, one or more other devices, circuits, modules, or instructions to determine whether to permit reuse of the first TXOP, or any combination thereof.

The first apparatus also includes means for sending a message associated with the first TXOP, where the message indicates whether reuse, by a reuse transmitter, of the first TXOP is permitted. For example, the means for sending may include the first transmitter 110 of FIG. 1, the access points 1012, 1022, the stations 1014, 1016, 1024, 1026 of FIG. 10, the wireless interface 2140, the transceiver 2146, the processor 2110 programmed to execute the instructions 2168, the TXOP reuse logic 2164 of FIG. 21, one or more other devices, circuits, modules, or instructions to send the message, or any combination thereof.

In conjunction with the described embodiments, a second apparatus includes means for detecting a portion of a message sent by a first transmitter. For example, the means for detecting may include the reuse transmitter 140 of FIG. 1, the access points 1012, 1022, the stations 1014, 1016, 1024, 1026 of FIG. 10, the wireless interface 2140, the transceiver 2146, the processor 2110 programmed to execute the instructions 2168, the TXOP reuse logic 2164 of FIG. 21, one or more other devices, circuits, modules, or instructions to detect the portion, or any combination thereof.

The second apparatus also includes means for determining, based on the portion, whether reuse of a first transmit opportunity (TXOP) associated with the message is permitted. For example, the means for determining may include the reuse transmitter 140 of FIG. 1, the access points 1012, 1022, the stations 1014, 1016, 1024, 1026 of FIG. 10, the wireless interface 2140, the processor 2110 programmed to execute the instructions 2168, the TXOP reuse logic 2164 of FIG. 21, one or more other devices, circuits, modules, or instructions to determine whether reuse of the first TXOP is permitted, or any combination thereof.

In conjunction with the described embodiments, a third apparatus includes means for determining a clear channel access (CCA) threshold associated with reuse of a first transmit opportunity (TXOP). For example, the means for determining may include the first transmitter 110 of FIG. 1, the access points 1012, 1022, the stations 1014, 1016, 1024, 1026 of FIG. 10, the wireless interface 2140, the processor 2110 programmed to execute the instructions 2168, the TXOP reuse logic 2164 of FIG. 21, one or more other devices, circuits, modules, or instructions to determine the CCA threshold, or any combination thereof.

The third apparatus also includes means for sending at least a portion of a message associated with the first TXOP, where the portion indicates the CCA threshold associated with reuse of the first TXOP. For example, the means for sending may include the first transmitter 110 of FIG. 1, the access points 1012, 1022, the stations 1014, 1016, 1024, 1026 of FIG. 10, the wireless interface 2140, the transceiver 2146, the processor 2110 programmed to execute the instructions 2168, the TXOP reuse logic 2164 of FIG. 21, one or more other devices, circuits, modules, or instructions to send the portion, or any combination thereof.

In conjunction with the described embodiments, a fourth apparatus includes means for detecting a portion of a message sent by a first transmitter, where the message is associated with a first transmit opportunity (TXOP). For example, the means for detecting may include the reuse transmitter 140 of FIG. 1, the access points 1012, 1022, the stations 1014, 1016, 1024, 1026 of FIG. 10, the wireless interface 2140, the transceiver 2146, the processor 2110 programmed to execute the instructions 2168, the TXOP reuse logic 2164 of FIG. 21, one or more other devices, circuits, modules, or instructions to detect the portion, or any combination thereof.

The fourth apparatus also includes means for determining, based on the portion, a clear channel access (CCA) threshold associated with reuse of the first TXOP. For example, the means for determining may include the reuse transmitter 140 of FIG. 1, the access points 1012, 1022, the stations 1014, 1016, 1024, 1026 of FIG. 10, the wireless interface 2140, the processor 2110 programmed to execute the instructions 2168, the TXOP reuse logic 2164 of FIG. 21, one or more other devices, circuits, modules, or instructions to determine the CCA threshold, or any combination thereof.

In conjunction with the described embodiments, a fifth apparatus includes means for sending, to a first receiver, a request to send (RTS) message associated with a first transmit opportunity (TXOP), where the RTS message request the first receiver to indicate whether reuse of the first TXOP is permitted. For example, the means for sending may include the first transmitter 110 of FIG. 1, the access points 1012, 1022, the stations 1014, 1016, 1024, 1026 of FIG. 10, the wireless interface 2140, the transceiver 2146, the processor 2110 programmed to execute the instructions 2168, the TXOP reuse logic 2164 of FIG. 21, one or more other devices, circuits, modules, or instructions to send the RTS message, or any combination thereof.

The fifth apparatus also includes means for receiving, from the first receiver, a clear to send (CTS) message responsive to the RTS message. For example, the means for receiving may include the first transmitter 110 of FIG. 1, the access points 1012, 1022, the stations 1014, 1016, 1024, 1026 of FIG. 10, the wireless interface 2140, the transceiver 2146, the processor 2110 programmed to execute the instructions 2168, the TXOP reuse logic 2164 of FIG. 21, one or more other devices, circuits, modules, or instructions to receive the CTS message, or any combination thereof.

In conjunction with the described embodiments, a sixth apparatus includes means for receiving a request to send (RTS) message sent by a first transmitter. For example, the means for receiving may include the first receiver 130 of FIG. 1, the access points 1012, 1022, the stations 1014, 1016, 1024, 1026 of FIG. 10, the wireless interface 2140, the transceiver 2146, the processor 2110 programmed to execute the instructions 2168, the TXOP reuse logic 2164 of FIG. 21, one or more other devices, circuits, modules, or instructions to receive the RTS message, or any combination thereof.

The sixth apparatus also includes means for means for sending, to the first transmitter, a clear to send (CTS) message associated with a first transmit opportunity (TXOP), where the CTS message indicates whether reuse of the first TXOP is permitted. For example, the means for sending may include the first receiver 130 of FIG. 1, the access points 1012, 1022, the stations 1014, 1016, 1024, 1026 of FIG. 10, the wireless interface 2140, the transceiver 2146, the processor 2110 programmed to execute the instructions 2168, the TXOP reuse logic 2164 of FIG. 21, one or more other devices, circuits, modules, or instructions to send the CTS message, or any combination thereof.

In conjunction with the described embodiments, a seventh apparatus includes means for detecting a portion of a message sent by a first receiver. For example, the means for detecting may include the reuse transmitter 140 of FIG. 1, the access points 1012, 1022, the stations 1014, 1016, 1024, 1026 of FIG. 10, the wireless interface 2140, the transceiver 2146, the processor 2110 programmed to execute the instructions 2168, the TXOP reuse logic 2164 of FIG. 21, one or more other devices, circuits, modules, or instructions to detect the portion, or any combination thereof.

The seventh apparatus also includes means for determining, based on the portion, a receiver (RX) clear channel access (CCA) threshold associated with reuse of a first transmit opportunity (TXOP). For example, the means for determining may include the reuse transmitter 140 of FIG. 1, the access points 1012, 1022, the stations 1014, 1016, 1024, 1026 of FIG. 10, the wireless interface 2140, the processor 2110 programmed to execute the instructions 2168, the TXOP reuse logic 2164 of FIG. 21, one or more other devices, circuits, modules, or instructions to determine the RX CCA threshold, or any combination thereof.

In conjunction with the described embodiments, an eighth apparatus includes means for determining whether reuse of a first transmit opportunity (TXOP) associated with a first message is permitted, where the first message is transmitted from a first transmitter to a first receiver. For example, the means for determining whether reuse of the first TXOP is permitted may include the reuse transmitter 140 of FIG. 1, the access points 1012, 1022, the stations 1014, 1016, 1024, 1026 of FIG. 10, the wireless interface 2140, the processor 2110 programmed to execute the instructions 2168, the TXOP reuse logic 2164 of FIG. 21, one or more other devices, circuits, modules, or instructions to determine whether reuse of the first TXOP is permitted, or any combination thereof.

The eighth apparatus also includes means for determining whether to reuse the first TXOP based on an interference level of a reuse transmitter at the first receiver. For example, the means for determining whether to reuse the first TXOP may include the reuse transmitter 140 of FIG. 1, the access points 1012, 1022, the stations 1014, 1016, 1024, 1026 of FIG. 10, the wireless interface 2140, the processor 2110 programmed to execute the instructions 2168, the TXOP reuse logic 2164 of FIG. 21, one or more other devices, circuits, modules, or instructions to determine whether to reuse the first TXOP, or any combination thereof.

In conjunction with the described embodiments, a ninth apparatus includes means for determining whether reuse of a first transmit opportunity (TXOP) associated with a first message is permitted, where the first message is transmitted from a first transmitter to a first receiver. For example, the means for determining whether reuse of the first TXOP is permitted may include the reuse transmitter 140 of FIG. 1, the access points 1012, 1022, the stations 1014, 1016, 1024, 1026 of FIG. 10, the wireless interface 2140, the processor 2110 programmed to execute the instructions 2168, the TXOP reuse logic 2164 of FIG. 21, one or more other devices, circuits, modules, or instructions to determine whether reuse of the first TXOP is permitted, or any combination thereof.

The ninth apparatus also includes means for determining whether to reuse the first TXOP based on a receiver (RX) clear channel access (CCA) threshold associated with the first receiver. For example, the means for determining whether to reuse the first TXOP may include the reuse transmitter 140 of FIG. 1, the access points 1012, 1022, the stations 1014, 1016, 1024, 1026 of FIG. 10, the wireless interface 2140, the processor 2110 programmed to execute the instructions 2168, the TXOP reuse logic 2164 of FIG. 21, one or more other devices, circuits, modules, or instructions to determine whether to reuse the first TXOP, or any combination thereof.

Although one or more of FIGS. 1-21 may illustrate systems, apparatuses, and/or methods according to the teachings of the disclosure, the disclosure is not limited to these illustrated systems, apparatuses, and/or methods. One or more functions or components of any of FIGS. 1-21 as illustrated or described herein may be combined with one or more other portions of another of FIGS. 1-21. Accordingly, no single embodiment described herein should be construed as limiting and embodiments of the disclosure may be suitably combined without departing form the teachings of the disclosure.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   determining, at a first transmitter, a clear channel access (CCA) threshold for reuse of a first transmit opportunity (TXOP) of the first transmitter;
   sending, from the first transmitter, a portion of a message, wherein the portion of the message indicates the CCA threshold for reuse of the first TXOP of the first transmitter; and
   sending a second portion of the message from the first transmitter to a first receiver during the first TXOP via the same channel used to communicate the portion of the message, wherein the CCA threshold is dynamically determined by the first transmitter prior to sending the message.

2. The method of claim 1, wherein the message indicates whether reuse, by a reuse transmitter, of the first TXOP is permitted.

3. The method of claim 1, wherein the CCA threshold is determined based on a signal strength of a link between the first transmitter and a first receiver in a basic service set (BSS), based on an interference level of an overlapping basic service set (OBSS), based on a previous CCA threshold used in association with a particular message communicated by the first transmitter prior to the message, or a combination thereof.

4. The method of claim 1, wherein the portion of the message indicates the CCA threshold based on a value in a signal (SIG) field.

5. The method of claim 1, wherein the CCA threshold is determined prior to sending the message, and wherein the CCA threshold comprises a reuse CCA threshold.

6. The method of claim 1, wherein the CCA threshold is less than a standard-based CCA threshold corresponding to reuse of the first TXOP.

7. The method of claim 6, wherein the standard-based CCA threshold is −62 dBm, where dBm is a power ratio in decibels (dB) of a measured power referenced to one milliwatt (mW).

8. A method comprising:
   detecting, at a reuse transmitter, a portion of a message sent by a first transmitter, wherein the message indicates a first transmit opportunity (TXOP) of the first transmitter;
   determining, based on the portion, a clear channel access (CCA) threshold for reuse of the first TXOP of the first transmitter; and
   in response to determining to reuse the first TXOP, sending at least a portion of a second message from the reuse transmitter during the first TXOP while a second portion of the message is sent from the first transmitter to a first receiver, wherein the portion of the second message is sent based on the CCA threshold.

9. The method of claim 8, wherein the CCA threshold corresponds to an amount of interference tolerable by the first transmitter.

10. The method of claim 8, further comprising, when reuse of the first TXOP is permitted, determining at the reuse transmitter whether to reuse the first TXOP.

11. The method of claim 10, wherein a determination to reuse the first TXOP is based on whether a CCA level of the first transmitter is less than or equal to the CCA threshold.

12. The method of claim 8, wherein a determination to reuse the first TXOP is based on a power level of the first transmitter, whether the message is addressed to the reuse transmitter, whether a second message to be sent by the reuse transmitter during reuse of the first TXOP is addressed to a first receiver of the message, whether a network allocation vector (NAV) that is honored by the reuse transmitter was set by the first transmitter, or a combination thereof.

13. The method of claim 8, wherein a determination to reuse the first TXOP is based on a physical proximity of the reuse transmitter to a reuse receiver, based on a handshake exchange between the reuse transmitter and the reuse receiver, or a combination thereof.

14. The method of claim 8, further comprising, determining a duration of the first TXOP.

15. The method of claim 8, further comprising determining whether to reuse a second TXOP that is subsequent to the first TXOP, wherein a determination to reuse the second TXOP is based on whether the message is received by a first receiver, whether a second message sent by the reuse transmitter during the first TXOP is received by a reuse receiver, historical data, or a combination thereof.

16. A method comprising:
   detecting, at a reuse transmitter, a portion of a message sent by a first transmitter, wherein the message indicates a first transmit opportunity (TXOP) of the first transmitter;
   determining, at a reuse transmitter, that reuse of a first transmit opportunity (TXOP) of a first transmitter is permitted; and
   determining whether to reuse the first TXOP of the first transmitter based on a power level of the first transmitter, whether the message is addressed to the reuse transmitter, whether a second message to be sent by the reuse transmitter during reuse of the first TXOP is addressed to a first receiver of the message, whether a network allocation vector (NAV) that is honored by the reuse transmitter was set by the first transmitter, a receiver (RX) clear channel access (CCA) threshold, or a combination thereof.

17. The method of claim 16, wherein the RX CCA threshold corresponds to an amount of interference tolerable by a first receiver during the first TXOP.

18. The method of claim 16, further comprising determining, at the reuse transmitter, the RX CCA threshold.

19. The method of claim 18, wherein the reuse transmitter determines the RX CCA threshold based on one or more bits included in a signal (SIG) field associated with a first message.

20. The method of claim 18, wherein the reuse transmitter determines the RX CCA threshold based on a block acknowledgement (BA) sent by a first receiver, and wherein the BA is responsive to a particular message sent prior to a first message.

21. The method of claim 18, wherein the reuse transmitter determines the RX CCA threshold based on a management message received from a first receiver.

22. The method of claim 18, wherein the reuse transmitter determines the RX CCA threshold based on a request to send (RTS) message or a clear to send (CTS) message sent from a first receiver, and wherein the RTS message or the CTS message is associated with a particular message sent prior to a first message.

23. A method comprising:
   detecting, at a reuse transmitter, a portion of a message sent by a first receiver, wherein the message indicates a first transmit opportunity (TXOP) of a first transmitter;
   determining, at the reuse transmitter, a clear channel access (CCA) threshold associated with reuse of the first transmit opportunity (TXOP) of the first transmitter; and
   reusing the first TXOP to send a second message during the first TXOP;
   performing a performance assessment associated with communication of the second message; and
   based on the performance assessment, determining whether to reuse a second TXOP subsequent to the first TXOP.

24. The method of claim 23, wherein the portion of the message is included in a clear to send (CTS) message, and wherein the CTS message is sent by the first receiver responsive to a request to send (RTS) message sent by the first transmitter.

25. The method of claim 23, further comprising, when reuse of the first TXOP is permitted, determining at the reuse transmitter whether to reuse the first TXOP.

26. The method of claim 25, wherein a determination to reuse the first TXOP is based on a physical proximity of the reuse transmitter to a reuse receiver, is based on whether a first CCA level of the portion is less than or equal to a receiver (RX) CCA threshold, or a combination thereof.

27. The method of claim 26, wherein a determination to reuse the first TXOP is based on whether a second CCA level of the first transmitter is less than or equal to a CCA threshold for the first TXOP, whether the message is addressed to the reuse transmitter, whether a second message to be sent by the reuse transmitter during reuse of the first TXOP is addressed to the first receiver to receive the message during the first TXOP, whether a network allocation vector (NAV) that is honored by the reuse transmitter was set by the first transmitter, or a combination thereof.

28. The method of claim 23, further comprising reusing the first TXOP to send a second message from the reuse transmitter to a reuse receiver based on a CCA threshold.

29. The method of claim 23, wherein the CCA threshold comprises a receiver (RX) clear CCA threshold.

30. The method of claim 23, further comprising:
identifying a modulation and coding scheme (MCS) associated with the message; and
adjusting the CCA threshold based on the MCS.

31. An apparatus comprising:
a processor configured to determine a clear channel access (CCA) threshold for reuse of a first transmit opportunity (TXOP); and
a transmitter to send a portion of a message that includes the CCA threshold for reuse of the first TXOP and to send a second portion of the message to a first receiver during the first TXOP via the same channel used to communicate the portion of the message, wherein the CCA threshold is dynamically determined prior to sending the message.

32. The apparatus of claim 31, wherein the CCA threshold is determined based on a signal strength in a basic service set (BSS), based on an interference level of an overlapping basic service set (OBSS), based on a previous CCA threshold used in association with a particular message communicated prior to the message, or a combination thereof.

33. The apparatus of claim 31, wherein the message indicates the CCA threshold based on a value in a signal (SIG) field.

34. The apparatus of claim 31, wherein the CCA threshold comprises a reuse CCA threshold.

35. The apparatus of claim 31, wherein the CCA threshold is less than a standard-based CCA threshold corresponding to reuse of the first TXOP.

36. An apparatus comprising:
a processor configured to:
detect a message sent by a first transmitter, wherein the message indicates a first transmit opportunity (TXOP) of the first transmitter, and
determine, based on the message, a clear channel access (CCA) threshold for reuse of the first TXOP of the first transmitter; and
a transmitter to send at least a portion of a second message from during the first TXOP while a second portion of the message is sent from the first transmitter to a first receiver, wherein the portion of the second message is sent based on the CCA threshold.

37. The apparatus of claim 36 wherein the CCA threshold comprises a receiver (RX) clear CCA threshold.

38. The apparatus of claim 36, wherein the CCA threshold corresponds to an amount of interference tolerable by the first transmitter.

39. The apparatus of claim 36, wherein the processor is configured to determine whether to reuse the first TXOP.

40. The apparatus of claim 36, wherein the processor is configured to determine whether to reuse the first TXOP based on whether a CCA level of the first transmitter is less than or equal to the CCA threshold.

41. The apparatus of claim 36, wherein the processor is configured to determine whether to reuse the first TXOP based on a power level of the first transmitter, whether a second message to be sent during reuse of the first TXOP is addressed to a first receiver of the message, whether a network allocation vector (NAV) that is honored was set by the first transmitter, or a combination thereof.

42. The apparatus of claim 36, wherein the processor is configured to determine whether to reuse the first TXOP based on a physical proximity of a reuse receiver, based on a handshake exchange, or a combination thereof.

43. The apparatus of claim 36, wherein the transmitter, in response to determining to reuse the first TXOP, sends at least a portion of the second message during the first TXOP.

44. An apparatus comprising:
means for determining a clear channel access (CCA) threshold for reuse of a first transmit opportunity (TXOP); and
means for transmitting a portion of a message that includes the CCA threshold for reuse of the first TXOP and a second portion of the message to a first receiver during the first TXOP via the same channel used to communicate the portion of the message, wherein the CCA threshold is dynamically determined prior to sending the message.

45. An apparatus comprising:
means for detecting a portion of a message sent by a first transmitter, wherein the message indicates a first transmit opportunity (TXOP) of the first transmitter;
means for determining, based on the portion of the message, a clear channel access (CCA) threshold for reuse of the first TXOP of the first transmitter; and
means for sending at least a portion of a second message from during the first TXOP while a second portion of the message is sent from the first transmitter to a first receiver, wherein the portion of the second message is sent based on the CCA threshold.

46. A computer-readable storage medium comprising instructions that, when executed by a processor, cause the processor to perform operations comprising:
determining a clear channel access (CCA) threshold for reuse of a first transmit opportunity (TXOP);
sending a portion of a message that includes the CCA threshold for reuse of the first TXOP of a first transmitter; and
sending a second portion of the message to a first receiver during the first TXOP via the same channel used to communicate the portion of the message, wherein the CCA threshold is dynamically determined prior to sending the message.

47. A computer-readable storage medium comprising instructions that, when executed by a processor, cause the processor to perform operations comprising:
detecting a portion of a message sent by a first transmitter, wherein the message indicates a first transmit opportunity (TXOP) of the first transmitter;
determining, based on the portion of the message, a clear channel access (CCA) threshold for reuse of the first TXOP of the first transmitter; and
in response to determining to reuse the first TXOP, sending at least a portion of a second message from during the first TXOP while a second portion of the message is sent from the first transmitter to a first receiver, wherein the portion of the second message is sent based on the CCA threshold.

* * * * *